(12) United States Patent
Aelony

(10) Patent No.: US 12,496,104 B1
(45) Date of Patent: Dec. 16, 2025

(54) INTRAMEDULLARY BONE FIXATION DEVICES, SYSTEMS, AND METHODS

(71) Applicant: Jared S Aelony, Rochester, MN (US)

(72) Inventor: Jared S Aelony, Rochester, MN (US)

( * ) Notice: Subject to any disclaimer, the term of this patent is extended or adjusted under 35 U.S.C. 154(b) by 0 days.

(21) Appl. No.: 19/274,513

(22) Filed: Jul. 19, 2025

Related U.S. Application Data

(60) Provisional application No. 63/673,716, filed on Jul. 20, 2024.

(51) Int. Cl.
| | |
|---|---|
| *A61B 17/72* | (2006.01) |
| *A61B 17/86* | (2006.01) |
| *A61B 17/90* | (2006.01) |
| *A61B 17/00* | (2006.01) |
| *A61B 17/68* | (2006.01) |

(52) U.S. Cl.
CPC ........ *A61B 17/7225* (2013.01); *A61B 17/861* (2013.01); *A61B 17/8625* (2013.01); *A61B 17/90* (2021.08); *A61B 2017/00477* (2013.01); *A61B 2017/681* (2013.01)

(58) Field of Classification Search
CPC ............ A61B 17/7225; A61B 17/7208; A61B 17/8685; A61B 17/8625; A61B 17/72
See application file for complete search history.

(56) References Cited

U.S. PATENT DOCUMENTS

| | | | |
|---|---|---|---|
| 8,961,516 B2 | 2/2015 | Nelson et al. | |
| 9,060,820 B2 | 6/2015 | Nelson et al. | |
| 9,226,783 B2 | 1/2016 | Brigido | |
| 9,814,499 B2 | 11/2017 | Buscaglia et al. | |
| 10,499,960 B2 | 12/2019 | Sinnott et al. | |
| 10,758,280 B2 | 9/2020 | Sommers et al. | |
| 11,419,645 B2 * | 8/2022 | Stinson | A61B 17/7208 |
| 11,826,262 B2 * | 11/2023 | Glerum | A61B 17/68 |
| 2009/0182336 A1 * | 7/2009 | Brenzel | A61B 17/869 |
| | | | 606/62 |
| 2009/0228008 A1 * | 9/2009 | Justin | A61B 5/107 |
| | | | 606/62 |

(Continued)

FOREIGN PATENT DOCUMENTS

| | | | | |
|---|---|---|---|---|
| AU | 2012339536 A1 * | 6/2014 | ......... | A61B 17/7208 |
| CN | 112932641 A * | 6/2021 | ............. | A61B 17/72 |

(Continued)

*Primary Examiner* — Jacqueline T Johanas
(74) *Attorney, Agent, or Firm* — Krenz Patent Law, LLC

(57) ABSTRACT

An intramedullary bone fixation device includes an elongate member having a proximal section, a distal section, and a transformative section between the proximal and distal sections. The proximal section includes a first threaded section with threads having a first pitch. The distal section includes a second threaded section with threads having a second pitch. The transformative section includes a plurality of segments disposed generally vertical between the proximal and distal sections, each segment including male and female engagement portions. One or more inner surfaces of the segments define a threaded aperture through the transformative section. A screw adapted to be placed through the threaded aperture includes a first set of threads adapted to engage threads of the threaded aperture, a distal second set of threads, and a proximal third set of threads, the second and third sets of threads having a different pitch than the first set of threads.

20 Claims, 34 Drawing Sheets

(56) References Cited

U.S. PATENT DOCUMENTS

| | | | | |
|---|---|---|---|---|
| 2012/0065638 A1* | 3/2012 | Moore | ............... | A61B 17/7225 |
| | | | | 606/62 |
| 2014/0114312 A1* | 4/2014 | Krause | ................. | A61B 17/864 |
| | | | | 606/62 |
| 2015/0012048 A1* | 1/2015 | Huebner | ............ | A61B 17/8685 |
| | | | | 606/304 |
| 2019/0120282 A1* | 4/2019 | Krause | ....................... | F16C 1/04 |
| 2020/0078058 A1 | 3/2020 | Fallin et al. | | |
| 2020/0289183 A1* | 9/2020 | Krause | ................ | F16B 25/0005 |
| 2021/0386465 A1* | 12/2021 | Thaler | ................ | A61B 17/7208 |
| 2023/0083740 A1* | 3/2023 | Noon | ................... | A61B 17/683 |
| | | | | 606/62 |
| 2023/0248392 A1* | 8/2023 | Whittaker | .......... | A61B 17/7233 |
| | | | | 606/86 R |
| 2023/0404636 A1* | 12/2023 | Whittaker | .......... | A61B 17/8685 |

FOREIGN PATENT DOCUMENTS

| | | | | |
|---|---|---|---|---|
| EP | 3206608 B1 * | 7/2023 | ......... | A61B 17/7283 |
| JP | 2021505337 A * | 2/2021 | ........... | A61B 17/869 |
| WO | WO-2010006453 A1 * | 1/2010 | ........... | A61B 17/744 |
| WO | WO-2015134750 A1 * | 9/2015 | ........ | A61B 17/7208 |
| WO | WO-2017147537 A1 * | 8/2017 | ......... | A61B 17/8894 |

\* cited by examiner

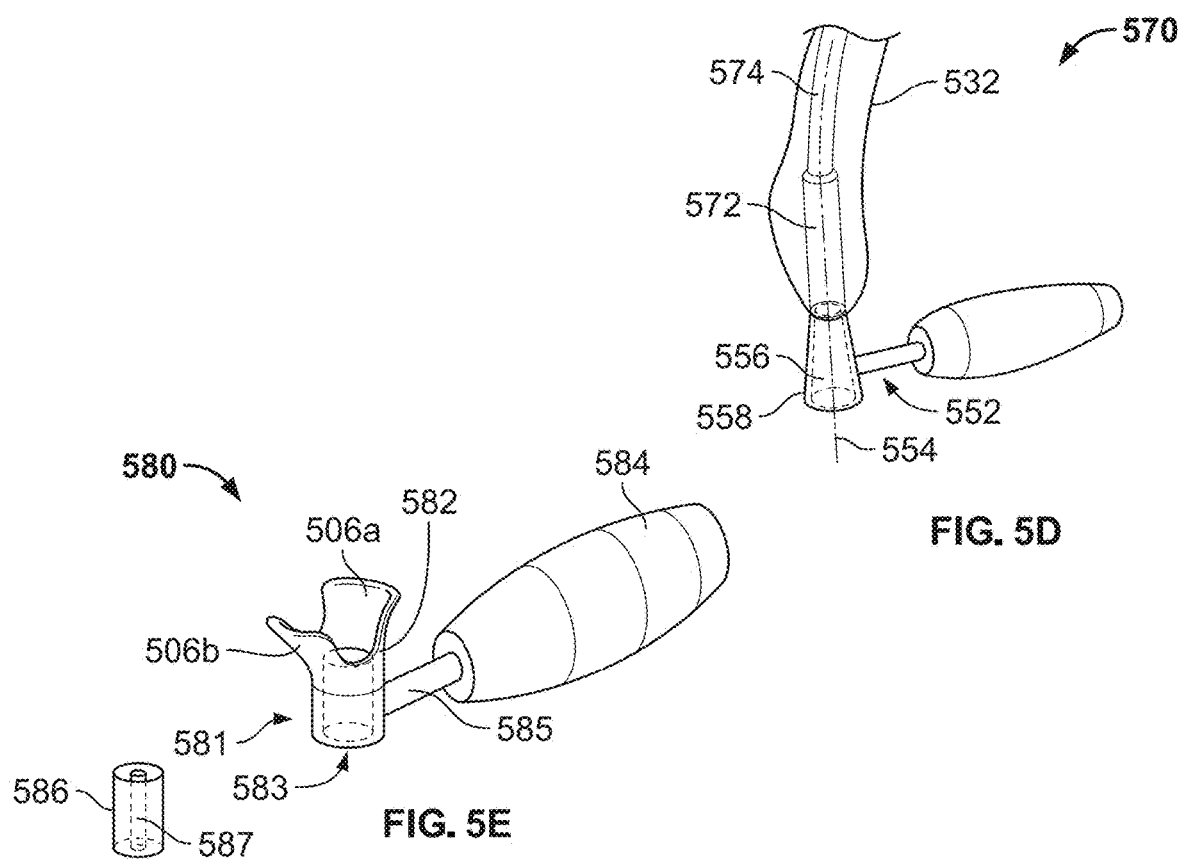
FIG. 5D
FIG. 5E
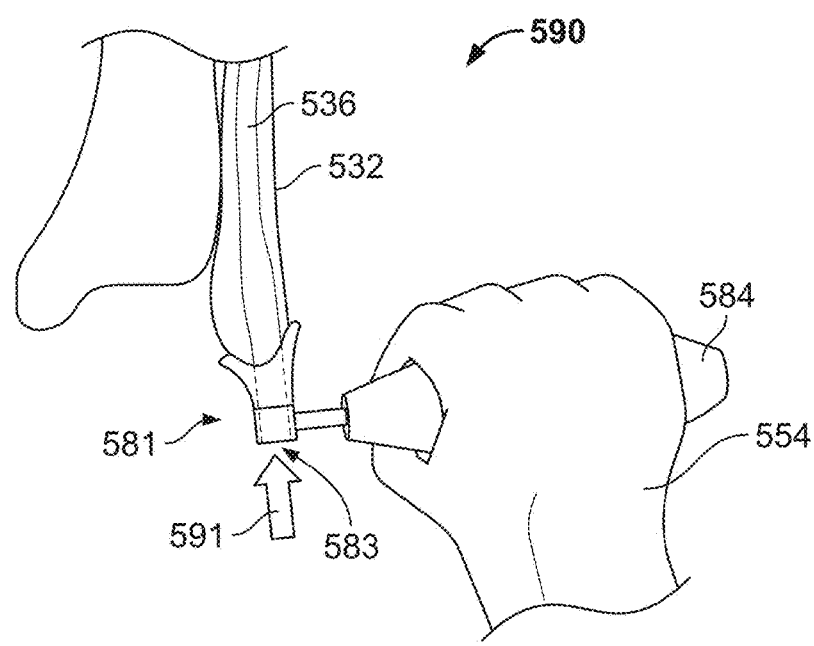
FIG. 5F

Anterior View

Lateral View

Anterior View

Lateral View

INTRAMEDULLARY BONE FIXATION DEVICES, SYSTEMS, AND METHODS

CROSS REFERENCE TO RELATED APPLICATION

This application claims the benefit of U.S. Provisional Patent Application No. 63/673,716, filed 20 Jul. 2024, entitled "ABC FIBULAR NAIL," the entire contents of which is hereby incorporated by reference in its entirety.

TECHNICAL FIELD

This document generally describes devices, systems, and methods for healing bone fractures.

BACKGROUND

Bone fractures are relatively common, and can be caused by a variety of factors. For example, a bone may fracture in response to a direct impact, as from a fall or other accident, or trauma from a foreign object, from a twisting action during a sporting or recreational event, from overuse, or from a weakening of the bone, as can be common with aging.

Recommended treatment methods for bone fractures can depend on the type, severity, or both type and severity of the fracture. For example, some bone fractures may adequately heal with immobilization, and without surgical implantation of hardware that can assist with healing the bone. In some cases, however, it can be desirable to assist with the healing by surgical implantation of hardware that can help to stabilize the bone.

One example of an implant that has been used to assist with healing a fibula fracture is a plate and a set of screws. The plate and screws use an open reduction and internal fixation technique. The screws attach the plate to the bone, which helps to stabilize the bone for improved healing. A surgery to implant the plate and screws, however, can be invasive, and can include dissection and removal of vascular connective tissue along the bone, which can disrupt blood supply. Additionally, a surgery for installation of a plate and screws can involve a sizable incision, which can leave a sizable scar.

Another example of an implant that has been used to assist with healing a fractured fibula is a fibula nail that is inserted into an intramedullary canal of the fibula. One example of such a nail includes a pre-contoured portion of the nail, where the pre-contoured portion has a 5-degree bend to fit a curvature of the intramedullary canal. The device uses a bushing, placed separately into the fibula at a proximal location, and when a proximal portion of the nail is inserted through the bushing, the proximal portion of the nail is fixed to the bushing by a set screw. The device additionally uses a series of screws that pass through the nail on a distal portion of the nail. The pre-contoured portion of the nail is not segmented or mobile, and maintains its shape as the nail is inserted into the intramedullary canal and after placement. The pre-contoured portion of the nail is not fixed to the fibula after placement.

SUMMARY

In a general aspect, an intramedullary bone fixation device includes an elongate member that includes a proximal section, a distal section, and a transformative section disposed between the proximal section and the distal section. The proximal section includes a first threaded section on an outside surface of the proximal section, and threads of the first threaded section have a first pitch. The distal section includes a second threaded section on an outside surface of the distal section, and threads of the second threaded section have a second pitch that is different from the first pitch. The transformative section includes a plurality of segments disposed in a generally vertical arrangement between the proximal section and the distal section, and each segment of the plurality of segments includes a male engagement portion of the segment and a female engagement portion of the segment. One or more inner surfaces of the segments define an aperture through the transformative section, and the one or more inner surfaces define threads. The device also includes a screw adapted to be operably placed through the aperture. The screw includes a first set of threads on an outer surface of the screw adapted to engage the threads on the one or more inner surfaces of the segments. The screw also includes a second set of threads near a distal end of the screw and a third set of threads near a proximal end of the screw, and each of the second and third sets of threads have a pitch that differs from a pitch of the first set of threads.

Implementations can include one or more of the following. The transformative section may initially be in a flexible state, and after the screw is operably placed through the aperture, the transformative section may be in a fixed state. While the transformative section is in the flexible state, the transformative section may be adapted to provide between 4 degrees and 6 degrees of flexibility in a frontal plane. The transformative section, when in the flexible state, may be adapted to conform to a curvature of an intramedullary canal of a distal metaphysis of a fibula. For each segment of the plurality of segments, the male engagement portion may include a bulbous element, and the female engagement portion may include a shape that is adapted to receive the bulbous element. For each segment of the plurality of segments, the male engagement portion may include a proximal male engagement portion and a distal male engagement portion, and the female engagement portion may include a shape that is adapted to receive, from one or more other segments of the plurality of segments, a portion of a male engagement portion. The second set of threads of the screw may be adapted to engage with a medial cortex of a fibula, the third set of threads of the screw may be adapted to engage with a lateral cortex of the fibula, and a length of the screw may be adapted to span from the medial cortex of the fibula to the lateral cortex of the fibula when the screw is placed through the aperture. A middle portion of the screw may have a first diameter, and a proximal portion of the screw may broaden from the first diameter to a second diameter at a proximal end of the screw, where the second diameter is larger than the first diameter. The threads of the first threaded section of the proximal section may be self-tapping. The first threaded section may be disposed near a proximal end of the proximal section, and the second threaded section of the distal section may be disposed near a distal end of the distal section. The first threaded section of the proximal section and the second threaded section of the distal section may be adapted to provide a compressive force across a bone fracture site. The device may also include, near a distal end of the elongate member, a head that defines a tool interface receptacle. The device may also include first and second lateral-to-medial screws that each may pass through the proximal section, a locking trans-syndesmotic screw and a non-locking trans-syndesmotic screw that each may pass though the distal section, and first and second anterior-to-posterior screws that each may pass through the distal section.

In a second general aspect, a system for intramedullary bone fixation includes a guide that includes a bone apposition port that defines a channel through the bone apposition port, where the bone apposition port is configured such that the channel aligns with an intramedullary canal of a bone when the bone apposition port is positioned apposed to the bone. The system also includes an intramedullary bone fixation device that includes an elongate member that includes a proximal section, a distal section, and a transformative section disposed between the proximal section and the distal section. The proximal section includes a first threaded section on an outside surface of the proximal section, and threads of the first threaded section have a first pitch. The distal section includes a second threaded section on an outside surface of the distal section, and threads of the second threaded section have a second pitch that is different from the first pitch. The transformative section includes a plurality of segments disposed in a generally vertical arrangement between the proximal section and the distal section, and each segment of the plurality of segments includes a male engagement portion of the segment and a female engagement portion of the segment. One or more inner surfaces of the segments define an aperture through the transformative section, and the one or more inner surfaces define threads. The device also includes a screw adapted to be operably placed through the aperture. The screw includes a first set of threads on an outer surface of the screw adapted to engage the threads on the one or more inner surfaces of the segments. The screw also includes a second set of threads near a distal end of the screw and a third set of threads near a proximal end of the screw, and each of the second and third sets of threads have a pitch that differs from a pitch of the first set of threads.

Implementations can include one or more of the following. The channel may be sized for a guidewire, and the channel may align with a middle portion of the intramedullary canal when the bone apposition port is positioned apposed to the bone. The channel may be sized for a drill bit. The system may also include a guide insert that may be adapted to be received within the channel of the guide. The guide insert may define a second channel through the guide insert, where the second channel may align with a middle portion of the intramedullary canal when the bone apposition port is positioned apposed to the bone. The transformative section may initially be in a flexible state, and after the screw is operably placed through the aperture, the transformative section may be in a fixed state. While the transformative section is in the flexible state, the transformative section may be adapted to provide between 4 degrees and 6 degrees of flexibility in a frontal plane. The transformative section, when in the flexible state, may be adapted to conform to a curvature of an intramedullary canal of a distal metaphysis of a fibula.

The details of one or more implementations are depicted in the associated drawings and the description thereof below. Certain implementations may provide one or more advantages. For example, some implementations of the disclosed devices, systems, and methods can be used to provide improved adaptability and device flexibility to conform to an intramedullary space or canal during placement of the device, and improved fixation or rigidity of the device after placement of the device. Some implementations of the disclosed methods, devices and systems can be used to provide improved adaptability and flexibility at a transformative section of the device to conform to an intramedullary space or canal during placement of the device, and improved fixation or rigidity of the device at the transformative section of the device after placement of the device. Some implementations of the devices, systems, and methods described herein can also provide one or more advantages that can help make the procedure easier to complete, with greater accuracy, and in a shorter time for a surgeon performing the procedure. Some implementations of the devices, systems, and methods described herein can provide an advantage of earlier weight bearing.

Other features, objects, and advantages of the technology described in this document will be apparent from the description and the drawings, and from the claims.

BRIEF DESCRIPTION OF THE DRAWINGS

FIG. 5D is a conceptual view of the guide 552 and bone 552 of FIG. 5C following removal of the drill bit 562 of FIG. 5C.

FIG. 5E is a view of another example guide and an example guide insert that can be used to prepare an install site for an intramedullary bone fixation device.

FIG. 5F is a conceptual view of the guide of FIG. 5E being positioned with respect to a bone, such as a fibula.

Like reference symbols in the various drawings indicate like elements.

DETAILED DESCRIPTION

Figure 1:
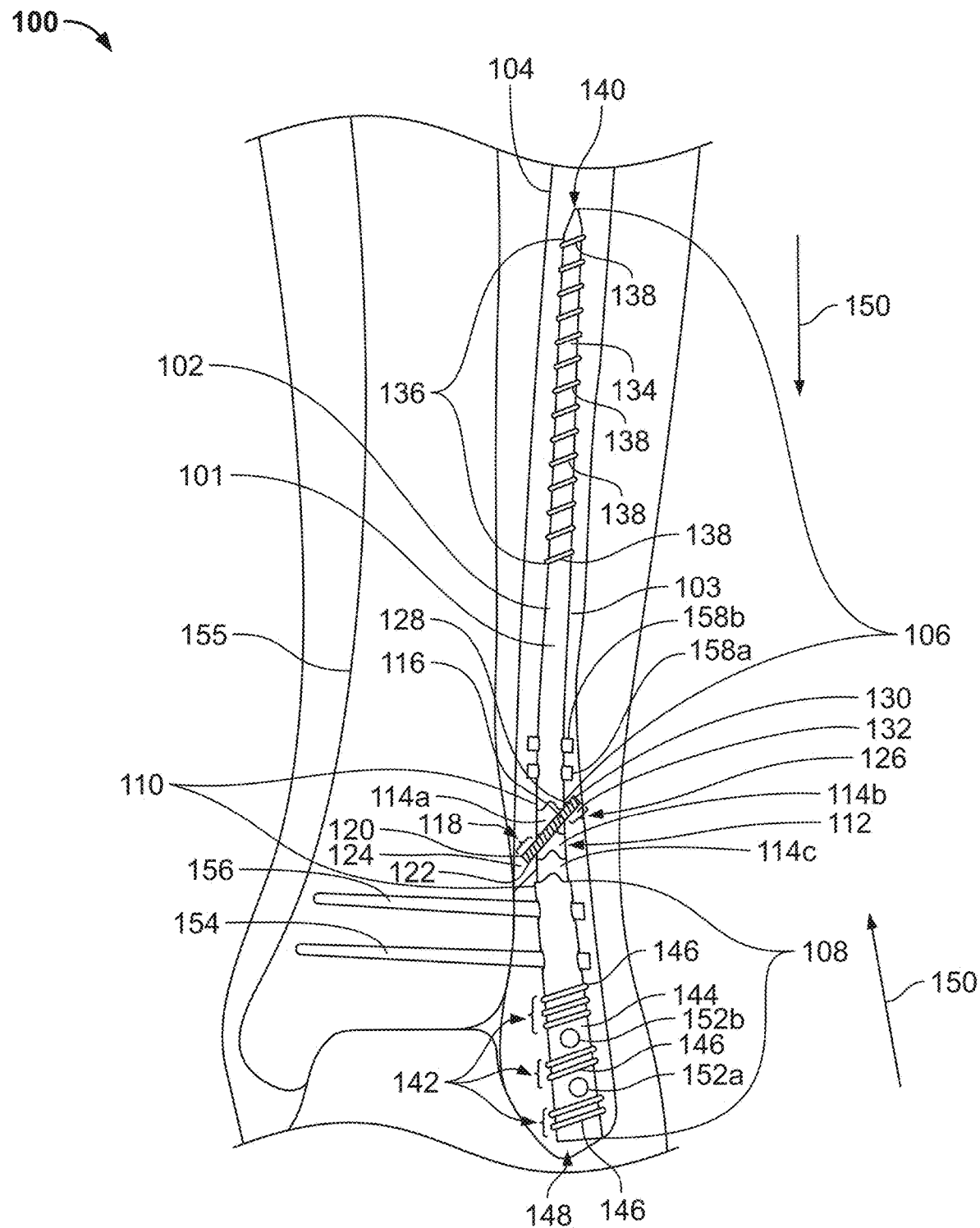
FIG. 1 is a conceptual view of an example intramedullary bone fixation device.

Described herein are devices, systems, and methods that can be used heal bone fractures. With some implementations of the devices, systems, and methods described herein, a minimally invasive, percutaneous procedure can be performed to place an intramedullary bone fixation device, or portion of the device, in an intramedullary space of a bone, such as an intramedullary canal of a bone, for example, and the device can help heal a fracture of the bone. Some implementations of the devices, systems, and methods described herein can be used to help heal a fibula fracture, for example. In some examples, the devices, systems, and methods described herein can be used to heal bone fractures for bones other than the fibula.

Advantages of some implementations of the devices, systems, and methods described herein can include improved adaptability and flexibility to conform to an intramedullary space or canal during placement of the device, and improved fixation or rigidity of the device after placement of the device. Advantages of some implementations of the devices, systems, and methods described herein can include improved adaptability and flexibility at a transformative section of the device to conform to an intramedullary space or canal during placement of the device, and improved fixation or rigidity of the device at the transformative section of the device after placement of the device. Some implementations of the devices, systems, and methods described herein can also provide one or more advantages that can help make the procedure easier to complete, with greater accuracy, and in a shorter time for a surgeon performing the procedure. Some implementations of the devices, systems, and methods described herein can provide an advantage of earlier weight bearing.

Some examples of intramedullary bone fixation devices can include an elongate member having a proximal section, a distal section, and a transformative section that is disposed between the proximal section and the distal section. The transformative section, in some examples, may be capable of flexible movement in a first state and, in some examples, may be secured in a rigid position, or a fixed position, in a second state. In some examples, the transformative section can include a plurality of segments (e.g., two segments, three segments, four segments, five segments, or six or more segments) that can be disposed in a vertical arrangement between the proximal and distal sections of the device. In some examples, the segments may have a shape or structure that allows the segments to interface, attach, or partially interlock with one another, or with a portion of the proximal section or with a portion of the distal section, in a manner that can provide flexible motion or mobility for the transformative section when the transformative section is in a first state, such as a flexible state or mobile state. In some examples, the flexible motion or mobility may be provided in a frontal plane. In some examples, each segment of the plurality of segments may include a male engagement portion and a female engagement portion. In some examples, segments of the transformative section may be attached by engaging the male engagement portion of one segment with the female engagement portion of another segment. In some examples, the male engagement portion may include a pair of male engagement members. In some examples, the male engagement portion may include a single male engagement member. In some examples, the female engagement portion may be adapted to receive or engage a pair of male engagement members. In some examples, the female engagement portion may be adapted to receive or engage a single male engagement member.

In some examples, each segment of the transformative section may include an inner surface of the segment that may define an aperture through a portion of the segment. In some examples, this inner surface may be threaded or may have threads defined on the inner surface. In some examples, the apertures of the segments may be aligned so that a fastener may be inserted through the apertures and may engage with the threads on the inner surfaces of the segments. In some examples, a fastener, such as a screw for example, can include a first set of threads on an outer surface of the fastener, where the first set of fastener threads may be adapted to engage with the threads on the inner surfaces of the segments of the transformative section. In some examples, the fastener may additionally include a second set of threads near a distal end of the fastener and a third sets of threads near a proximal end of the fastener. In some examples, each of the second and third set of fastener threads may have a pitch that is different than a pitch of the first set of threads of the fastener. In some examples, the second set of fastener threads may have a pitch that is the same as a pitch of the third set of fastener threads. In some examples, each of the second and third set of fastener threads may engage with a cortex of a bone in which the device is implanted. The fastener, such as a screw, may thus be screwed, according to some examples, into the aligned apertures of the transformative section segments, with the first set of fastener threads engaging the segments, and may fix the segments in a rigid position, with the second and third set of threads engaging the bone in which the device is implanted. In some examples, this rigid or fixed position may represent a second state of the transformative section. In some examples, the fastener may be a locking screw. In some examples, the fastener may be a screw with a head that includes a receptacle adapted to receive a portion of a tool to drive the screw into place. In some examples, the fastener may be a headless screw. In some examples, the fastener may be a headless compression screw. In some examples, the second set of threads may have a pitch that is different than a pitch of the third set of threads.

In some examples, the proximal section of the device may include a first threaded section on an outside surface of the proximal section. For example, the first threaded section may include threads on an outside surface of the proximal section, and the threads may have a first pitch. In some examples, these threads of the first threaded section may be near a proximal end of the proximal section. In some examples, the distal section of the device may include a second threaded section on an outside surface of the distal section. For example, the second threaded section may include threads on an outside surface of the distal section, and the threads may have a second pitch. In some examples, the second pitch may be different than the first pitch that was associated with the threads on the proximal section. In some examples, the threads of the second threaded section may be near a distal end of the distal section. In some examples, the first and second threaded sections of the proximal and distal sections may each anchor into the bone when the device is implanted, and may provide a compressive force across a bone fracture when the device is placed in an intramedullary space of a bone, according to various implementations. In some examples, the first and second threaded sections of the proximal and distal sections may each anchor into cortices of the bone when the device is implanted, and may provide a compressive force across a bone fracture when the device is placed in an intramedullary space of a bone, according to various implementations.

FIG. 1 is conceptual view 100 of an example intramedullary bone fixation device 101. The device 101 includes an elongate member 102 that is disposed, in this example, generally in an intramedullary canal 103 of a fibula 104, and that includes an example proximal section 106, and example distal section 108, and an example transformative section 110 that is disposed between the proximal section 106 and the distal section 108 of the elongate member 102. In some examples, the device 101 can be used to heal a fracture of the fibula 104, and can be placed as part of a minimally invasive procedure. In some examples, the proximal section 106 may be located proximally of the fracture, and the distal section 108 may be located distally of the fracture.

In some examples, the transformative section 110 can include a plurality of segments 112. The transformative section 110, in some examples, may be capable of flexible movement in a first state, and may be secured in a rigid position, or a fixed position, in a second state. The transformative section 110, in this example, includes a first segment 114a, a second segment 114b, and a third segment 114c, together comprising the plurality of segments 112. The segments 114a, 114b and 114c may generally be arranged in a vertical arrangement between the proximal section 106 and the distal section 108, according to various implementations. In other examples, the plurality of segments 112 of the transformative section 110 can include an alternative number of segments (e.g., two segments, four segments, five segments, or six or more segments).

In some examples, the segments 114a, 114b, 114c may have a shape or structure that allows the segments 114a, 114b, 114c to engage, interface, attach, or partially interlock with one another in a manner that may provide flexible motion or mobility for the transformative section 110 when the transformative section 110 is in the flexible or mobile state. In some examples, the transformative section 110 may be able to flex to provide about 5 degrees of flexibility or motion in a frontal plane when the transformative section 110 is in the flexible or mobile state. In some examples, the transformative section 110 may be able to flex to provide between about 4 degrees and about 6 degrees of flexibility or motion in the frontal plane when the transformative section 110 is in the flexible or mobile state. In some examples, the transformative section 110 may be able to flex to provide between about 3 degrees and about 7 degrees of flexibility or motion in the frontal plane when the transformative section 110 is in the flexible or mobile state. In some examples, the flexibility or mobility of the transformative section 110 when in the flexible or mobile state can assist with conforming device shape to a shape of the intramedullary canal 103 during placement of the device 101. In some examples, the flexibility or mobility of the transformative section 110 when in the flexible or mobile state can assist with conforming device shape to a curved portion of the intramedullary canal 103, for example a distal metaphysis of the fibula 104, during placement of the device 101.

As depicted in FIG. 1, the transformative section 110 is in a rigid or fixed state, which may be considered a second state of the transformative section 110. According to various implementations, an example screw 116 may pass through each of the segments 114a, 114b, 114c of the transformative section 110 and may fix each of the segments 114a, 114b, 114c in a rigid or fixed position. The screw 116 may be referred to as a "transformative screw" 116, in some examples. In some examples, each of the segments 114a, 114b, 114c may include an inner surface that defines an aperture through a portion of the segment, and the transformative screw 116 may pass through the apertures of each of the segments 114a, 114b, 114c. The view 100 of FIG. 1 shows the screw 116 in a cutaway view with respect to the segments 114a, 114b, 114c, as the screw passes through the apertures of the segments 114a, 114b, 114c. In some examples, the transformative screw 116 may be a locking screw. In some examples, a distal section 118 of the transformative screw 116 may include threads 120 on an outer surface of the distal section 118 of the transformative screw 116 near a distal end 122 of the transformative screw 116. The threads 120 on the outer surface of the distal section 118 may anchor in a medial cortex 124 of the fibula 104, according to some implementations. In some examples, a proximal section 126 of the transformative screw 116 may include threads 128 on an outer surface of the proximal section 126 of the transformative screw 116, near a proximal end 130 of the transformative screw 116. The threads 128 on the outer surface of the proximal section 126 may anchor in a lateral cortex 132 of the fibula 104, according to some implementations. In some examples, threads 120, 128 on either end of the transformative screw 116 may respectively anchor the transformative screw 116 in cortices of the fibula 104. In some examples, the transformative screw 116 may have a length that is appropriate to span from an anchoring position in the medial cortex 124 of the fibula 104 to an anchoring position in the lateral cortex 132 of the fibula 104 when the transformative screw 116 is placed through the apertures of the segments 114a, 114b, 114c.

With reference now to proximal section 106, in some examples the proximal section 106 can include, on an outer surface 134 of the proximal section 106, a first threaded section 136. For example, the first threaded section 136 may include threads 138 on the outer surface 134 of the proximal section 106, and the threads 138 may have a proximal section pitch. In some examples, these threads 138 of the first threaded section 136 may be near a proximal end 140 of the proximal section 106. In some examples, the threads 138 of the first threaded section 136 may be self-drilling threads. In some examples, the threads 138 of the first threaded section 136 may be self-tapping threads. In some examples, the threads 138 of the first threaded section 136 may be sized to anchor in cortices of the fibula 104 when the elongate member 102 is disposed in the intramedullary canal 103 of the fibula 104.

In some examples, the distal section 108 of the device 101 may include a second threaded section 142 on an outer surface 144 of the distal section 108. For example, the second threaded section 142 may include threads 146 that may have a distal section pitch. In some examples, the distal section pitch may be different than the proximal section pitch that was associated with the threads 138 of the first threaded section 136 on the proximal section 106. In some examples, the threads 146 of the second threaded section 142 may be near a distal end 148 of the distal section 108. In some examples, the first and second threaded sections 136, 142 of the proximal and distal sections, 106, 108, respectively, may provide a compressive force 150 across a bone fracture when the elongate member 102 of the device 101 is placed in the intramedullary canal 103, according to various implementations. In some examples, the distal section pitch may be the same as the proximal section pitch that was associated with the threads 138 of the first threaded section 136 on the proximal section 106. In some examples, the threads 146 of the second threaded section 142 may be sized to anchor in cortices of the fibula 104 when the elongate member 102 is disposed in the intramedullary canal 103 of the fibula 104.

Figure 2:
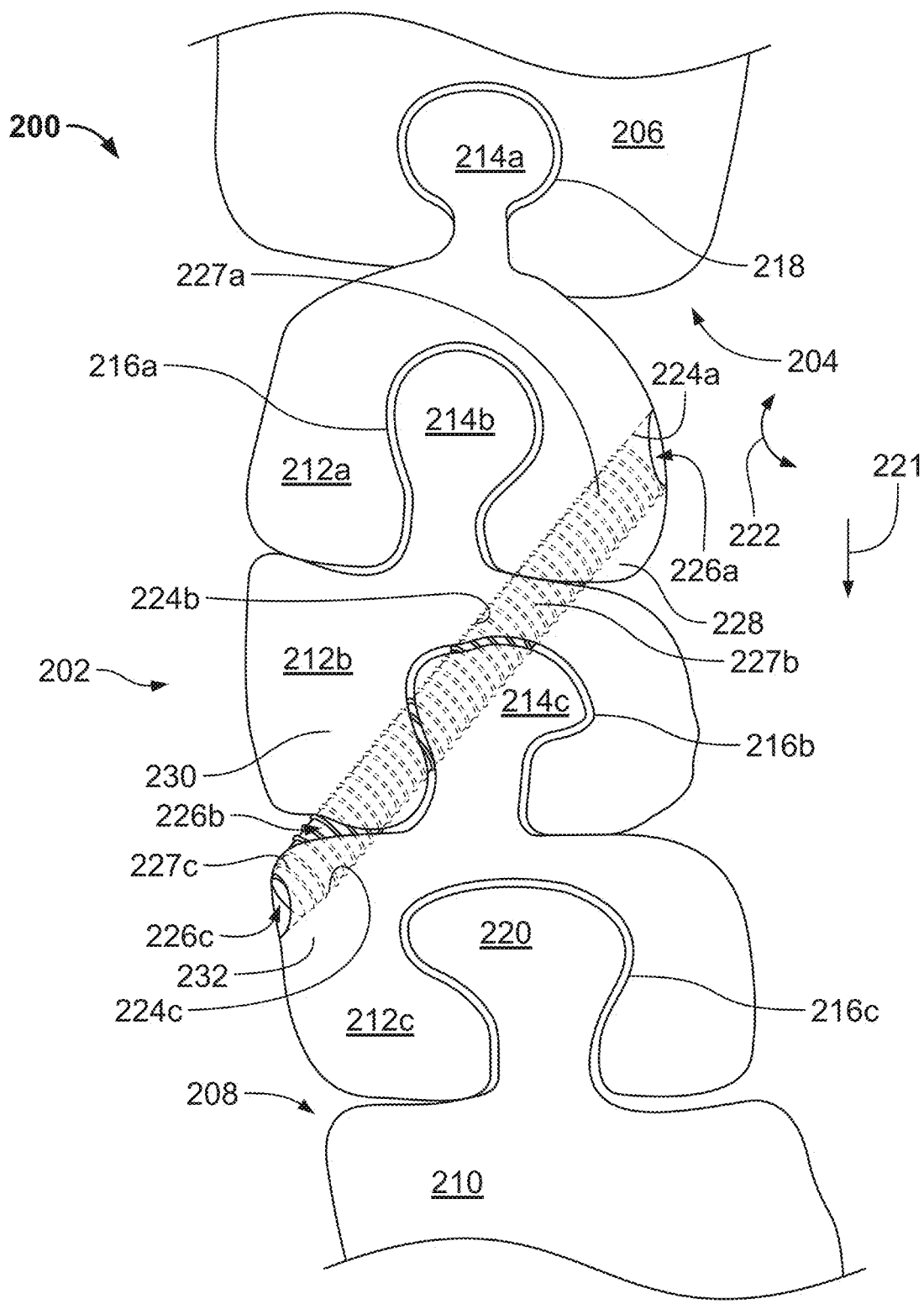
FIG. 2 is a cutaway anterior view of an example transformative section of an example intramedullary bone fixation device.

FIG. 2 is a cutaway anterior view 200 of an example transformative section 202 of an example intramedullary bone fixation device. Also shown in FIG. 2 is an example lower portion 204 of an example proximal section 206 of the device, and an example upper portion 208 of an example distal section 210 of the device. In some examples, the transformative section 202 may correspond to the transformative section 110 of FIG. 1, the proximal section 206 may correspond to the proximal section 106 of FIG. 1, and the distal section 210 may correspond to the distal section 108 of FIG. 1.

The transformative section 202 includes a first segment 212a, a second segment 212b, and a third segment 212c, but in other examples an alternative number of segments (e.g., 2, 4, 5, 6 or more) may be used. According to some implementations, the first segment 212a is engaged with the lower portion 204 of the proximal section 206, the third segment 212c is engaged with the upper portion 208 of the distal section 210, and the second segment 212b is disposed between, and engaged with, the first segment 212a and the third segment 212c.

In some examples, each of the segments 212a, 212b, 212c can include a male engagement portion and a female engagement portion. In the depicted example, the first segment 212a includes a first male engagement portion 214a and a first female engagement portion 216a; the second segment 212b includes a second male engagement portion 214b and a second female engagement portion 216b; and the third segment 212c includes a third male engagement portion 214c and a third female engagement portion 216c. In some examples, the lower portion 204 of the proximal section 206 can include a female engagement portion 218. In some examples, the upper portion 208 of the distal section 210 can include a male engagement portion 220. In some examples, the male engagement portion 214a of the first segment 212a may be received by the female engagement portion 218 of the proximal section 206; the male engagement portion 214b of the second segment 212b may be received by the female engagement portion 216a of the first segment 212a; the male engagement portion 214c of the third segment 212c may be received by the female engagement portion 216b of the second segment 212b; and the male engagement portion 220 of the distal section 210 may be received by the female engagement portion 216c of the third segment 212c. In the depicted example, the male engagement portions 214a, 214b, 214c were located on upper portions of the corresponding segments 212a, 212b, 212c, and the female engagement portions 216a, 216b, 216c were located on lower portions of the corresponding segments 212a, 212b, 212c, but it will be appreciated that in other examples the relative locations of the male and female portions may be swapped so that the male engagement portions may be located on lower portions of the segments 212a, 212b, 212c, and the female engagement portions may be located on upper portions of the segments 212a, 212b, 212c, with the lower portion 204 of the proximal section 206 then including a male engagement portion and the upper portion 208 of the distal section 210 then including a female engagement portion.

In some examples, each of the male engagement portions 214a, 214b, 214c, and 220 may have a bulbous shape, and each of the female engagement portions 218, 216a, 216b, and 216c may have a shape that is adapted to receive the bulbous shape of the male engagement portions 214a, 214b, 214c, and 220. In some examples, the shapes of the male engagement portions 214a, 214b, 214c, and 220 and female engagement portions 218, 216a, 216b, and 216c may be adapted to permit the male engagement portions 214a, 214b, 214c, and 220 to be engaged or received by the female engagement portions 218, 216a, 216b, and 216c, while also being adapted to generally prevent extraction of the male engagement portions 214a, 214b, 214c, and 220 from the female engagement portions 218, 216a, 216b, and 216c in a vertical direction 221 while the portions are engaged.

In some examples, the shapes and sizes of the male engagement portions 214a, 214b, 214c, and 220 and female engagement portions 218, 216a, 216b, and 216c may permit the male engagement portions 214a, 214b, 214c, and 220 to partially pivot or move 222 within spaces defined by the female engagement portions 218, 216a, 216b, and 216c to provide the flexibility or mobility of the transformative section 202. In some examples, the shapes and sizes of the male engagement portions 214a, 214b, 214c, and 220 and female engagement portions 218, 216a, 216b, and 216c may be adapted to permit about 5 degrees of motion in a frontal plane when the transformative section 202 is in the flexible or mobile state. In some examples, the shapes and sizes of the male engagement portions 214a, 214b, 214c, and 220 and female engagement portions 218, 216a, 216b, and 216c may be adapted to permit between about 4 degrees and about 6 degrees of motion in the frontal plane when the transformative section 202 is in the flexible or mobile state. In some examples, the shapes and sizes of the male engagement portions 214*a*, 214*b*, 214*c*, and 220 and female engagement portions 218, 216*a*, 216*b*, and 216*c* may be adapted to permit between about 3 degrees and about 7 degrees of motion in the frontal plane when the transformative section 202 is in the flexible or mobile state. In some examples, the flexibility or mobility of the transformative section when in the flexible or mobile state can assist with conforming device shape to a curved portion of the intramedullary canal, for example a distal metaphysis of the fibula, during placement of the device. In some examples, the male engagement portions 214*a*, 214*b*, 214*c*, and 220 and female engagement portions 218, 216*a*, 216*b*, and 216*c* may have alternative shapes that may provide similar attachment characteristics and flexibility or motion characteristics, as will be further described later herein. In some examples, the transformative section segments 212*a*, 212*b*, and 212*c* may have alternative shapes that may provide similar attachment characteristics and flexibility or motion characteristics, as will be further described later herein.

In some examples, the segments 212*a*, 212*b*, 212*c* of the transformative section 202 may define an aperture through the transformative section 202. For example, inner surfaces of the segments 212*a*, 212*b*, 212*c* may define the aperture through the transformative section 202. In some examples, the inner surfaces of the segments 212*a*, 212*b*, 212*c* may define threads, so that the aperture may be a threaded aperture and may receive a transformative screw, according to various implementations.

In some examples, each of the segments 212*a*, 212*b*, 212*c* may include an inner surface of the segment that may define an aperture through a portion of the segment. In some examples, this inner surface may be threaded or may define threads on the inner surface. In some examples, the first segment 212*a* may include a first inner surface 224*a* that may define a first aperture 226*a* through a portion of the first segment 212*a*. In some examples, the first inner surface 224*a* may define the first aperture 226*a* through a lower portion 228 of the first segment 212*a*. In some examples, the first inner surface 224*a* may include threads 227*a* that may have an inner surface pitch. In some examples, the second segment 212*b* may include a second inner surface 224*b* that may define a second aperture 226*b* through a portion of the second segment 212*b*. In some examples, the second inner surface 224*b* may define the second aperture 226*b* across a middle portion 230 of the second segment 212*b*. In some examples, the second inner surface 224*b* may include threads 227*b* that may have the inner surface pitch. In some examples, the third segment 212*c* may include a third inner surface 224*c* that may define a third aperture 226*c* through a portion of the third segment 212*c*. In some examples, the third inner surface 224*c* may define the third aperture 226*c* across an upper portion 232 of the third segment 212*c*. In some examples, the third inner surface 224*c* may include threads 227*c* that may have the inner surface pitch. In some examples, the threads 227*a*, 227*b*, 227*c* defined by the inner surfaces 224*a*, 224*b*, 224*c* of the segments 212*a*, 212*b*, 212*c* may all have the same inner surface pitch.

In some examples, the apertures 226*a*, 226*b*, 226*c* of the segments 212*a*, 212*b*, 212*c* may be aligned so that a fastener, such as a screw, may be inserted through the apertures 226*a*, 226*b*, 226*c* and may engage with the threads 227*a*, 227*b*, 227*c* defined by the inner surfaces 224*a*, 224*b*, 224*c* of the segments 212*a*, 212*b*, 212*c*.

FIG. 3 is view 300 of an example transformative screw 302. In some examples, the transformative screw 302 may correspond to the transformative screw 116 of FIG. 1. In some examples, the transformative screw 302 may be a locking screw. In some examples, the transformative screw 302 may be used to lock the segments 212*a*, 212*b*, 212*c* of the transformative section 202 of FIG. 2 together. In some examples, the transformative screw 302 may be used to transition the transformative section 202 from a flexible or mobile state to a fixed or rigid state when the transformative screw 302 is placed through the apertures 226*a*, 226*b*, 226*c* of the segments 212*a*, 212*b*, 212*c*.

In some examples, the transformative screw 302 can include a first set of screw threads 304 on an outer surface 306 of the transformative screw 302, where the first set of screw threads 304 may be adapted to engage with the threads 227*a*, 227*b*, 227*c* defined by the inner surfaces 224*a*, 224*b*, 224*c* of the segments 212*a*, 212*b*, 212*c* of the transformative section 202. For example, the first set of screw threads 304 may have the same pitch as the inner surface pitch of the threads 227*a*, 227*b*, 227*c* of the inner surfaces 224*a*, 224*b*, 224*c* of the segments 212*a*, 212*b*, 212*c*. In some examples, the first set of screw threads 304 may be disposed on a middle portion 308 of the transformative screw 302.

In some examples, the transformative screw 302 may additionally include a second set of screw threads 310 on a distal portion 312 of the transformative screw 302, and a third sets of screw threads 314 on a proximal portion 316 of the transformative screw 302. In some examples, each of the second set of screw threads 310 and third set of screw threads 314 may have a pitch that is different than the pitch of the first set of screw threads 304. In some examples, the second set of screw threads 310 may have a pitch that is the same as a pitch of the third set of screw threads 314. In some examples, the second set of screw threads 310 may have a pitch that is different than a pitch of the third set of screw threads 314. In some examples, the distal portion 312 of the transformative screw 302 may taper towards a distal end 318 of the transformative screw 302. In some examples, the distal portion 312 of the transformative screw 302 may taper towards a point at the distal end 318 of the transformative screw 302. In some examples, a proximal end of the transformative screw 302 may include a head that can be used to drive the transformative screw 302. In the depicted example, a head at a proximal end of the transformative screw 302 includes an example star receptacle 317, and a physician may use a star driver to place the transformative screw 302, according to some implementations. In alternative examples, the head of the transformative screw 302 may include a hex receptacle, screwdriver receptacle, or other appropriate tool head receptacle. In some examples, the transformative screw 302 may be a headless screw.

In some examples, the proximal portion 316 of the transformative screw 302 may have a larger diameter than a diameter of the middle portion 308 of the transformative screw 302. In some examples, the proximal portion 316 of the transformative crew 302 may be wider than the middle portion 308 of the transformative screw 302. FIG. 3B is a view 320 of a portion of another example transformative screw 321. Transformative screw 321 may include the same middle portion 308 and distal portion 312 (not shown in FIG. 3B) as the transformative screw 302 of FIG. 3A, according to some examples, and may include an example proximal portion 322 that broadens from a first diameter 324 of the middle portion to a second diameter 326 at a proximal end of the transformative screw 321. In some examples, the second diameter 326 may be larger than the first diameter 324 (e.g., 10% larger, 20% larger, 30% larger, 40% larger, 50% larger). In some examples, the second diameter 326 is about 25% larger than the first diameter 324. In some examples, the proximal section 322 may broaden linearly from the first diameter 324 to the second diameter 326. In some examples, as with transformative screw 302 of FIG. 3A, transformative screw 321 may include the first set of threads 304 on a middle portion of the transformative screw 321 and the second set of screw threads 310 on a distal portion of the transformative screw 321 (not shown in FIG. 3B). In some examples, transformative screw 321 may include a third set of screw threads 327 on a proximal portion of the transformative screw 321. In some examples, each of the second set of screw threads 310 and third set of screw threads 327 may have a pitch that is different than the pitch of the first set of screw threads 304. In some examples, the second set of screw threads 310 may have a pitch that is the same as a pitch of the third set of screw threads 327. In some examples, the second set of screw threads 310 may have a pitch that is different than a pitch of the third set of screw threads 327. In the depicted example, the transformative screw 321 may include a head that can be used to drive the transformative screw 321. In the depicted example, a head at a proximal end of the transformative screw 321 includes an example hex receptacle 328, and a physician may use a hex driver to place the transformative screw 321, according to some implementations. In alternative examples, the head of the transformative screw 321 may include a star receptacle, screwdriver receptacle, or other appropriate tool head receptacle. In some examples, the transformative screw 321 may be a headless compression screw.

Figure 3A:
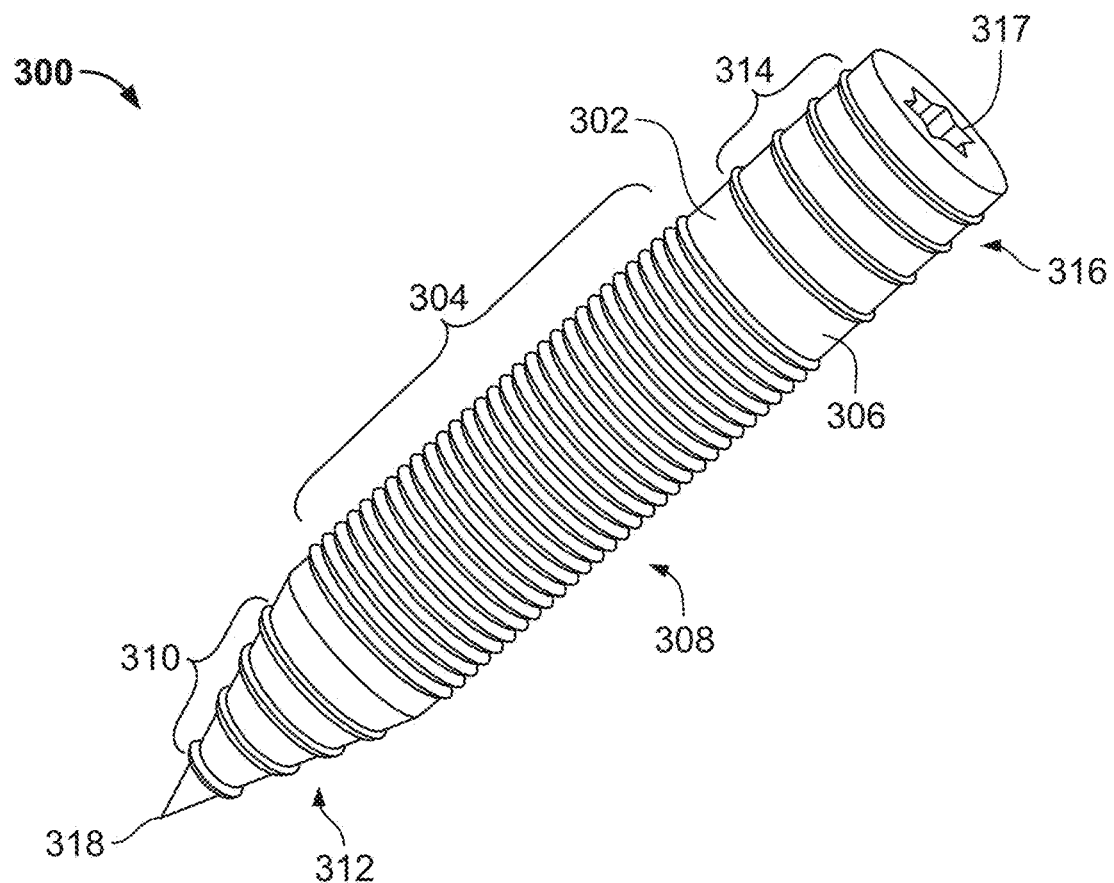
FIG. 3A is view of an example transformative screw.
Figure 3B:
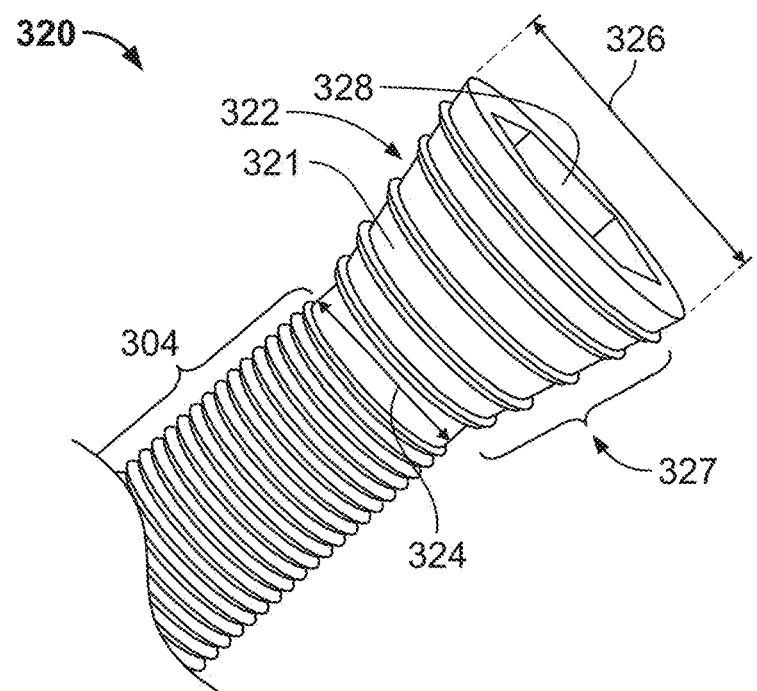
FIG. 3B is a view of a portion of another example transformative screw.
Figure 4:
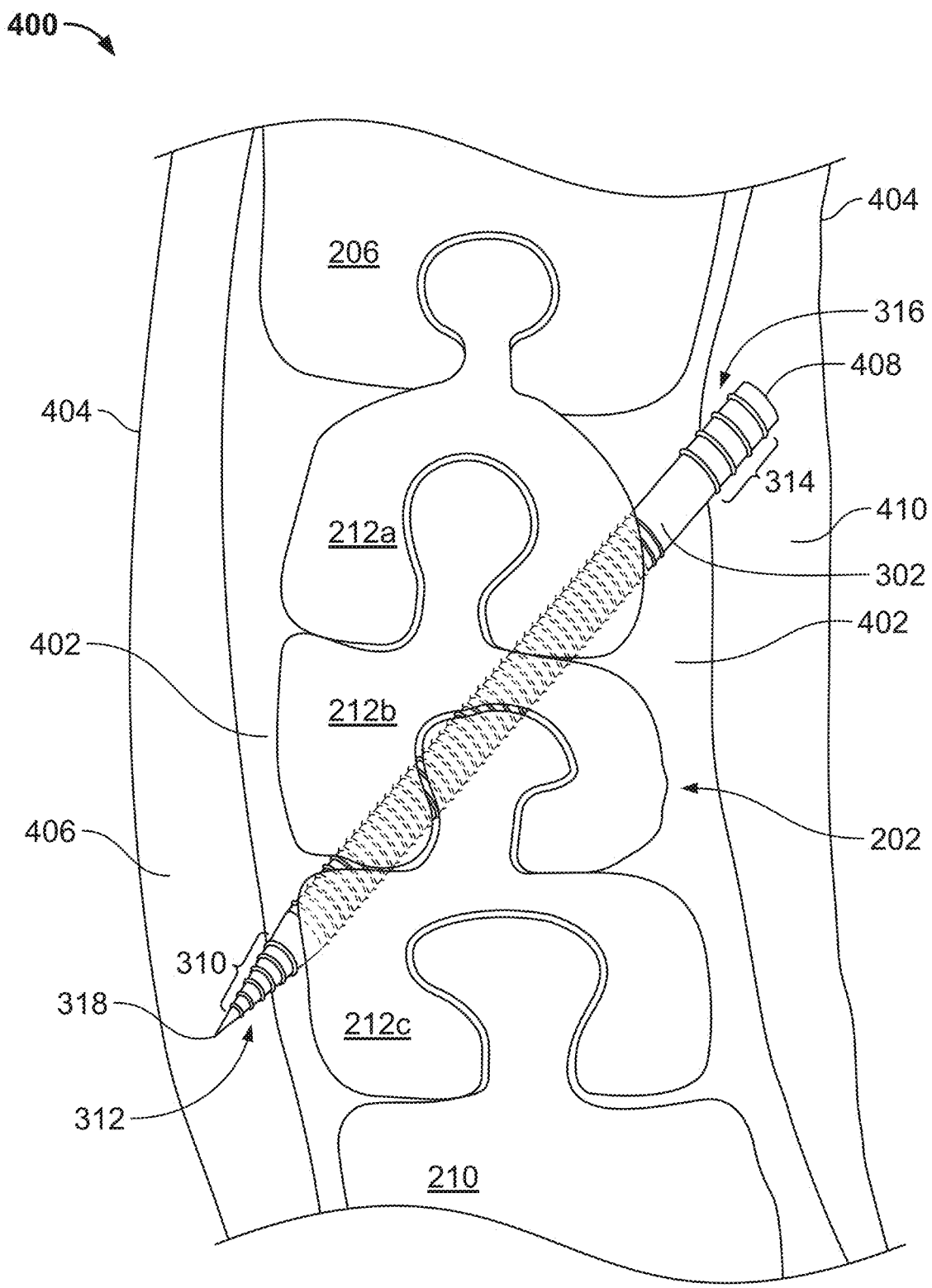
FIG. 4 is a cutaway anterior view of the example transformative section of FIG. 2 and the example transformative screw of FIG. 3A implanted in an intramedullary space of a bone.

FIG. 4 is a cutaway anterior view 400 of the example transformative section 202 of FIG. 2 and the example transformative screw 302 of FIG. 3A implanted in an intramedullary space 402 of a bone 404. In some examples, the bone 404 may be a fibula. In some examples, the distal end 318 and at least a portion of the second set of screw threads 310 of the distal portion 312 of the transformative screw 302 may be anchored in a medial cortex 406 of the bone 404. In some examples, a proximal end 408 and at least a portion of the third set of screw threads 314 of the proximal portion 316 of the transformative screw 302 may be anchored in a lateral cortex 410 of the bone 404. In some examples, each of the second and third sets of screw threads 310, 314 may engage with cortices of a bone in which the device is implanted. In some examples, the transformative screw 302 may have a length that is appropriate to span from an anchoring position in a medial cortex 406 of the bone 404 to an anchoring position in a lateral cortex 410 of the bone 404 when the transformative screw 302 is placed through the apertures 226a, 226b, 226c of the segments 212a, 212b, 212c of the transformative section 202. In some examples, the transformative screw 302 may fix the segments 212a, 212b, 212c in a fixed position when the transformative screw 302 passes through the apertures 226a, 226b, 226c of the segments 212a, 212b, 212c. In some examples, the transformative screw 302 may anchor the transformative section 202 in the bone 404 when the second and third sets of screw threads 310, 314 engage with cortices 406, 410 of the bone 404.

Referring again now to FIG. 1, in addition to the transformative screw 116 through the segments 114a, 114b, 114c of the transformative section 110, six additional screws are depicted through the elongate member 102 of the intramedullary bone fixation device 101. In some examples, a first anterior-to-posterior screw 152a and a second anterior-to-posterior screw 152b, each of which may be locking screws and may be placed in an anterior-to-posterior direction, may pass through the distal section 108 of the elongate member 102 of the device 101. The anterior-to-posterior screws 152a, 152b may be located near the distal end 148 of the distal section 108, and may extend from an anterior cortex of the fibula 104 to a posterior cortex of the fibula 104, according to various implementations. The distal section 108 of the device 101 may include, at locations where the anterior-to-posterior screws 152a, 152b pass through the distal section 108, threaded apertures or apertures that include threads on inner surfaces of the distal section 108 that define the apertures for the anterior-to-posterior screws 152a, 152b to pass through the distal section 108 of the elongate member 102. In some examples, one or both of the anterior-to-posterior screws 152a, 152b may include a head with a tool receptacle (e.g., hex receptacle, star receptacle, screwdriver receptacle, or the like) that can be used, with an appropriate tool, to drive one or both of the anterior-to-posterior screws 152a, 152b into position. In some examples, a single anterior-to-posterior screw 152a or 152b may be used. In some examples, neither of anterior-to-posterior screws 152a nor 152b may be used. In some examples, one or both of the anterior-to-posterior screws 152a, 152b may be non-locking.

In some examples, a non-locking trans-syndesmotic screw 154 may pass through the distal section 108 of the elongate member 102 of the device 101, in a lateral-to-medial direction, and may extend from a lateral cortex of the fibula 104, through a medial cortex of the fibula 104, and through a lateral cortex of a tibia 155 and further into the tibia 155, to help hold the fibula 104 in place with respect to the tibia 155. The distal section 108 of the elongate member 102 of the device 101 may include, at the location where the non-locking trans-syndesmotic screw 154 passes through the distal section 108, a non-threaded aperture or an aperture that does not include threads on an inner surface of the distal section 108 that defines the aperture for the non-locking trans-syndesmotic screw 154 to pass through the distal section 108 of the elongate member 102. In some examples, the non-locking trans-syndesmotic screw 154 may extend to a medial cortex of the tibia 155. In some examples, a locking trans-syndesmotic screw 156 may pass through the distal section 108 of the elongate member 102 of the device 101, in a lateral-to-medial direction, and may extend from a lateral cortex of the fibula 104, through a medial cortex of the fibula 104, and through a lateral cortex of the tibia 155 and further into the tibia 155, to help hold the fibula 104 in place with respect to the tibia 155. The distal section 108 of the device 101 may include, at the location where the locking trans-syndesmotic screw 156 passes through the distal section 108 of the elongate member 102, a threaded aperture or an aperture that includes threads on an inner surface of the distal section 108 that defines the aperture for the locking trans-syndesmotic screw 156 to pass through the distal section 108 of the elongate member 102. In some examples, the locking trans-syndesmotic screw 156 may extend to a medial cortex of the tibia 155. In some examples, one or both of the locking trans-syndesmotic screw 156 and non-locking trans-syndesmotic screw 154 may include a head with a tool receptacle (e.g., hex receptacle, star receptacle, screwdriver receptacle, or the like) that can be used, with an appropriate tool, to drive one or both of the locking trans-syndesmotic screw 156 and non-locking trans-syndesmotic screw 154 into position. In some examples, the non-locking trans-syndesmotic screw 154 may not be used. In some examples, the locking trans-syndesmotic screw 156 may not be used. In some examples, the non-locking trans-syndesmotic screw 154 may be locking. In some examples, the locking trans-syndesmotic screw 156 may be non-locking.

In some examples, a first lateral-to-medial screw 158a and a second lateral-to-medial screw 158b, each of which may be locking screws and may be placed in a lateral-to-medial direction, may pass through the proximal section 106 of the elongate member 102 of the device 101. The lateral-to-medial screws 158a, 158b may be located near a distal end of the proximal section 106, and may extend from the lateral cortex 132 of the fibula 104 to the medial cortex 124 of the fibula 104, according to various implementations. The proximal section 106 of the elongate member 102 of the device 101 may include, at locations where the lateral-to-medial screws 158a, 158b pass through the proximal section 106, threaded apertures or apertures that include threads on inner surfaces of the proximal section 106 that define the apertures for the lateral-to-medial screws 158a, 158b to pass through the proximal section 106 of the elongate member 102. In some examples, one or both of the lateral-to-medial screws 158a, 158b may include a head with a tool receptacle (e.g., hex receptacle, star receptacle, screwdriver receptacle, or the like) that can be used, with an appropriate tool, to drive one or both of the lateral-to-medial screws 158a, 158b into position. In some examples, a single lateral-to-medial screw 158a or 158b may be used. In some examples, neither of lateral-to-medial screws 158a nor 158b may be used. In some examples, one or both of the lateral-to-medial screws 158a, 158b may be non-locking.

Figure 5A:
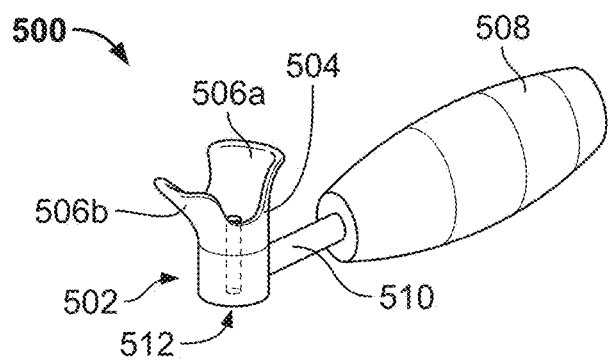
FIG. 5A is a view of an example guide that can be used to prepare an install site for an intramedullary bone fixation device.

In some examples, a fractured bone may be prepped for placement of an elongate member of an intramedullary bone fixation device using an example guide. FIG. 5A is a view 500 of an example guide 502 that can be used to prepare an install site for a an elongate member of an intramedullary bone fixation device, such as any of the elongate members of intramedullary bone fixation devices discussed herein, according to various implementations. In some examples, the guide 502 may be used to externally, outside of a patient's skin, provide a channel that can be used to guide a guidewire, guide pin, or other instrument to prepare a desired target location inside a bone. In some examples, the guide 502 can include a bone apposition port 504 that can be externally placed against, or apposed to, a bone, to position the guide 502 relative to the bone. In some examples, the bone apposition port 504 can include a first positioner 506a and a second positioner 506b, each of which may be used to position the guide 502 with respect to the bone. In some examples, the first positioner 506a and second positioner 506b may be sized and shaped to receive a distal portion of a fibula bone. In some examples, the bone apposition port 504 can include a single positioner, or three or more positioners.

In some examples, the guide 502 may be positioned against the bone using a handle 508, where the handle 508 may be connected to the bone apposition port 504 by a connecting rod 510. In some examples, the guide 502 may be adapted so that a channel 512 that may pass through the bone apposition port 504 may generally align with at least a portion of an intramedullary canal of the bone when the guide 502 is properly positioned with respect to the bone. In some examples, the bone apposition port 504 may define the channel 512. In some examples, a shape of the bone apposition port 504 may be configured to align the channel 512 with a portion of the intramedullary canal of the bone, such as a central or middle portion of the intramedullary canal. In some examples, a shape of the bone apposition port 504 may be configured to align the channel 512 with a portion of the intramedullary canal of the bone, such as a central or middle portion of the intramedullary canal, when a distal portion of the bone is apposed by the bone apposition port 504. In some examples, shapes of the first positioner 506a and second positioner 506b may be configured to align the channel 512 with a portion of the intramedullary canal of the bone, such as a central or middle portion of the intramedullary canal. In some examples, shapes of the first positioner 506a and second positioner 506b may be configured to align the channel 512 with a portion of the intramedullary canal of the bone, such as a central or middle portion of the intramedullary canal, when a distal portion of the bone is apposed by the first positioner 506a and second positioner 506b.

Figure 5B:
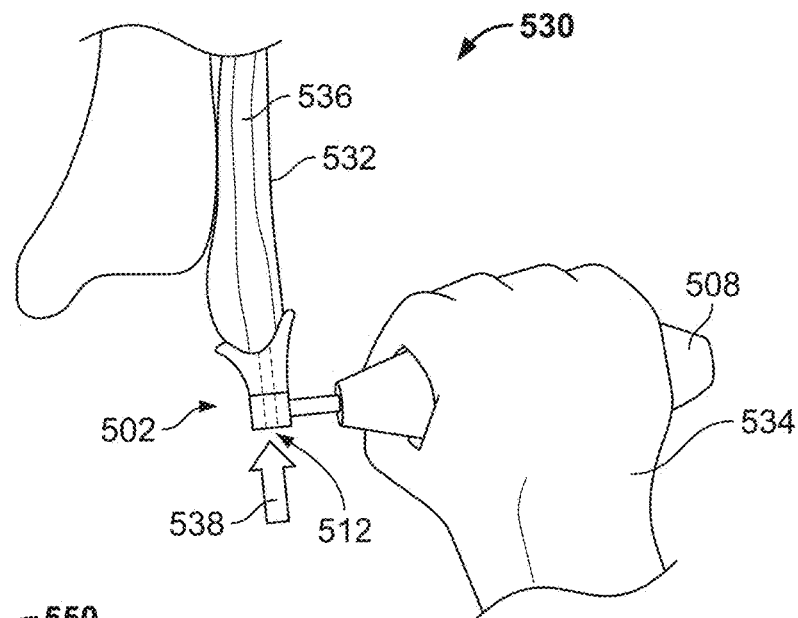
FIG. 5B is a conceptual view of the guide of FIG. 5A being positioned with respect to a bone, such as a fibula.

Prior to prepping a site for an intramedullary bone fixation device, a physician may grip the handle 508 and maneuver the guide 502 so that the bone apposition port 504 is positioned properly with respect to the bone. FIG. 5B is a conceptual view 530 of the guide 502 of FIG. 5A being positioned with respect to a bone, such as a fibula 532. As can be seen in FIG. 5B, a physician 534 is positioning the guide 502 relative to the fibula 532 using the handle 508, so that when the guide 502 is properly positioned, the channel 512 may align with a central or middle portion of an intramedullary canal 536 that may be interior of the fibula 532. Next, an instrument, such as a guidewire, guide pin, or other instrument, may be delivered 538 through the channel 512, through a portion of the fibula 532, and into the intramedullary canal 536 of the fibula 532.

In some examples, the guide 502 may provide advantages, such as permitting accurate targeting with a guidewire so that a guidewire may be properly placed into the intramedullary canal 536, at a proper location and direction, on a first attempt, as compared to potentially driving the guidewire along an incorrect direction, potentially resulting in the guidewire extending outside of the intramedullary canal 536, and potentially requiring multiple attempts to correctly place the guidewire. For example, because the channel 512 of the guide 502 may properly align with the central or middle portion of the intramedullary canal 536 of the fibula 532 when the guide 502 is properly placed relative to the fibula 532, instrument insertion into the intramedullary canal 536 through the channel 512 of the guide 502 may be easier than for procedures where the guide 502 is not used. In some examples, this can save valuable time in the operating room, which can have cost advantages for the patient and can be more convenient, easier, more accurate, faster, and may provide an improved experience for the physician. In some examples, when using the guide 502 to prepare an implant location for an intramedullary bone fixation device, a larger guidewire may be used create a path through cancellous bone in the intramedullary canal, which may permit the physician to avoid separately using a reamer instrument in some examples, as the larger guidewire may be sufficient. This may additionally save time and result in a faster process, as well as potentially also saving cost. In some examples, a 2.5 mm guidewire may be used. In some examples, a 2.8 mm guidewire may be used. In some examples, other appropriate guidewires may be used.

Figure 5C:
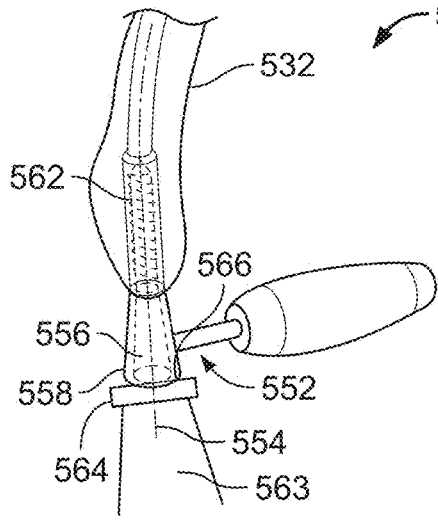
FIG. 5C is a conceptual view of another example guide, an example guidewire, and an example drill bit that may be delivered through an example channel of an example bone apposition port of the guide to an intramedullary canal of a fibula.

After using guide 502 to place a guidewire or guide pin, the physician may drill out a portion of a target implant site, such as a distal portion of a target implant site, using a cannulated drill that may be guided by the already-placed guide wire. FIG. 5C is a conceptual view 550 of another example guide 552, an example guidewire 554, which may have been placed using guide 502 of FIG. 5A, and an example drill 563 may include an example drill bit 562 that may be delivered through an example channel 556 of an example bone apposition port 558 of the guide 552 to the intramedullary canal of the fibula 532. The drill 563 may include an example stop member 564 that may prevent further penetration of the drill bit 562 into the intramedullary canal when the stop member 564 contacts a lower edge 566 of the bone apposition port 558. This may permit the physician to drill out a distal portion of the target implant site, for example. FIG. 5D is a conceptual view of the guide 552 and bone 532 of FIG. 5C following removal of the drill bit 562 of FIG. 5C. As can be seen in FIG. 5D, the drill bit 562 was used to create an enlarged portion 572 of the intramedullary canal for a distal portion of bone fixation device implant, and the guidewire 554 may be removed in preparation for device implant.

In some examples, a single guide may be used to replace the two guides 502, 552 used in FIGS. 5A-5D. FIG. 5E is a view 580 of another example guide 581, and an example guide insert 586 that can be used with the guide 581, to prepare an install site for a an elongate member of an intramedullary bone fixation device, such as any of the elongate members of intramedullary bone fixation devices discussed herein, according to various implementations. In some examples, the guide 581 may be used to externally, outside of a patient's skin, provide a channel that can be used to guide an instrument to prepare a desired target location inside a bone. In some examples, the guide 581 can include a bone apposition port 582 that can be externally placed against, or apposed to, a bone, to position the guide 581 relative to the bone. In some examples, the bone apposition port 582 can include a first positioner 506a and a second positioner 506b, each of which may be used to position the guide 581 with respect to the bone. In some examples, the first positioner 506a and second positioner 506b may be sized and shaped to receive a distal portion of a fibula bone. In some examples, the bone apposition port 582 can include a single positioner, or three or more positioners.

In some examples, the guide 581 may be positioned against the bone using a handle 584, where the handle 584 may be connected to the bone apposition port 582 by a connecting rod 585. In some examples, the guide 581 may be adapted so that a channel 583 that may pass through the bone apposition port 582 may generally align with at least a portion of an intramedullary canal of the bone when the guide 581 is properly positioned with respect to the bone. In some examples, the bone apposition port 582 may define the channel 583. In some examples, a shape of the bone apposition port 582 may be configured to align the channel 583 with a portion of the intramedullary canal of the bone. In some examples, a shape of the bone apposition port 582 may be configured to align the channel 583 with a portion of the intramedullary canal of the bone when a distal portion of the bone is apposed by the bone apposition port 582. In some examples, shapes of the first positioner 506a and second positioner 506b may be configured to align the channel 583 with a portion of the intramedullary canal of the bone. In some examples, shapes of the first positioner 506a and second positioner 506b may be configured to align the channel 583 with a portion of the intramedullary canal of the bone when a distal portion of the bone is apposed by the first positioner 506a and second positioner 506b. In some examples, the insert 586 may define a narrower channel 587 through the insert 586, and the insert 586 may be placed inside the channel 583 of the bone apposition port 582 to provide a narrower channel to a portion, such as a central or middle portion, of the intramedullary canal.

Prior to prepping a site for an intramedullary bone fixation device, a physician may grip the handle 584 and maneuver the guide 581 so that the bone apposition port 582 is positioned properly with respect to the bone. FIG. 5E is a conceptual view 590 of the guide 581 of FIG. 5E being positioned with respect to a bone, such as the fibula 532 of FIG. 5B. In this example, the insert 586 is not being used with guide 581. As can be seen in FIG. 5E, the physician 554 is positioning the guide 581 relative to the fibula 532 using the handle 584, so that when the guide 581 is properly positioned, the channel 583 may align with the intramedullary canal 536 that may be interior of the fibula 532. If insert 586 were to be inserted into the bone apposition port 582, the insert 586 may define a channel 587 through the insert to a central or middle portion of the intramedullary canal, such as the dashed lines shown in FIG. 5B. A guidewire or guide pin may be delivered through the channel 587 of the insert 586, in a similar manner as was described above with reference to FIG. 5B. Next, the physician may remove the insert 586 from the bone apposition port 582, which may leave the channel 583 through the bone apposition port 582, and then may deliver 591 an instrument, such as a drill bit or other instrument, through the channel 583, through a portion of the fibula 532, and into the intramedullary canal 536 of the fibula 532.

Figure 6:
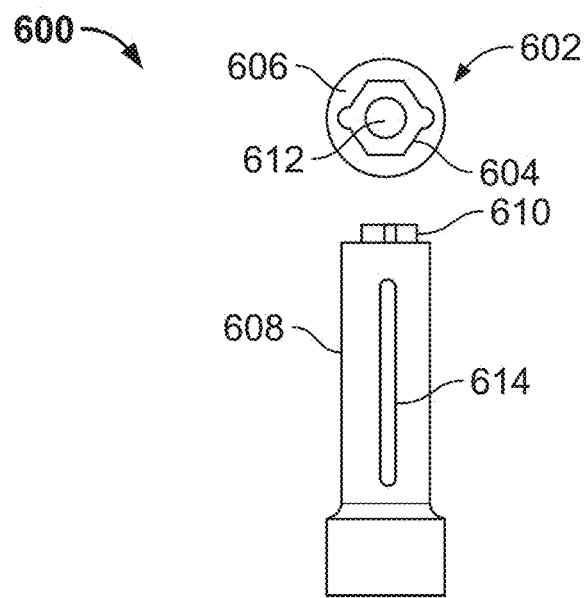
FIG. 6 is a view of an example base of an example elongate member, and an example driver shaft.

Referring again to FIGS. 5D and 5F, in some examples, an example elongate member of an example intramedullary bone fixation device may be delivered through the channel 556 or 583 of the guide 502 or 581, and may be driven or screwed into place (e.g., at an implant location) in the intramedullary canal 536 of the fibula 532. FIG. 6 is a view 600 of an example head 602 of an example elongate member, and an example driver shaft 608. In some examples, the head 602 may be located at a distal end of the elongate member of an intramedullary bone fixation device, such as elongate member 102 of FIG. 1. In some examples, the head 602 can include a tool interface receptacle 604, which may be a shaped space recessed from a surface 606 of the head 602, and which may be used to interface with a tool. In some examples, a tool, such as a driver shaft, a jig, or other appropriate tool, may include a mating interface element, so that the tool may be used to engage the tool interface receptacle 604 of the head 602. In various implementations, the tool interface receptacle 604 may have any appropriate shape. In some examples, the example driver shaft 608 may include a mating interface element 610 that can be sized and shaped to engage with the tool interface receptacle 604 of the elongate member head 602 when the mating interface element 610 is mated to the tool interface receptacle 604. In some examples, the mating interface element 610 may interlock with the tool interface receptacle 604 of the head 602. In some examples, the mating interface element 610 may define an orifice through the element 610, and a portion of a tool such as a screwdriver, hex driver, star driver, t-handle driver or other appropriate tool may be delivered through the orifice of the mating interface element 610.

In some examples, a screwdriver, hex driver, star driver, t-handle driver or other appropriate tool may be used with the driver shaft 608 to drive the elongate member of the intramedullary bone fixation device into place in the intramedullary canal. In some examples, the tool interface receptacle 604 and elongate member may define an orifice 612, and the elongate member may define a chamber, internal of the elongate member and accessible via the orifice 612. In some examples, the chamber may include a threaded surface of the chamber, where the threaded surface of the chamber may be engaged by threads of an appropriate tool, according to various implementations, as will be discussed further below with reference to FIGS. 8A and 8C. In some examples, the chamber may also include a head with a driver interface, where the driver interface may be adapted to receive a tool such as a screwdriver, a hex driver, a star driver, a t-handle driver or other appropriate tool that may be used to drive or screw the elongate member into place, for example at a target implant location, within the intramedullary canal. In various implementations, a physician may insert an appropriate tool (e.g., a screwdriver, a hex driver, a star-driver, a t-handle driver, or the like) through the driver shaft 608, through the orifice 612 in the head 602, into the chamber, and engage the head internal of the chamber with the driver interface to drive or screw the elongate member to an appropriate implant location within the intramedullary canal.

In some examples, the threads on the proximal section of the elongate member, which may be self-drilling and self-tapping, may drill through cancellous bone within the intramedullary canal as the elongate member is being screwed or driven into place, and may bite into cortical bone within the fibula as the elongate member is screwed into place. In some examples, the driver shaft 608 can include a window or slot 614 through which a marking, such as a laser line or other appropriate marking on the screwdriver, hex driver, star driver, t-handle driver, or other appropriate tool can be viewed, for example to assess an insertion depth of the elongate member of the intramedullary bone fixation device.

Figure 7:
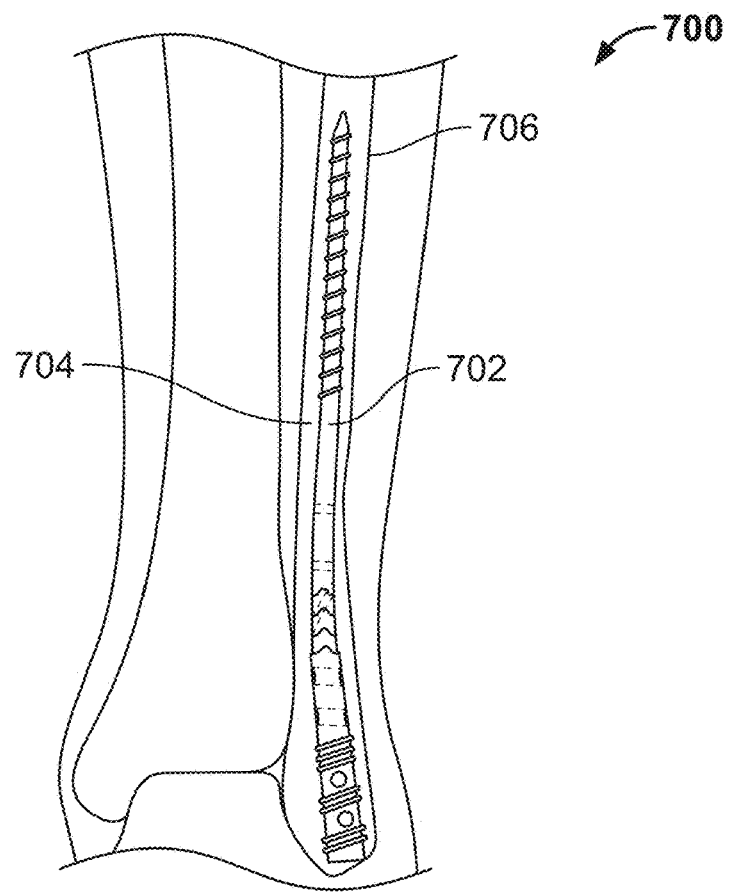
FIG. 7 is a conceptual view of an example elongate member of an example intramedullary bone fixation device positioned in an intramedullary canal of a fibula.

FIG. 7 is a conceptual view 700 of an example elongate member 702 of an example intramedullary bone fixation device positioned in an intramedullary canal 704 of a fibula 706. In some examples, the elongate member 702 of the intramedullary bone fixation device can be placed in the depicted position as described above. In some examples, the elongate member 702 may represent the elongate member 102 of the intramedullary bone fixation device 101 of FIG. 1.

Figure 8A:
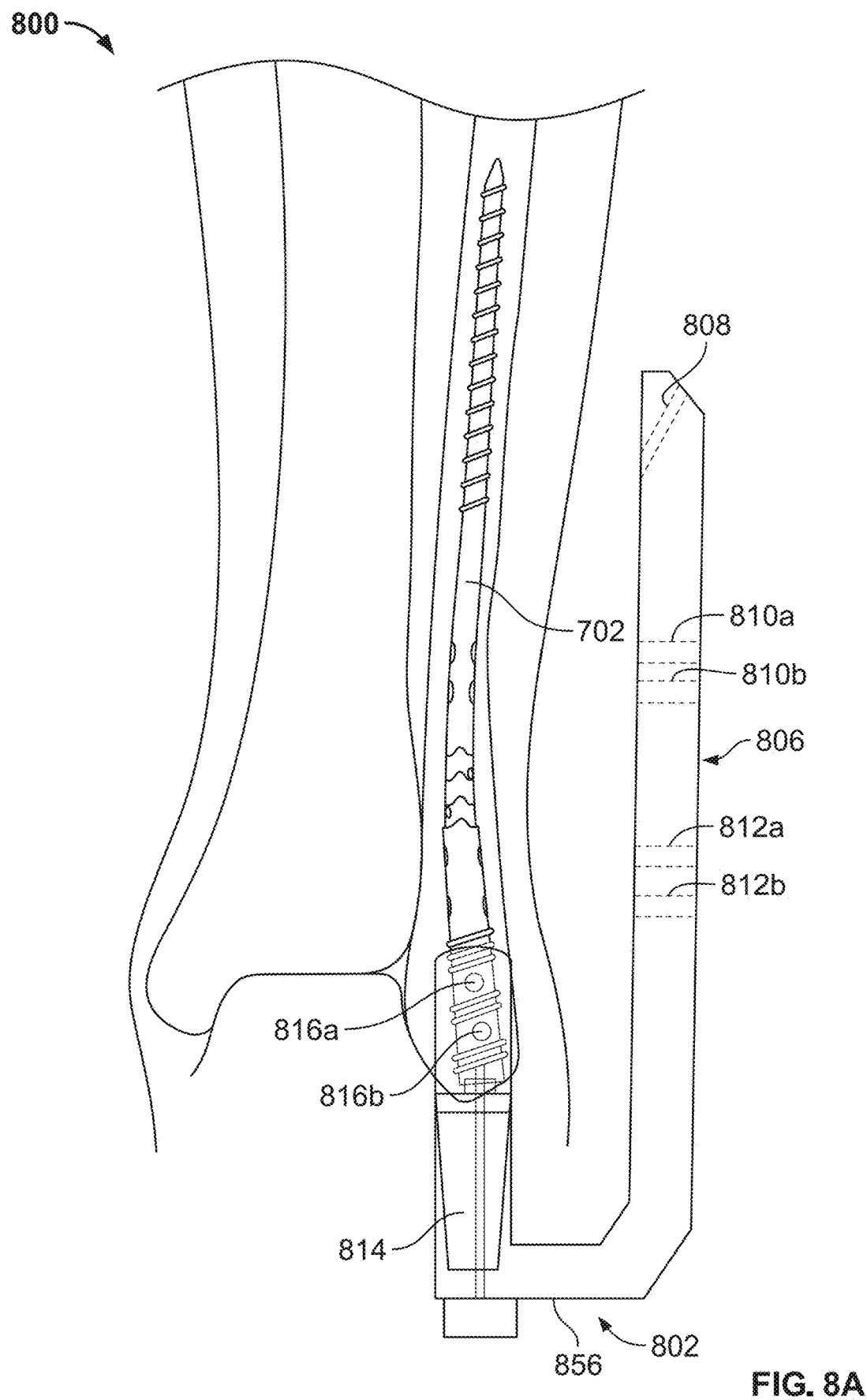
FIGS. 8A, 8B, and 8C are conceptual views that depict an example jig and associated hardware that can be used to install one or more screws through the example elongate member of FIG. 7.
Figure 8B:
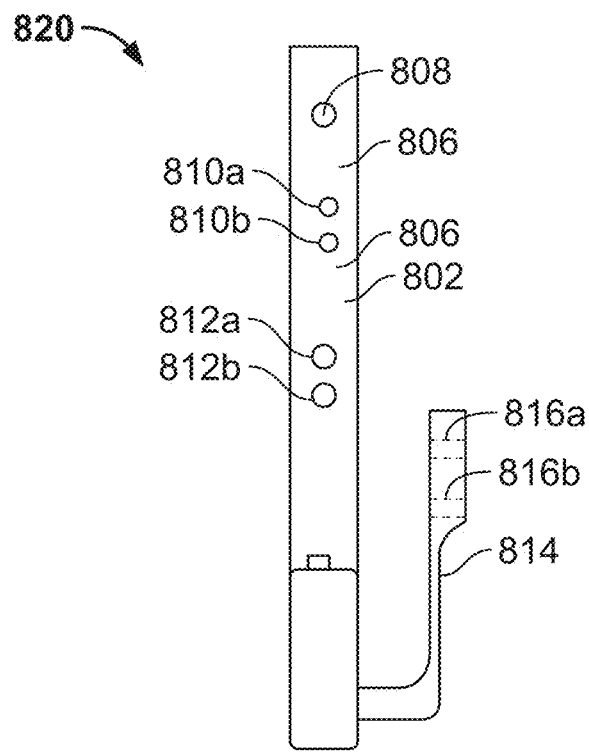
Figure 8C:
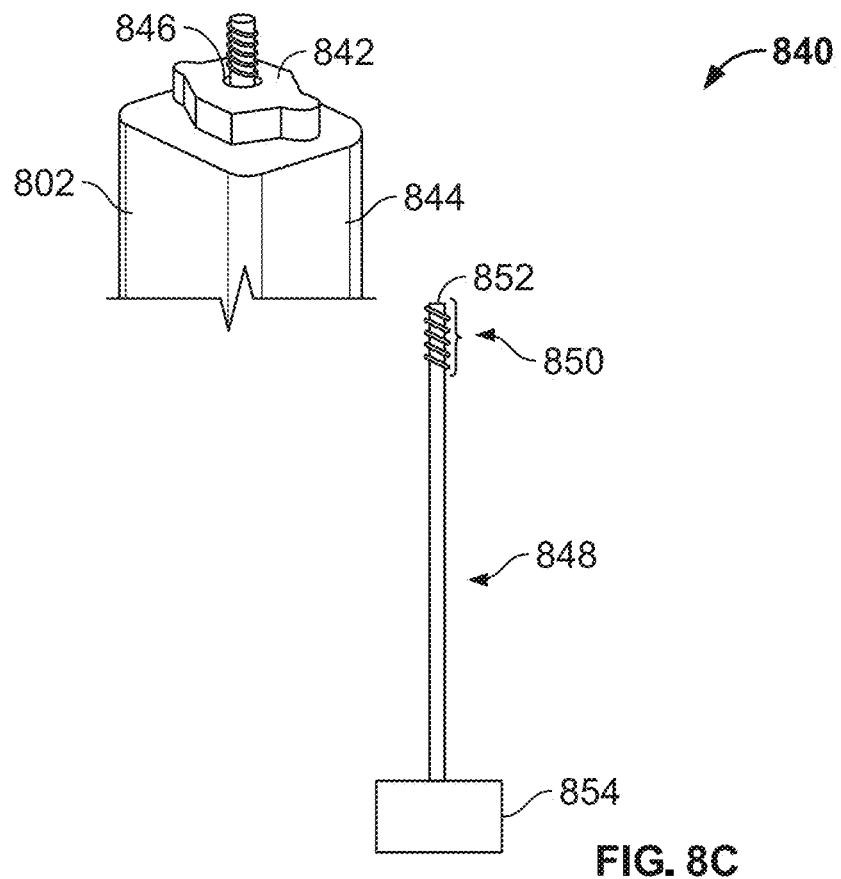

In some examples, after the elongate member of the a bone fixation device has been placed at a target implant location in an intramedullary canal of a bone, the driver shaft 608 may be disengaged from the head 602 of the elongate member, and a jig may be attached to the elongate member and used to place one or more screws through the elongate member. FIGS. 8A, 8B and 8C are conceptual views 800, 820, and 840, respectively, that show an example jig 802 and associated hardware that can be used, in some examples, to install one or more screws through the example elongate member 702 of FIG. 7. In a similar manner as the driver shaft 608 of FIG. 6 was attached to the base 602 of the elongate member, the jig 802 may include a mating interface element 842 that can be used to engage the tool interface receptacle 604 of the base 602 of the elongate member 702, according to some examples. In some examples, the mating interface element 842 of the jig 802 may be attached to a support member 844 that may be built into the jig 802. In some examples, the support member 844 may define an aperture through the tool support member 844, and the mating interface element 842 may also include an aperture 846 through the mating interface element 842 that may align with the aperture through the tool support member 844. When the mating interface element 842 of the jig 802 is inserted into the tool interface receptacle 604 of the base 602 of the elongate member 702, a jig-attachment rod 848 may be inserted from below through the aperture in the support member 844 and through the aperture 846 in the mating interface element 842 of the jig 802, according to various implementations. In some examples, the jig-attachment rod 848 may include a threaded section 850 near a proximal end 852 of the jig-attachment rod 848, and may include a stop element 854 at a distal end of the jig-attachment rod 848. FIG. 8C shows the jig-attachment rod 848 inserted from below through the aperture in the support member 844 and through the aperture 846 in the mating interface element 842 of the jig 802, with the threaded section 850 of the jig-attachment rod 848 protruding proximal of the mating interface element 842 of the jig 802. In some examples, the threaded section 850 of the jig-attachment rod 848 may be screwed into the threads within the chamber interior of the elongate member until the stop element 854 contacts a lower surface 856 of the jig 802, thereby securely attaching the jig 802 to the implanted elongate member 702, and properly orienting, via the tool interface receptacle 604 and mating interface element 842 engagement, the jig 802 with respect to the implanted elongate member 702, according to various implementations.

Figure 8D:
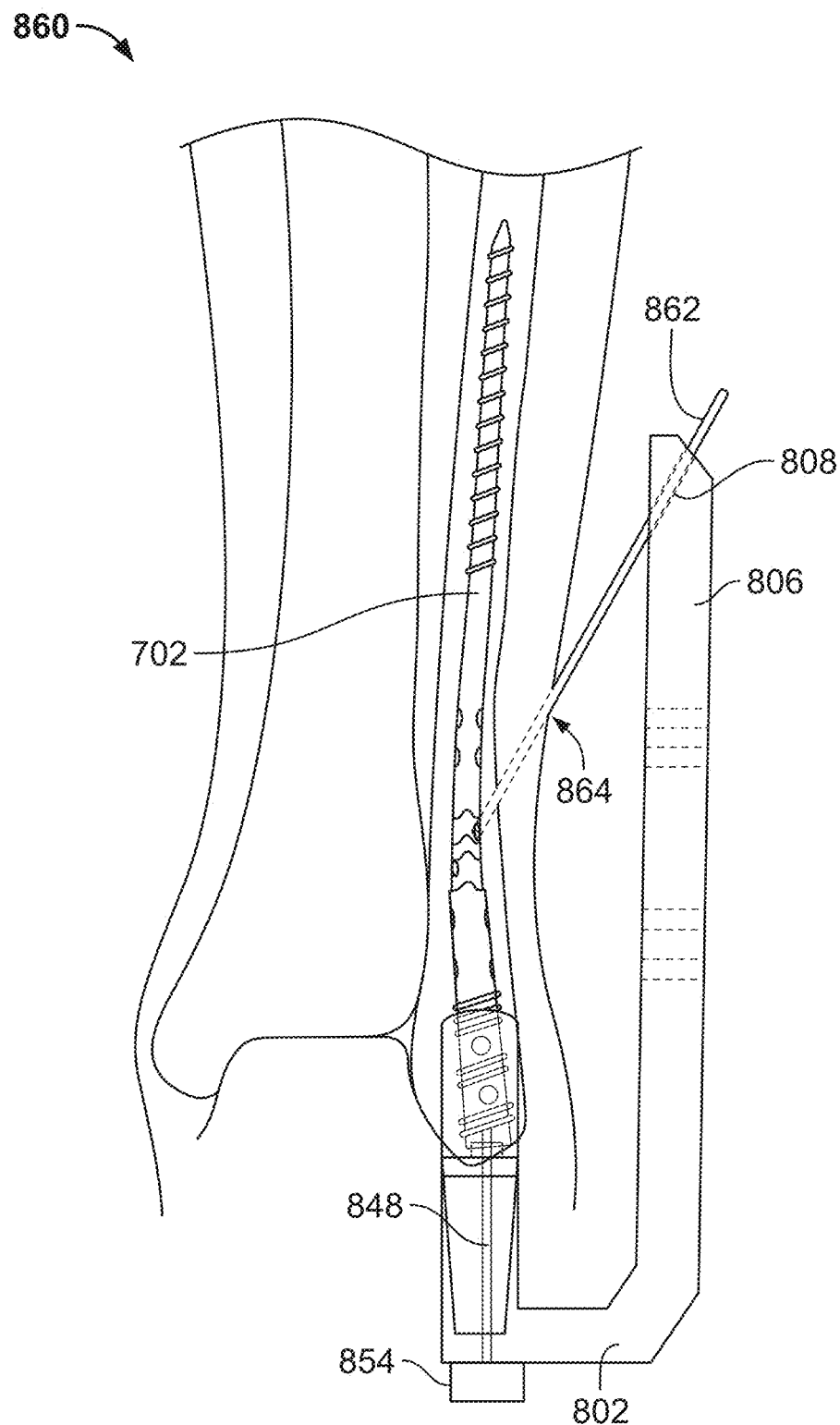
FIG. 8D is a conceptual view of the jig of FIGS. 8A-8C, the elongate member of FIG. 7, and an example cannula that can be used to place a screw through the elongate member.

In some examples, the jig 802 may include a first arm 806 that may define a first aperture 808 through the first arm 806 of the jig 802. In some examples, the first aperture 808 may be used to place a transformative screw that may pass through the segments of the transformative section of the elongate member, such as transformative screw 116 of FIG. 1 or transformative screws 302 or 321 of FIGS. 3A and 3B. FIG. 8D is a conceptual view 860 of the jig 802 of FIGS. 8A-8C, the elongate member 702 of FIG. 7, and an example cannula 862 that can be used to place a screw through the elongate member 702. As can be seen in FIG. 8D, the jig 802 is attached to the elongate member 702 via the jig attachment rod 848, where the jig 802 is oriented with respect to the elongate member 702 via engagement of the tool interface receptacle 604 of the base 602 of the elongate member 702 and the mating interface element 842 of the jig 802. A physician may make a small incision in a patient's skin at an incision location 864 for the transformative screw, and can then place the cannula 862 through the first aperture 808 in the jig 802, and through the incision in the patient's skin at the incision location 864. The first aperture 808 in the jig 802 is adapted to align with the apertures through the segments of the transformative section of the elongate member 702, such as apertures 226a, 226b, and 226c of the segments 212a, 212b, and 212c of the transformative section 202 of FIG. 2, when the jig 802 is attached and aligned with the elongate member 702. The physician may then use a drill to drill through the cannula 862 and through the fibula to reach the aperture 226a of the first segment 212a, for example, and may the deliver a transformative screw, such as transformative screw 302 of FIG. 4, through the cannula 862, and may screw the transformative screw 302 into the apertures 226a, 226b, and 226c of the segments 212a, 212b, and 212c of the transformative section 202.

Figure 8E:
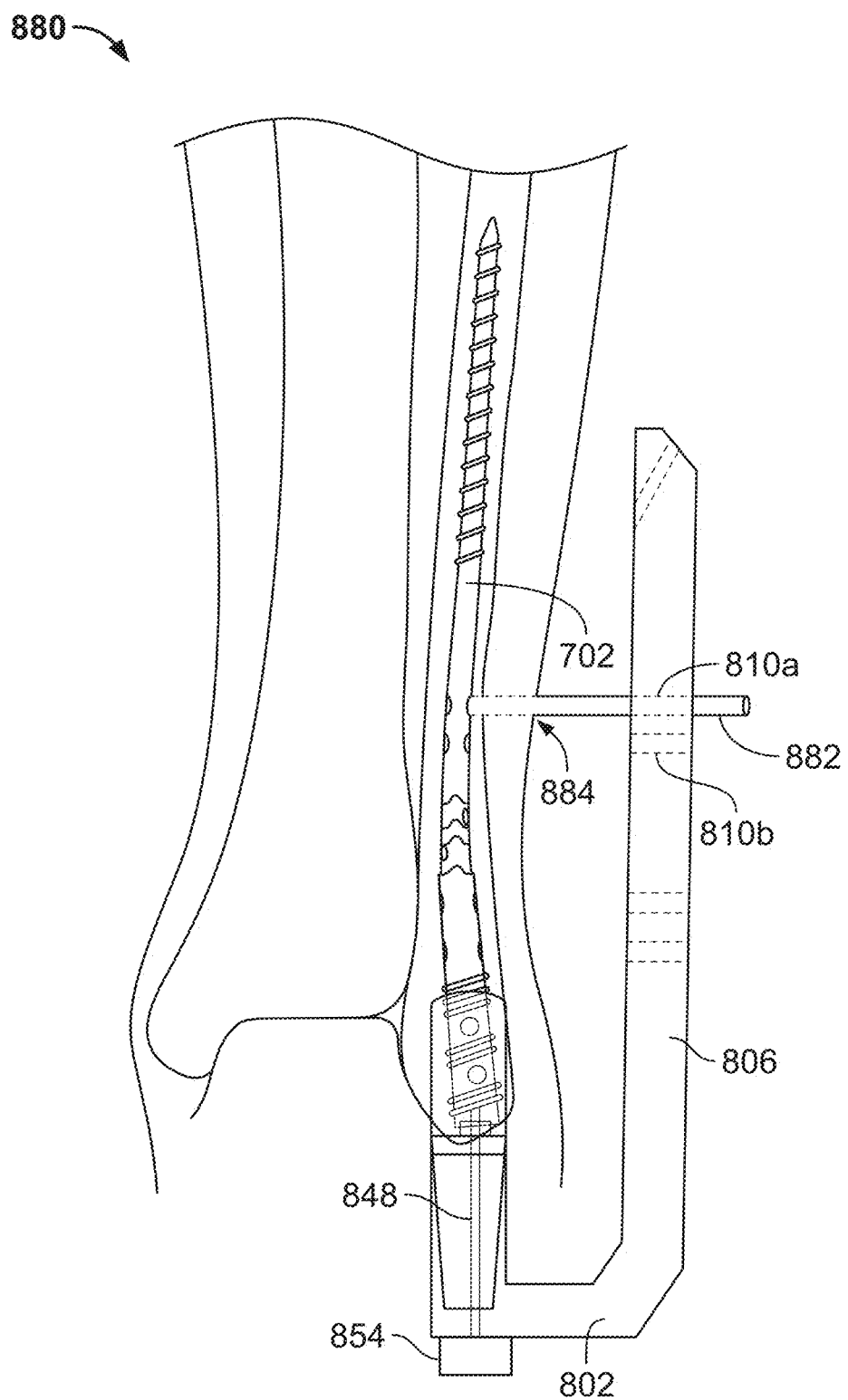
FIG. 8E is a conceptual view of the jig of FIGS. 8A-8C, the elongate member of FIG. 7, and an example cannula that can be used to place another screw through the elongate member.

In some examples, the first arm 806 of the jig 802 may also define second and third apertures 810a and 810b through the first arm 806 of the jig 802. In some examples, the second and third apertures 810a and 810b may be used to place screws that may pass through the proximal section of the elongate member in a lateral-to-medial direction, such as the lateral-to-medial screws 158b and 158a of FIG. 1. FIG. 8E is a conceptual view 880 of the jig 802 of FIGS. 8A-8C, the elongate member 702 of FIG. 7, and an example cannula 882 that can be used to place a screw through the elongate member 702. As can be seen in FIG. 8E, the jig 802 is attached to the elongate member 702 via the jig attachment rod 848, where the jig 802 is oriented with respect to the elongate member 702 via engagement of the tool interface receptacle 604 of the base 602 of the elongate member 702 and the mating interface element 842 of the jig 802. The physician may make a small incision in a patient's skin at an incision location 884 for one or both of the lateral-to-medial screws through the proximal section of the elongate member 702, and can then place the cannula 882 through the second aperture 810a in the jig 802, and through the incision in the patient's skin at the incision location 884. The second aperture 810a in the jig 802 may be adapted to align with the aperture to receive the lateral-to-medial screw 158b of FIG. 1 through the proximal section of the elongate member 702 when the jig 802 is attached and aligned with the elongate member 702. The physician may then use a drill to drill through the cannula 882 and through the fibula to reach the aperture through the proximal section of the elongate member 702, for example, and may the deliver a lateral-to-medial screw, such as the lateral-to-medial screw 158b of FIG. 1, through the cannula 882, and may screw the lateral-to-medial screw 158b into the aperture of the proximal section of the elongate member. In a similar manner, the physician may place the cannula 882 through the third aperture 810b of the jig 802, and may place the lateral-to-medial screw 158a through the proximal section of the elongate member 702.

Figure 8F:
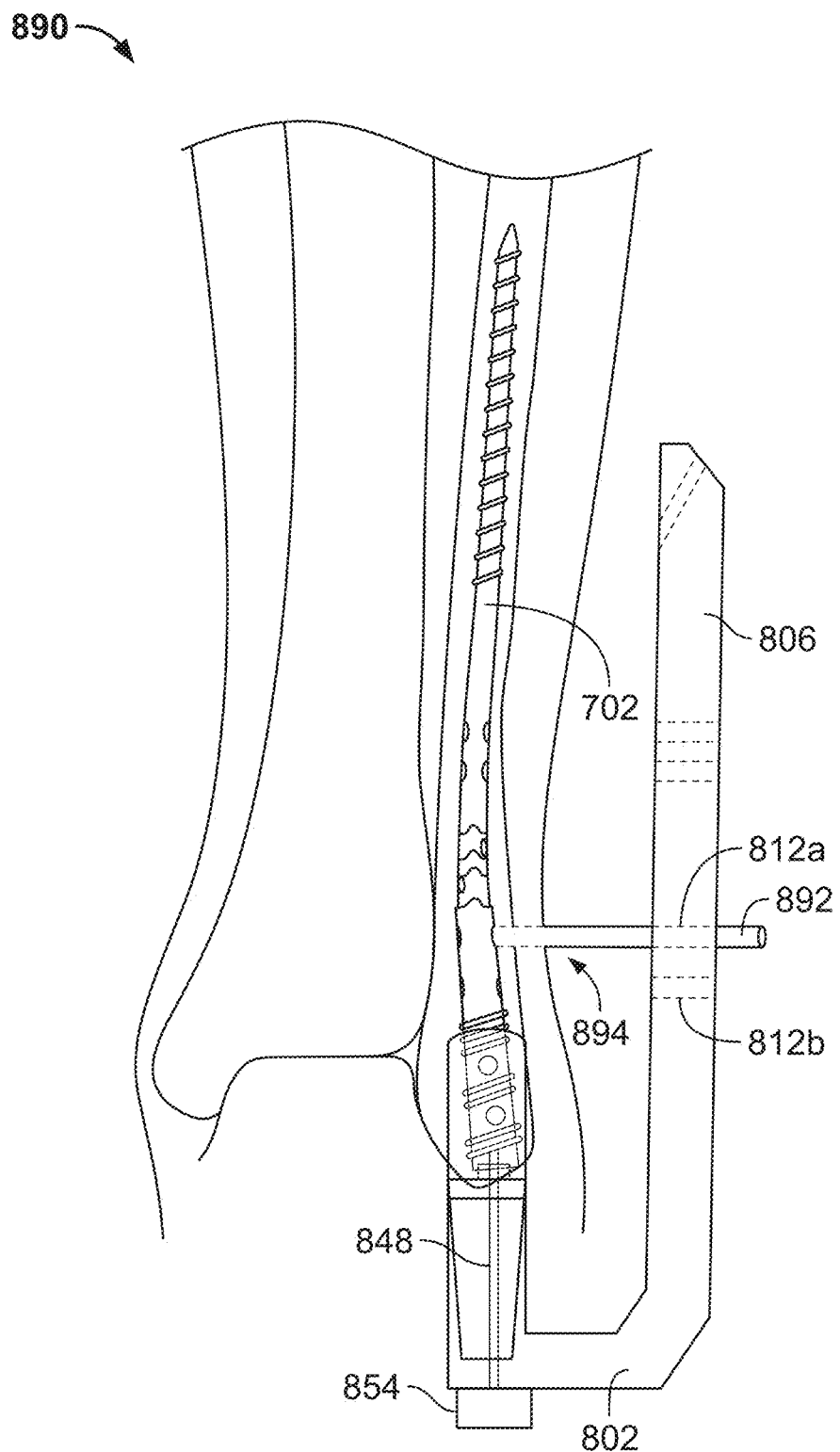
FIG. 8F is a conceptual view of the jig of FIGS. 8A-8C, the elongate member of FIG. 7, and an example cannula that can be used to place another screw through the elongate member.

In some examples, the first arm 806 of the jig 802 may further define fourth and fifth apertures 812a and 812b through the first arm 806 of the jig 802. In some examples, the fourth and fifth apertures 812a and 812b may be used to place screws that may pass through the distal section of the elongate member in a lateral-to-medial direction, such as the locking trans-syndesmotic screw 156 and the non-locking trans-syndesmotic screw 154 of FIG. 1. FIG. 8F is a conceptual view 890 of the jig 802 of FIGS. 8A-8C, the elongate member 702 of FIG. 7, and an example cannula 892 that can be used to place a screw through the elongate member 702. As can be seen in FIG. 8F, the jig 802 is attached to the elongate member 702 via the jig attachment rod 848, where the jig 802 is oriented with respect to the elongate member 702 via engagement of the tool interface receptacle 604 of the base 602 of the elongate member 702 and the mating interface element 842 of the jig 802. The physician may make a small incision in a patient's skin at an incision location 894 for one or both of the trans-syndesmotic screws through the distal section of the elongate member 702, and can then place the cannula 892 through the fourth aperture 812a in the jig 802, and through the incision in the patient's skin at the incision location 894. The fourth aperture 812a in the jig 802 may be adapted to align with the aperture to receive the locking trans-syndesmotic screw 156 of FIG. 1 through the distal section of the elongate member 702 when the jig 802 is attached and aligned with the elongate member 702. The physician may then use a drill to drill through the cannula 892 and through the fibula to reach the aperture through the distal section of the elongate member 702, for example, and may the deliver a locking trans-syndesmotic screw, such as the locking trans-syndesmotic screw 156 of FIG. 1, through the cannula 892, and may screw the locking trans-syndesmotic screw 156 into the aperture of the distal section of the elongate member. In a similar manner, the physician may place the cannula 892 through the fifth aperture 812b of the jig 802, and may place the non-locking trans-syndesmotic screw 154 through the distal section of the elongate member 702.

In some examples, the jig 802 may also include a second arm 814 that may define sixth and seventh apertures 816a and 816b through the second arm 814 of the jig 802. In some examples, the sixth and seventh apertures 816a and 816b may be used to place screws that may pass through the distal section of the elongate member 702 in an anterior-to-posterior direction, such as the anterior-to-posterior screws 152b and 152a of FIG. 1. In a similar manner as described above with reference to FIG. 8E and delivering the screws 158b and 158a, the physician may make a small incision in a patient's skin at an incision location for one or both of the anterior-to-posterior screws 152b, 152a through the distal section of the elongate member 702, and can then place a cannula through the sixth aperture 816a in the jig 802, and through the incision in the patient's skin at the incision location. The sixth aperture 816a in the jig 802 may be adapted to align with the aperture to receive the anterior-to-posterior screw 152b of FIG. 1 through the distal section of the elongate member 702 when the jig 802 is attached and aligned with the elongate member 702. The physician may then use a drill to drill through the cannula and through the fibula to reach the aperture through the distal section of the elongate member 702, for example, and may the deliver an anterior-to-poster screw, such as the anterior-to-posterior screw 152b of FIG. 1, through the cannula, and may screw the anterior-to-posterior screw 152b into the aperture of the distal section of the elongate member 702. In a similar manner, the physician may place the cannula through the seventh aperture 816b of the jig 802, and may place the anterior-to-posterior screw 152a through the distal section of the elongate member 702.

Figure 9A:
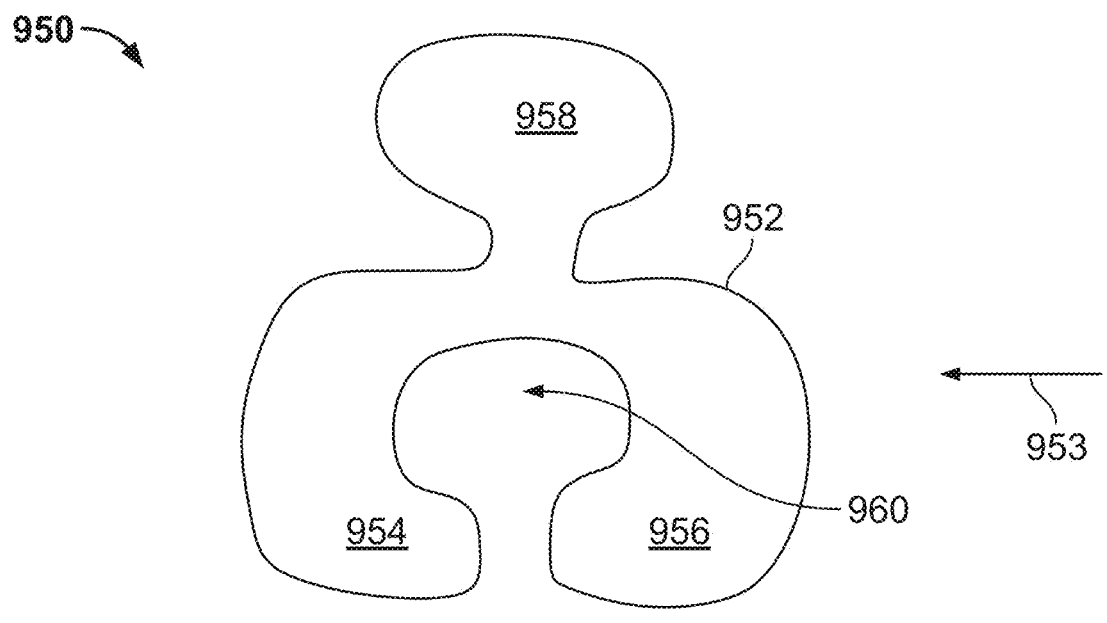
FIG. 9A is an anterior view and a lateral view of an example transformative section segment.
Figure 9A:
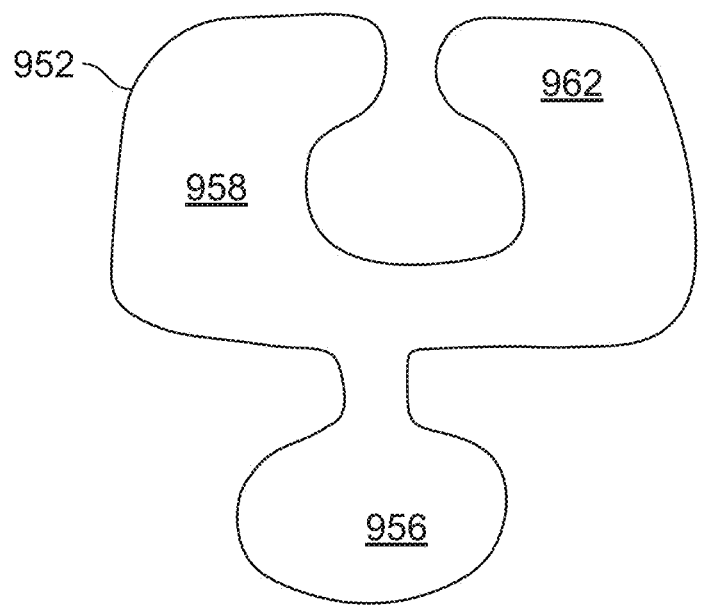
Figure 9B:
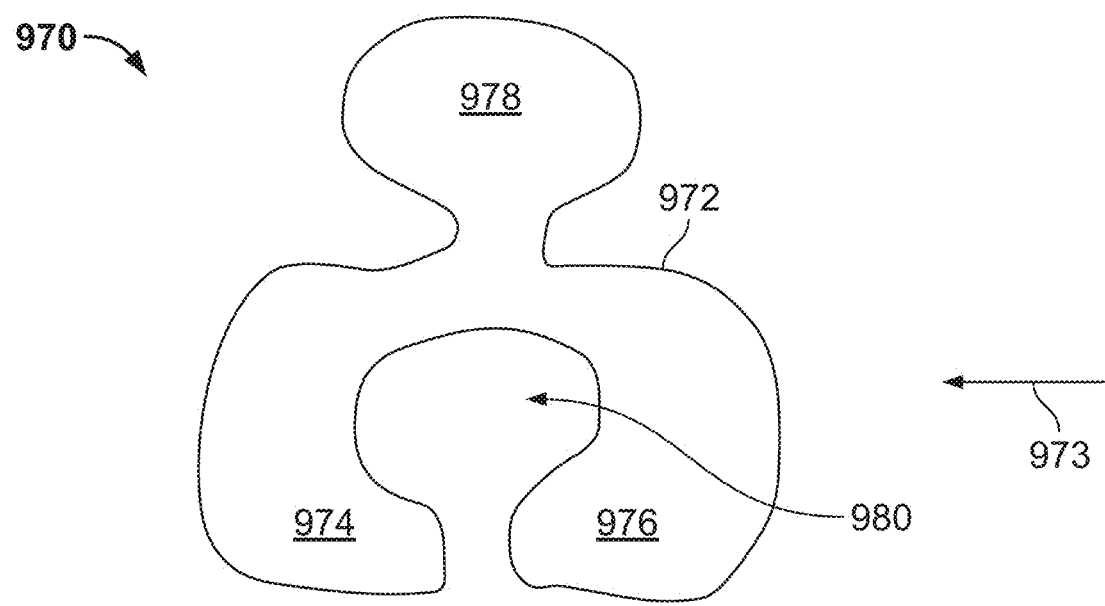
FIG. 9B is an anterior view and a lateral view of another example transformative section segment.
Figure 9B:
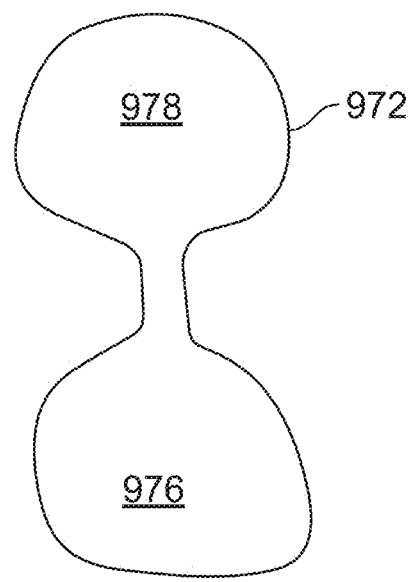

FIG. 9A is a a view 950 of an anterior view and a lateral view of an example transformative section segment 952, and FIG. 9B is a view 970 of an anterior view and a lateral view of another example transformative section segment 972. In some examples, the transformative section segment 952 of FIG. 9A may correspond to any of the transformative section segments discussed herein above, such as the segments 212a, 212b, 212c of FIG. 2 and FIG. 4, for example, where for simplicity the corresponding aperture through the segment 952 is not shown in FIG. 9A because a location of the aperture through the segment 952 may vary for each of the segments of the transformative section depending on where the segment 952 is positioned within the transformative section, as previously described. Similarly, in some examples, the transformative section segment 972 of FIG. 9B may correspond to any of the transformative section segments discussed herein above, such as the segments 212a, 212b, 212c of FIG. 2 and FIG. 4, for example, where for simplicity the corresponding aperture through the segment 972 is not shown in FIG. 9B because a location of the aperture through the segment 972 may vary for each of the segments of the transformative section depending on where the segment 972 is positioned within the transformative section, as previously described.

With reference first to the anterior view of FIG. 9B, in some examples the segment 972 may include a first female-engagement-portion-defining element 974, and a second female-engagement-portion-defining element 976, where together the first and second female-engagement-portion-defining elements 974 and 976 define a female engagement portion 980 of the segment 972. In some examples, the segment 972 may include a single male-engagement portion 978, shown in the anterior view and the lateral view of FIG. 9B, where the lateral view is viewed from the right in a lateral-viewing direction 973.

With reference now to the anterior view of FIG. 9A, in some examples the segment 952 may include a first female-engagement-portion-defining element 954, and a second female-engagement-portion-defining element 956, where together the first and second female-engagement-portion-defining elements 954 and 956 define a female engagement portion 960 of the segment 952. In some examples, the segment 952 may include a first male-engagement portion 958 and a second male-engagement portion 962, as can be seen in the lateral view of FIG. 9A, where the lateral view is viewed from the right in a lateral-viewing direction 953.

Figure 9C:
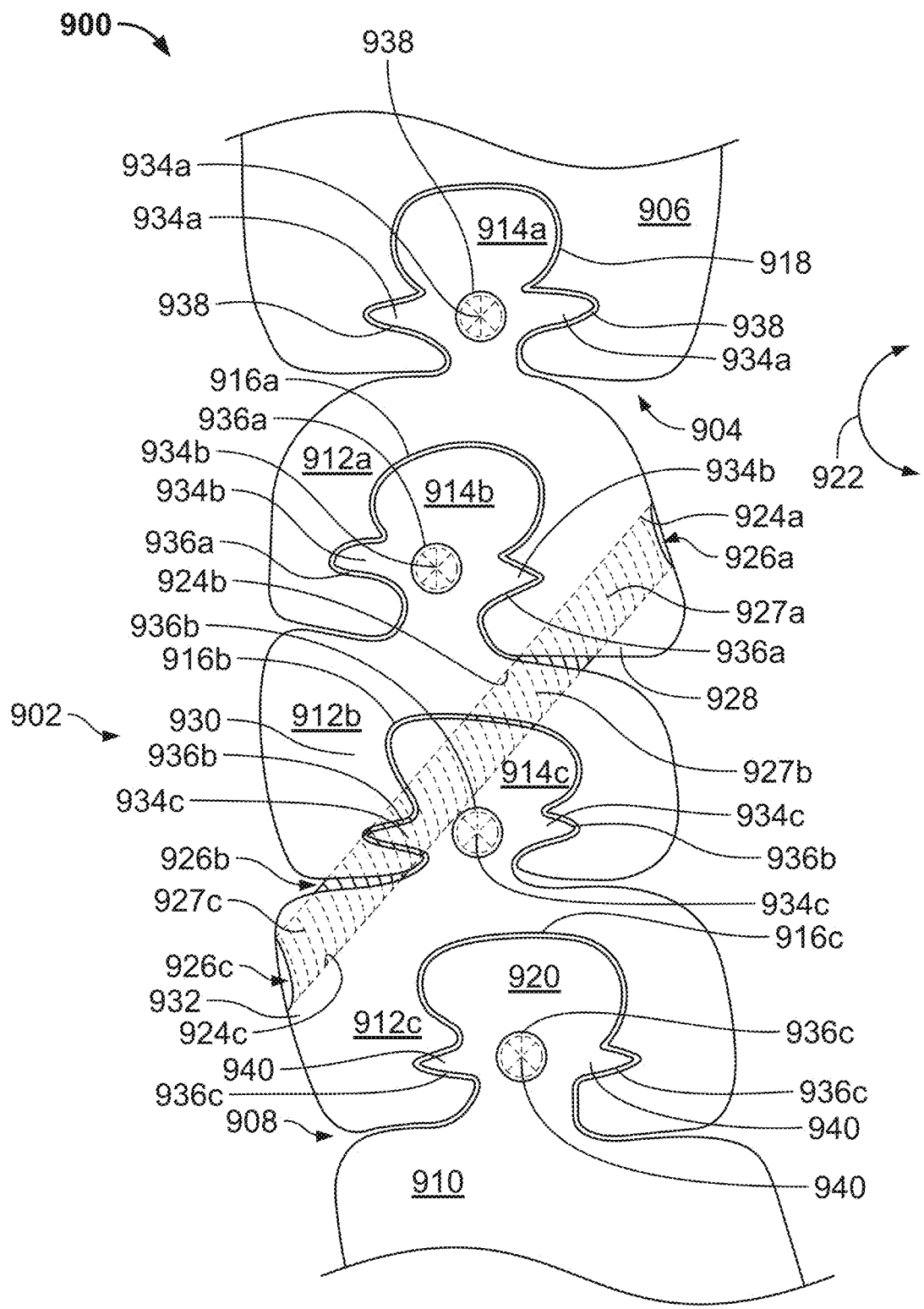
FIG. 9C is a cutaway anterior view of another example transformative section of an example intramedullary bone fixation device.

FIG. 9C is a cutaway anterior view 900 of another example transformative section 902 of an example intramedullary bone fixation device. Also shown in FIG. 9C is an example lower portion 904 of an example proximal section 906 of the device, and an example upper portion 908 of an example distal section 910 of the device. In some examples, the transformative section 902 may correspond to the transformative section 110 of FIG. 1, the proximal section 906 may correspond to the proximal section 106 of FIG. 1, and the distal section 910 may correspond to the distal section 108 of FIG. 1.

The transformative section 902 includes a first segment 912a, a second segment 912b, and a third segment 912c, but in other examples an alternative number of segments (e.g., 2, 4, 5, 6 or more) may be used. According to some implementations, the first segment 912a is engaged with the lower portion 904 of the proximal section 906, the third segment 912c is engaged with the upper portion 908 of the distal section 910, and the second segment 912b is disposed between, and engaged with, the first segment 912a and the third segment 912c.

In some examples, each of the segments 912a, 912b, 912c can include a male engagement portion and a female engagement portion. In the depicted example, the first segment 912a includes a first male engagement portion 914a and a first female engagement portion 916a; the second segment 912b includes a second male engagement portion 914b and a second female engagement portion 916b; and the third segment 912c includes a third male engagement portion 914c and a third female engagement portion 916c. In some examples, the lower portion 904 of the proximal section 906 can include a female engagement portion 918. In some examples, the upper portion 908 of the distal section 910 can include a male engagement portion 920.

In some examples, the male engagement portion 914a of the first segment 912a may be received by the female engagement portion 918 of the proximal section 906; the male engagement portion 914b of the second segment 912b may be received by the female engagement portion 916a of the first segment 912a; the male engagement portion 914c of the third segment 912c may be received by the female engagement portion 916b of the second segment 912b; and the male engagement portion 920 of the distal section 910 may be received by the female engagement portion 916c of the third segment 912c. In the depicted example, the male engagement portions 914a, 914b, 914c were located on upper portions of the corresponding segments 912a, 912b, 912c, and the female engagement portions 916a, 916b, 916c were located on lower portions of the corresponding segments 912a, 912b, 912c, but it will be appreciated that in other examples the relative locations of the male and female portions may be swapped so that the male engagement portions may be located on lower portions of the segments 912a, 912b, 912c, and the female engagement portions may be located on upper portions of the segments 912a, 912b, 912c, with the lower portion 904 of the proximal section 906 then including a male engagement portion and the upper portion 908 of the distal section 910 then including a female engagement portion.

In some examples, each of the male engagement portions 914a, 914b, 914c, and 920 may have a bulbous element on an upper portion of the male engagement portion and one or more protrusions that may extend away from (e.g., one or more of medially, laterally, anteriorly, posteriorly) the bulbous element, and each of the female engagement portions 918, 916a, 916b, and 916c may have a shape that is adapted to receive the bulbous element of the upper portion of the male engagement portions 914a, 914b, 914c, and 920 and the one or more protrusions that extend away from the bulbous element of the male engagement portions 914a, 914b, 914c, and 920.

In the depicted example, the first male engagement portion 914a includes a bulbous portion and first protrusions 934a, and is received by the female engagement portion 918 of the lower portion 904 of the proximal section 906, where the female engagement portion 918 includes first protrusion receptacles 938; the second male engagement portion 914b includes a bulbous portion and second protrusions 934b, and is received by the female engagement portion 916a of the first segment 912a, where the female engagement portion 916a includes second protrusion receptacles 936a; the third male engagement portion 914c includes a bulbous portion and third protrusions 934c, and is received by the female engagement portion 916b of the second segment 912b, where the female engagement portion 916b includes third protrusion receptacles 936b; the male engagement portion 920 of the upper portion 908 of the distal section 910 includes a bulbous portion and fourth protrusions 940, and is received by the female engagement portion 916c of the third segment 912c, where the female engagement portion 916c includes fourth protrusion receptacles 936c.

In some examples, the shapes of the male engagement portions 914a, 914b, 914c, and 920 and female engagement portions 918, 916a, 916b, and 916c may be adapted to permit the male engagement portions 914a, 914b, 914c, and 920 to be engaged or received by the female engagement portions 918, 916a, 916b, and 916c, while also being adapted to generally prevent extraction of the male engagement portions 914a, 914b, 914c, and 920 from the female engagement portions 918, 916a, 916b, and 916c in a vertical direction while the portions are engaged.

In some examples, the shapes and sizes of the male engagement portions 914a, 914b, 914c, and 920 and female engagement portions 918, 916a, 916b, and 916c may permit the male engagement portions 914a, 914b, 914c, and 920 to partially pivot or move 922 within spaces defined by the female engagement portions 918, 916a, 916b, and 916c to provide the flexibility or mobility of the transformative section 902. In some examples, the shapes and sizes of the male engagement portions 914a, 914b, 914c, and 920 and female engagement portions 918, 916a, 916b, and 916c may be adapted to permit about 5 degrees of motion in a frontal plane when the transformative section 902 is in the flexible or mobile state. In some examples, the shapes and sizes of the male engagement portions 914a, 914b, 914c, and 920 and female engagement portions 918, 916a, 916b, and 916c may be adapted to permit between about 4 degrees and about 6 degrees of motion in the frontal plane when the transformative section 902 is in the flexible or mobile state, or may be adapted to permit between about 3 degrees and about 7 degrees of motion in the frontal plane when the transformative section 902 is in the flexible or mobile state. In some examples, the flexibility or mobility of the transformative section 902 when in the flexible or mobile state can assist with conforming device shape to a curved portion of the intramedullary canal, for example a distal metaphysis of the fibula, during placement of the device.

In some examples, the segments 912a, 912b, 912c of the transformative section 902 may define an aperture through the transformative section 902. For example, inner surfaces of the segments 912a, 912b, 912c may define the aperture through the transformative section 902. In some examples, the inner surfaces of the segments 912a, 912b, 912c may define threads, so that the aperture may be a threaded aperture and may receive a transformative screw, according to various implementations.

In some examples, each of the segments 912a, 912b, 912c may include an inner surface of the segment that may define an aperture through a portion of the segment. In some examples, this inner surface may be threaded or may define threads on the inner surface. In some examples, the first segment 912a may include a first inner surface 924a that may define a first aperture 926a through a portion of the first segment 912a. In some examples, the first inner surface 924a may define the first aperture 926a through a lower portion 928 of the first segment 912a. In some examples, the first inner surface 924a may include threads 927a that may have an inner surface pitch. In some examples, the second segment 912b may include a second inner surface 924b that may define a second aperture 926b through a portion of the second segment 912b. In some examples, the second inner surface 924b may define the second aperture 926b across a middle portion 930 of the second segment 912b. In some examples, the second inner surface 924b may include threads 927b that may have the inner surface pitch. In some examples, the third segment 912c may include a third inner surface 924c that may define a third aperture 926c through a portion of the third segment 912c. In some examples, the third inner surface 924c may define the third aperture 926c across an upper portion 932 of the third segment 912c. In some examples, the third inner surface 924c may include threads 927c that may have the inner surface pitch. In some examples, the threads 927a, 927b, 927c defined by the inner surfaces 924a, 924b, 924c of the segments 912a, 912b, 912c may all have the same inner surface pitch.

In some examples, the apertures 926a, 926b, 926c of the segments 912a, 912b, 912c may be aligned so that a fastener, such as a screw, may be inserted through the apertures 926a, 926b, 926c and may engage with the threads 927a, 927b, 927c defined by the inner surfaces 924a, 924b, 924c of the segments 912a, 912b, 912c.

Figure 11A:
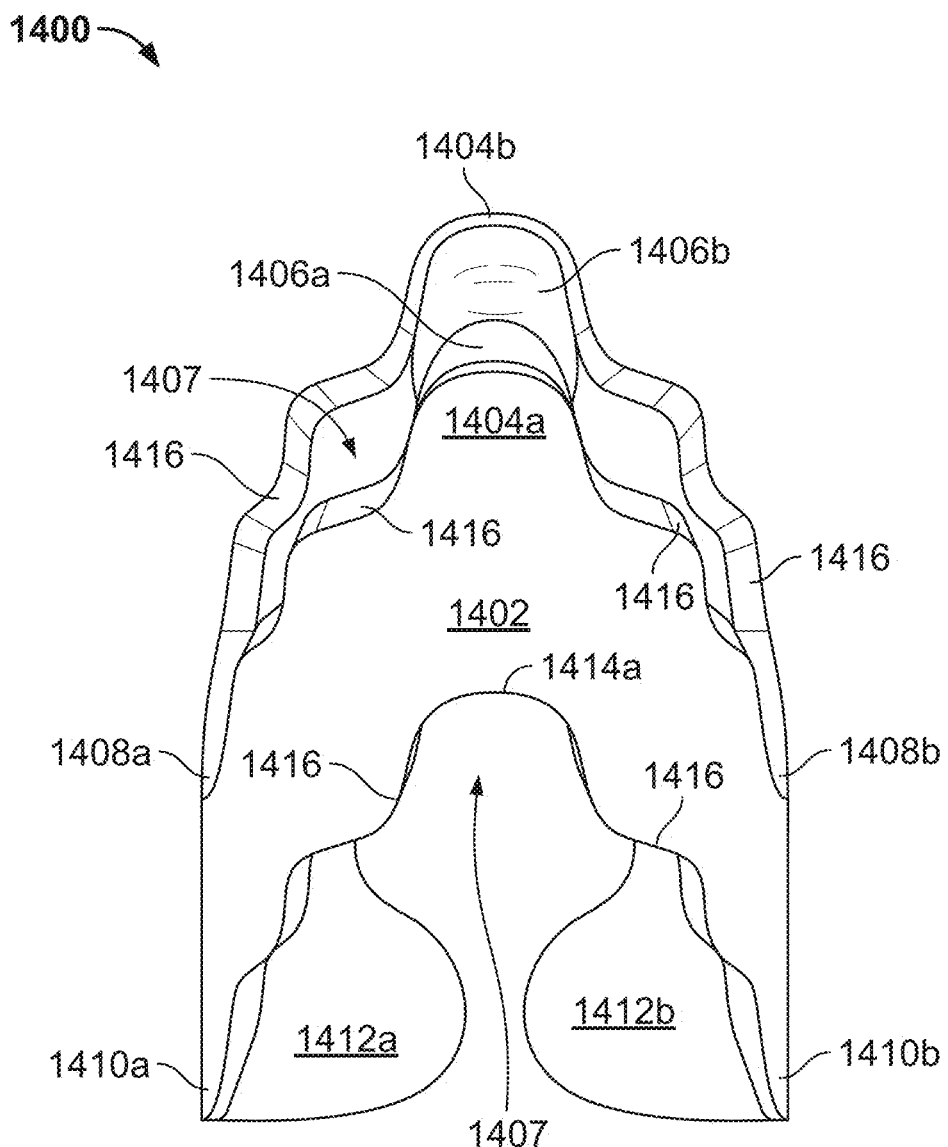
FIGS. 11A, 11B, and 11C are perspective views of an example transformative segment.
Figure 11B:
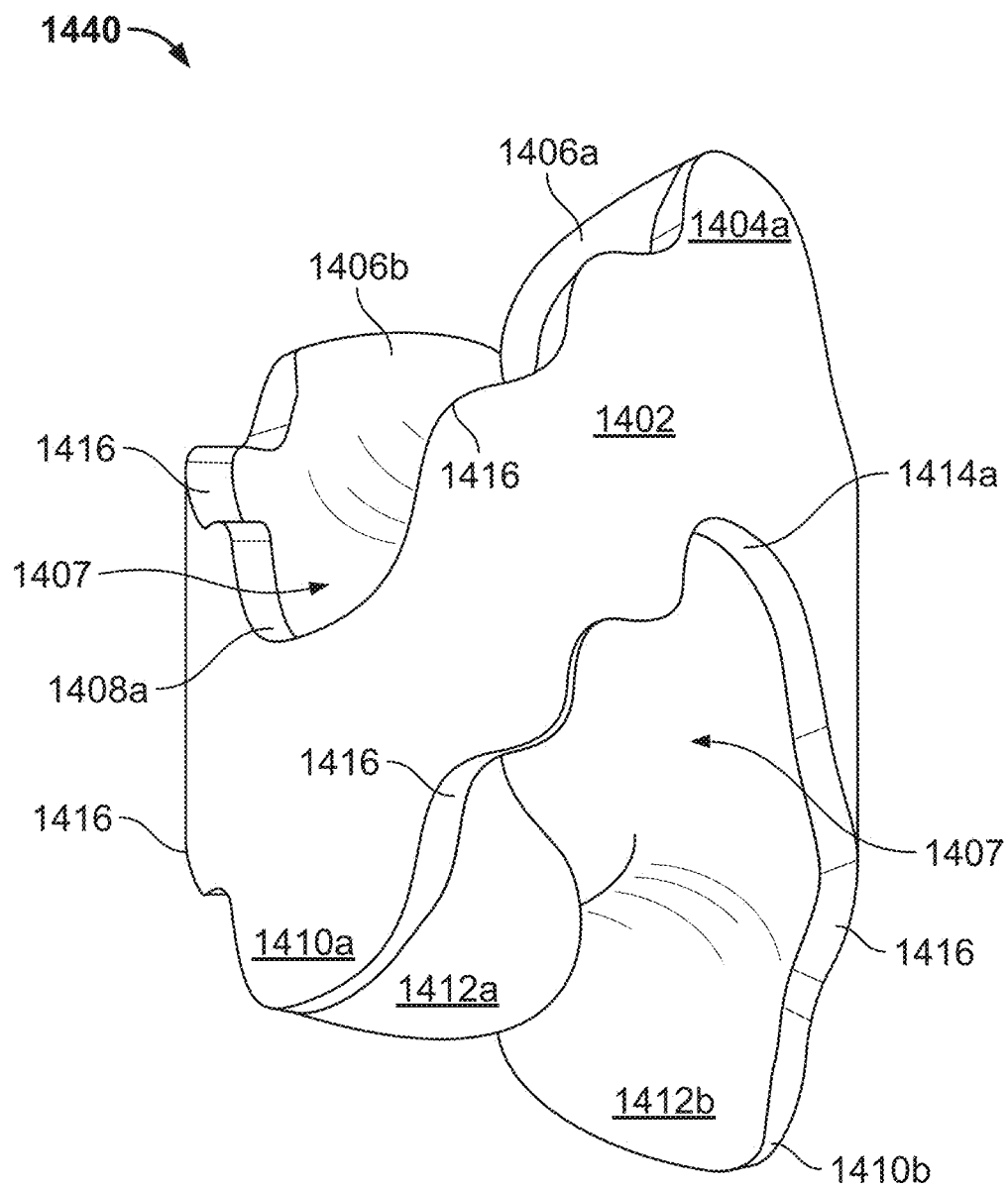
Figure 11C:
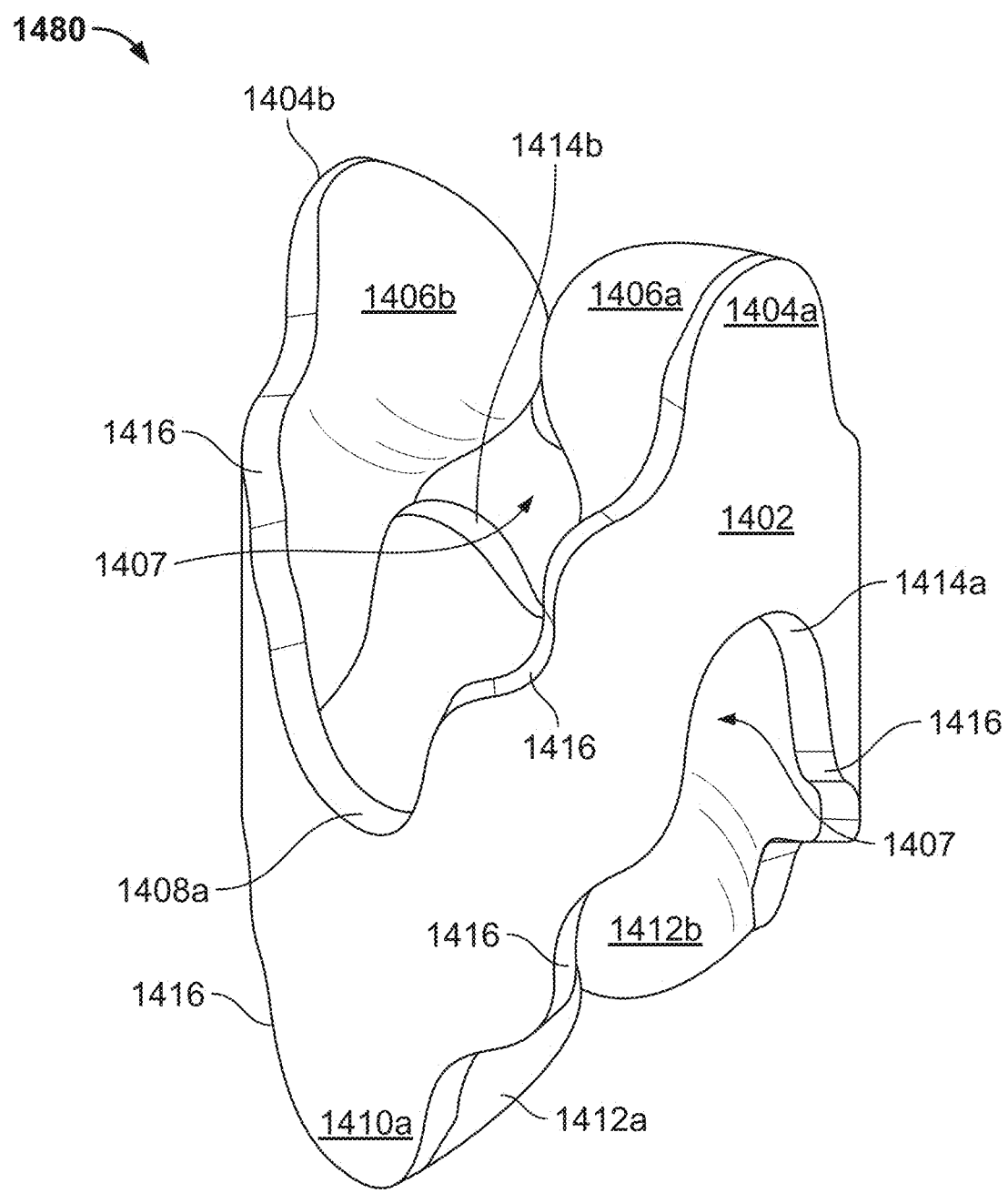

FIGS. 11A, 11B, and 11C are perspective views 1400, 1440, 1480 of an example transformative segment 1402. In some examples, the segment 1402 may represent transformative segment 114a, 114b, or 114c of FIG. 1, or may represent transformative segment 212a, 212b, or 212c of FIG. 2. In some examples, the segment 1402 includes a male engagement portion and a female engagement portion. In some examples, the male engagement portion can include a proximal male engagement portion, which may be adapted to engage with a transformative segment or section that is proximal of the transformative segment 1402, and a distal male engagement portion, which may be adapted to engage with a transformative segment or section that is distal of the transformative segment 1402. In some examples, the proximal male engagement portion can include a first bulbous element 1406a with an exterior boundary 1404a, and a second bulbous element 1406b with an exterior boundary 1404b. In some examples, the first and second bulbous elements 1406a, 1406b may oppose one another. For example, the first bulbous element 1406a may generally be directed in a posterior direction, and the second bulbous element 1406b may generally be directed in an anterior direction. In some examples, the distal male engagement portion can include a third bulbous element 1412a with an exterior boundary 1410a, and a fourth bulbous element 1412b with an exterior boundary 1410b. In some examples, the third and fourth bulbous elements 1412a, 1412b may oppose one another. For example, the third bulbous element 1412a may generally be directed in a lateral direction, and the fourth bulbous element 1412b may generally be directed in a medial direction.

In some examples, the female engagement portion 1407 may have a shape that is adapted to receive a distal male engagement portion from a transformative segment or section that is proximal of the transformative section 1402, and may also be adapted to receive a proximal male engagement portion from a transformative segment or section that is distal of the transformative section 1402. In some examples, the female engagement portion 1407 may be defined, or partially defined, by exterior boundaries 1408a, 1408b, 1414a and 1414b of the transformative segment 1402, as well as edges 1416 of the transformative segment 1402, and may be bounded from above by the proximal male engagement portion and bounded from below by the distal male engagement portion. In some examples, when transformative segments 1402 are engaged, the shapes of the male engagement portions and female engagement portions may be adapted to permit the male engagement portions to be engaged or received by the female engagement portions, while also being adapted to generally prevent extraction of the male engagement portions from the female engagement portions in a vertical direction while the portions are engaged. For simplicity, and because a location of a threaded aperture through the segment 1402 may depend on a location of the segment 1402 within a transformative section, the threaded aperture is not shown in FIGS. 11A-C.

Figure 10A:
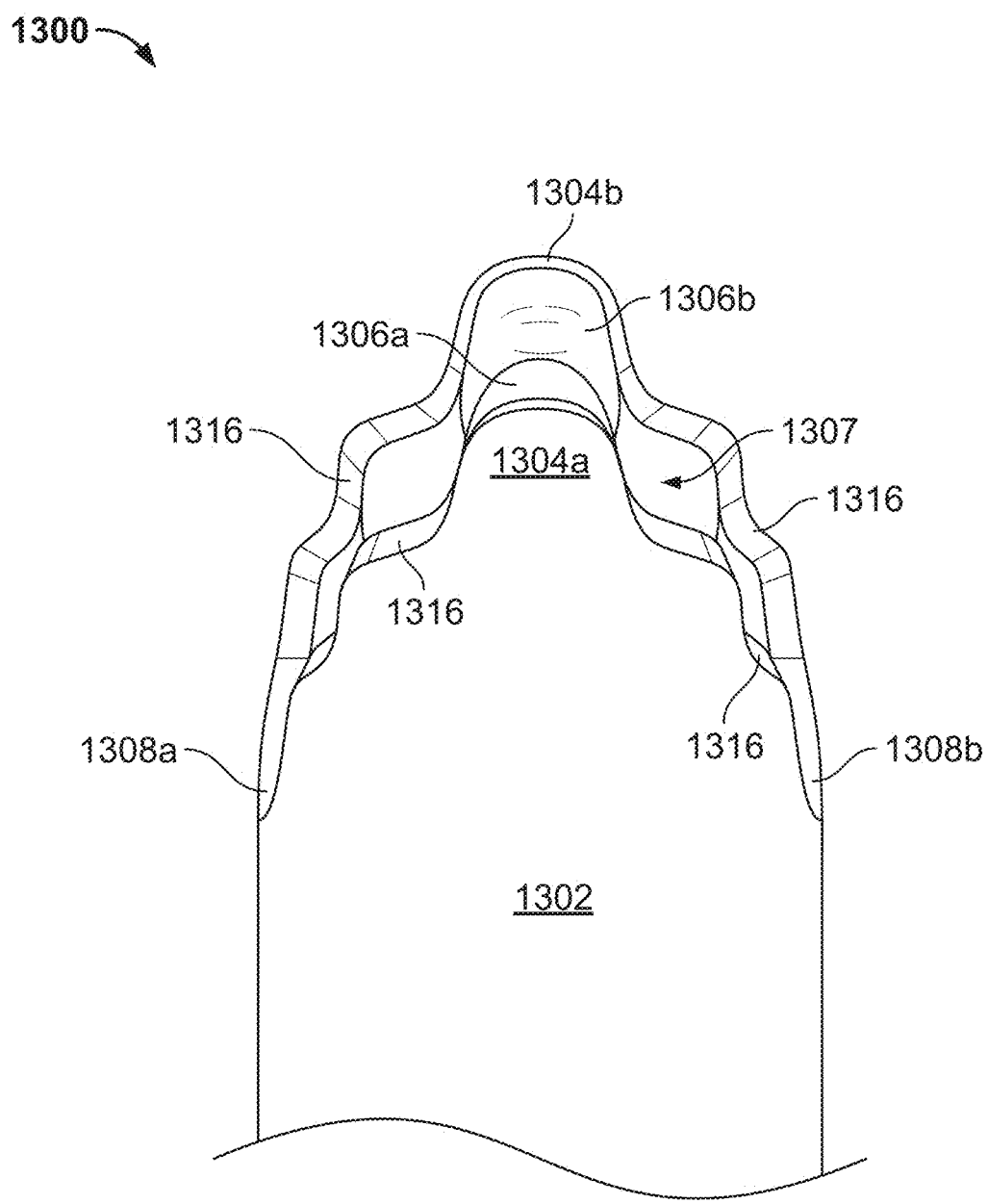
FIGS. 10A, 10B, and 10C are perspective views of an example portion of an elongate member section.
Figure 10B:
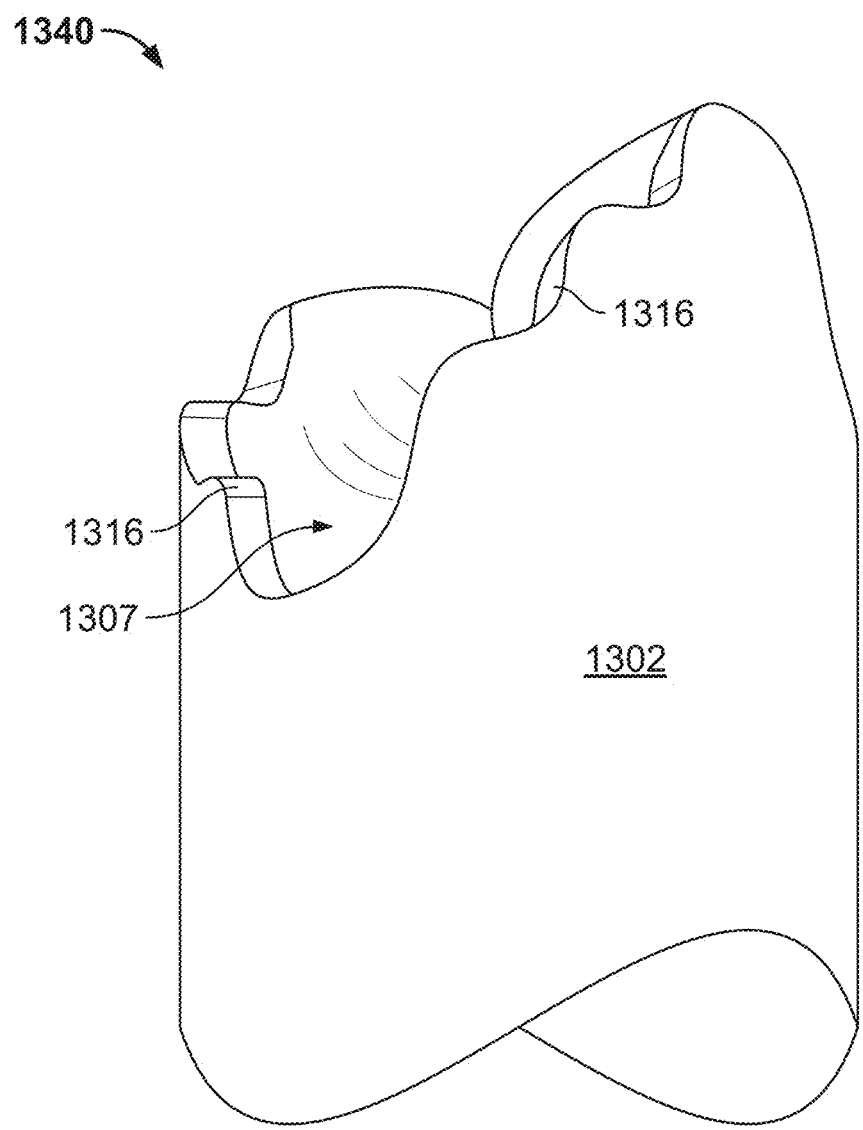
Figure 10C:
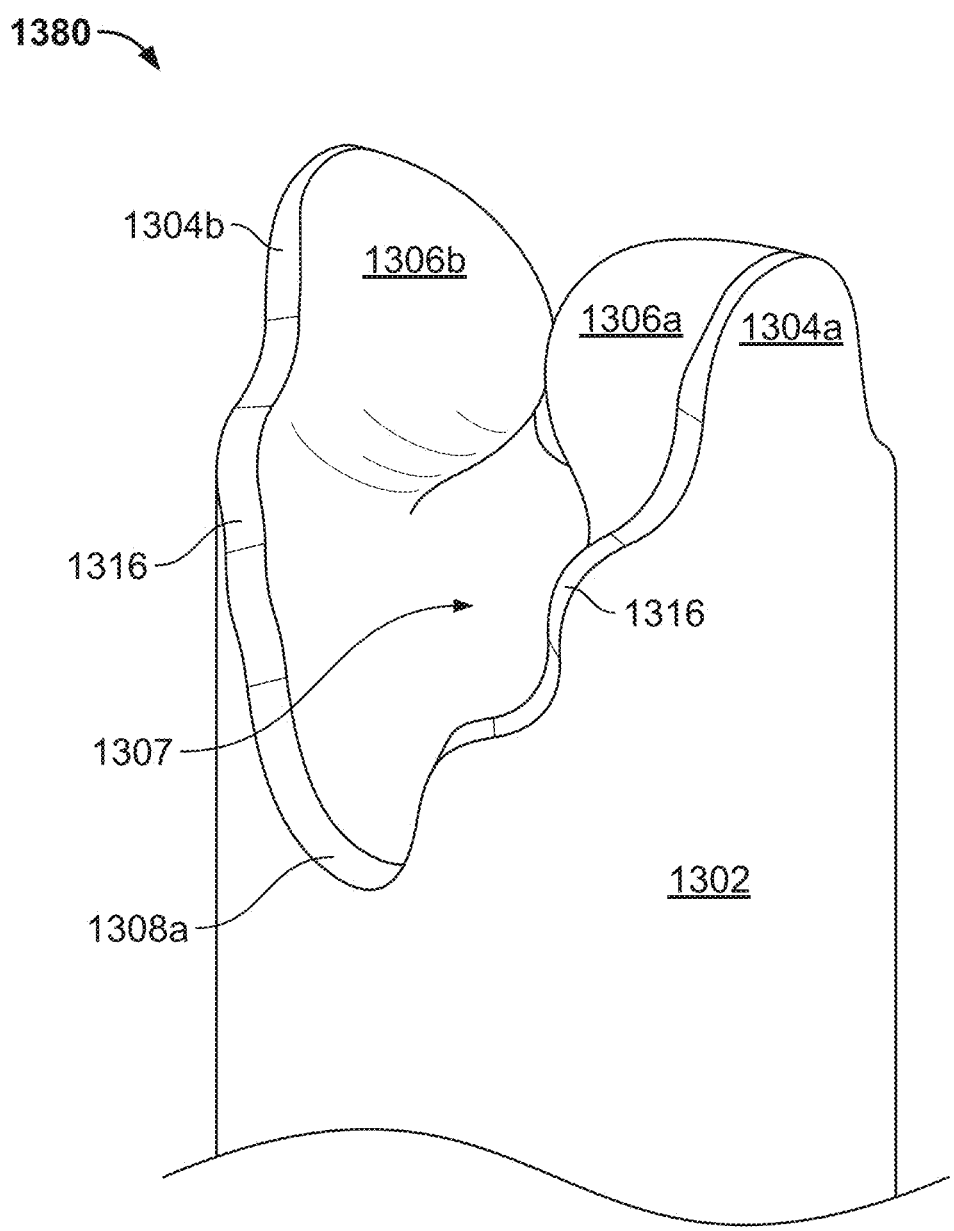

FIGS. 10A, 10B, and 10C are perspective views 1300, 1340, 1380 of an example portion 1302 of an elongate member section. In some examples, the portion 1302 may represent a lower portion of a proximal section of an elongate member. For example, the portion 1302 may represent a lower portion of proximal section 106 of elongate member 102 of FIG. 1, or may represent the lower portion 204 of proximal section 206 of FIG. 2. In some examples, the portion 1302 may represent an upper portion of a distal section of an elongate member. For example, the portion 1302 may represent an upper portion of distal section 108 of elongate member 102 of FIG. 1, or may represent the upper portion 208 of distal section 210 of FIG. 2.

In some examples, the portion 1302 includes a male engagement portion and a female engagement portion. In some examples, the male engagement portion can include a first bulbous element 1306a with an exterior boundary 1304a, and a second bulbous element 1306b with an exterior boundary 1304b. In some examples, the first and second bulbous elements 1306a, 1306b may oppose one another. In some examples, the female engagement portion 1307 may have a shape that is adapted to receive a male engagement portion from a transformative segment. In some examples, the female engagement portion 1407 may be defined, or partially defined, by exterior boundaries 1308a, 1308b and edges 1316 of the portion 1302, and may be bounded by the male engagement portion.

In some examples, the shapes and sizes of the male engagement portions and female engagement portions may permit the male engagement portions to partially pivot or move within spaces defined by the female engagement portions to provide the flexibility or mobility of the transformative section. In some examples, the shapes and sizes of the male engagement portions and female engagement portions may be adapted to permit about 5 degrees of motion in a frontal plane when the transformative section is in the flexible or mobile state. In some examples, the shapes and sizes of the male engagement portions and female engagement portions may be adapted to permit between about 4 degrees and about 6 degrees of motion in the frontal plane when the transformative section is in the flexible or mobile state. In some examples, the shapes and sizes of the male engagement portions and female engagement portions may be adapted to permit between about 3 degrees and about 7 degrees of motion in the frontal plane when the transformative section is in the flexible or mobile state. In some examples, the flexibility or mobility of the transformative section when in the flexible or mobile state can assist with conforming device shape to a curved portion of the intramedullary canal, for example a distal metaphysis of the fibula, during placement of the device.

Figure 12A:
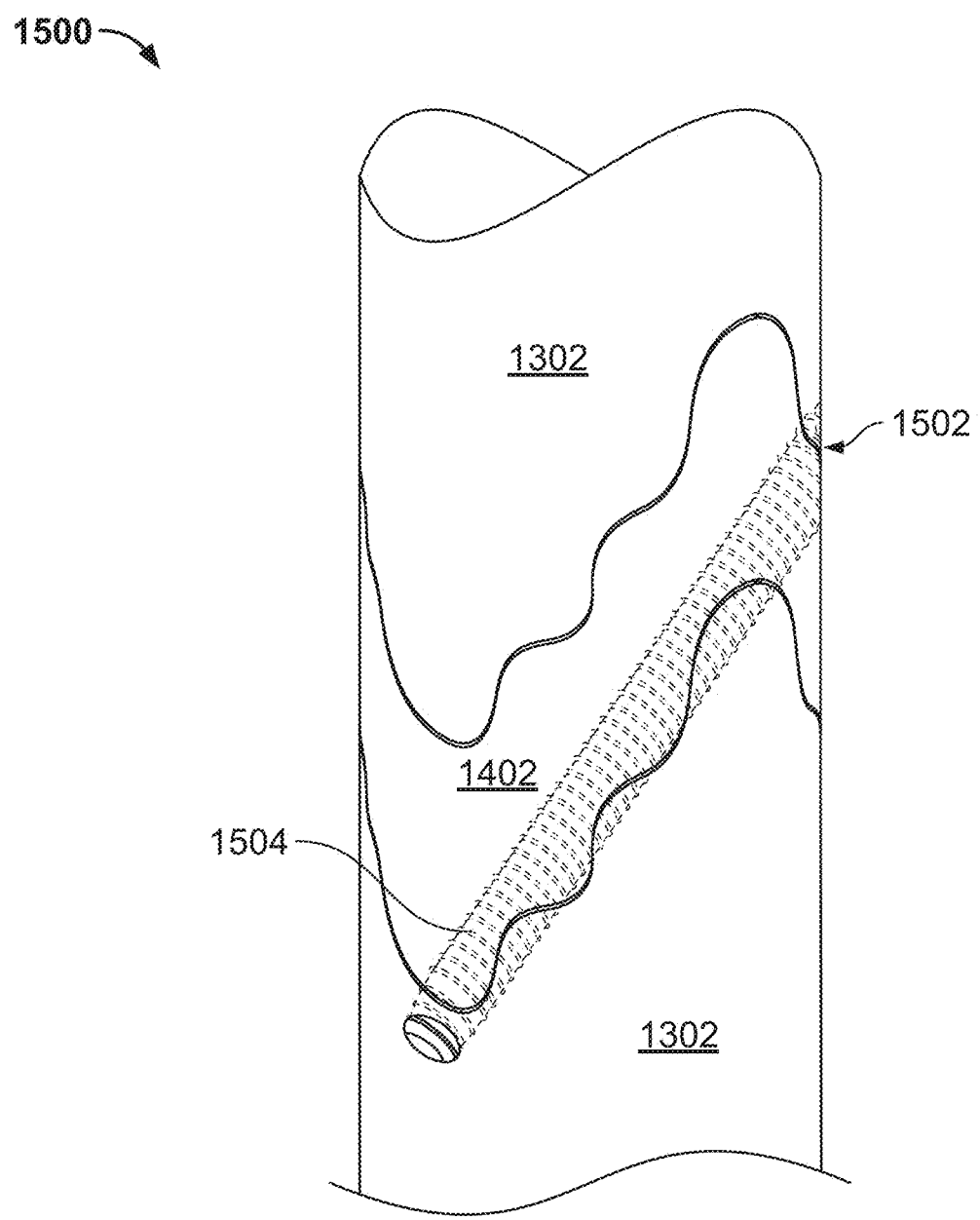
FIG. 12A is a perspective view of an example transformative section using the transformative segment of FIGS. 11A-11C and the portion of FIGS. 10A-10C.

FIG. 12A is a perspective view 1500 of an example transformative section using the transformative segment 1402 of FIGS. 11A-11C and the portion 1302 of FIGS. 10A-10C. In some examples, the segment 1402 and the portions 1302 of the transformative section may define an aperture 1502 through the transformative section. For example, inner surfaces of the segment 1402 and the portions 1302 may define the aperture 1502 through the transformative section. In some examples, the inner surfaces of the segment 1402 and the portions 1302 may define threads 1504, so that the aperture 1502 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw.

Figure 12B:
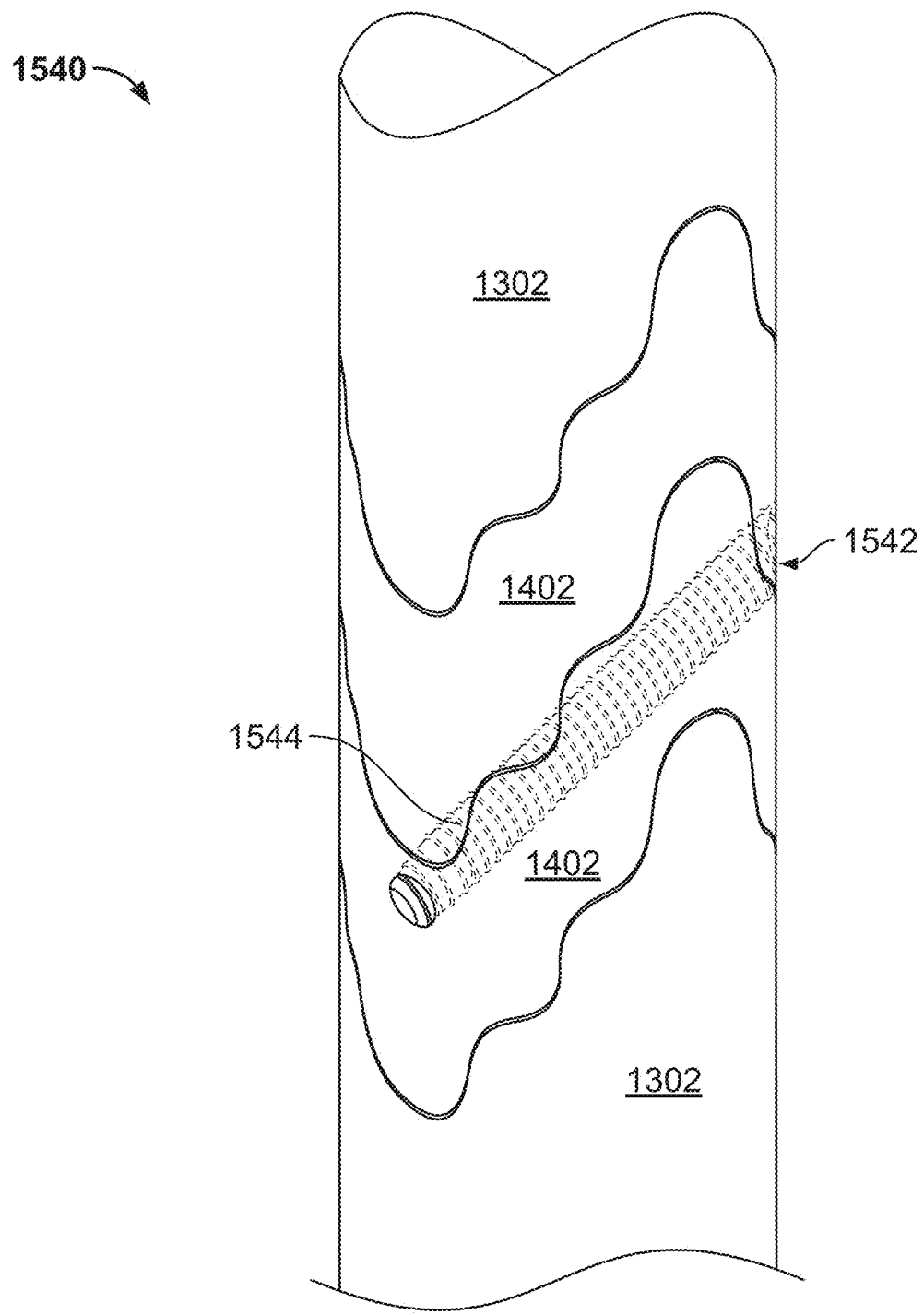
FIGS. 12B and 12C are perspective views of example transformative sections using the transformative segment of FIGS. 11A-11C, and showing the transformative section engaged with the portion of FIGS. 10A-10C.
Figure 12C:
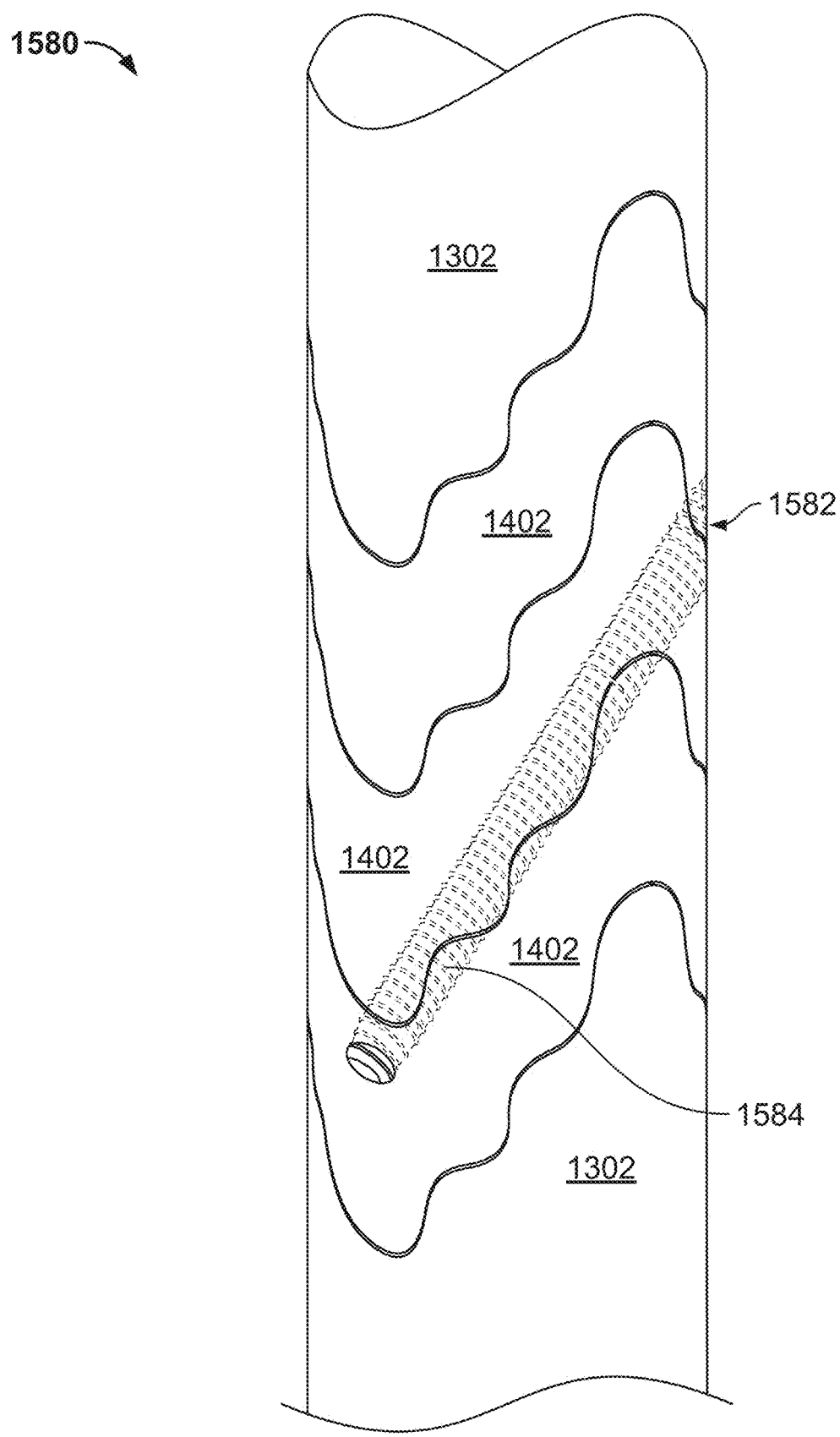

FIGS. 12B and 12C are perspective views 1540, 1580 of example transformative sections using the transformative segment 1402 of FIGS. 11A-11C, and showing the transformative section engaged with the portion 1302 of FIGS. 10A-10C. With reference first to FIG. 12B, in some examples, the segments 1402 of the transformative section may define an aperture 1542 through the transformative section. For example, inner surfaces of the segments 1402 may define the aperture 1542 through the transformative section. In some examples, the inner surfaces of the segments 1402 may define threads 1544, so that the aperture 1542 may be a threaded aperture and may receive a transformative screw, such as transformative screw 302 of FIG. 3A or transformative screw 321 of FIG. 3B, according to various implementations. With reference now to FIG. 15C, in some examples, the segments 1402 of the transformative section may define an aperture 1582 through the transformative section. For example, inner surfaces of the segments 1402 may define the aperture 1582 through the transformative section. In some examples, the inner surfaces of the segments 1402 may define threads 1584, so that the aperture 1582 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw.

Figure 13A:
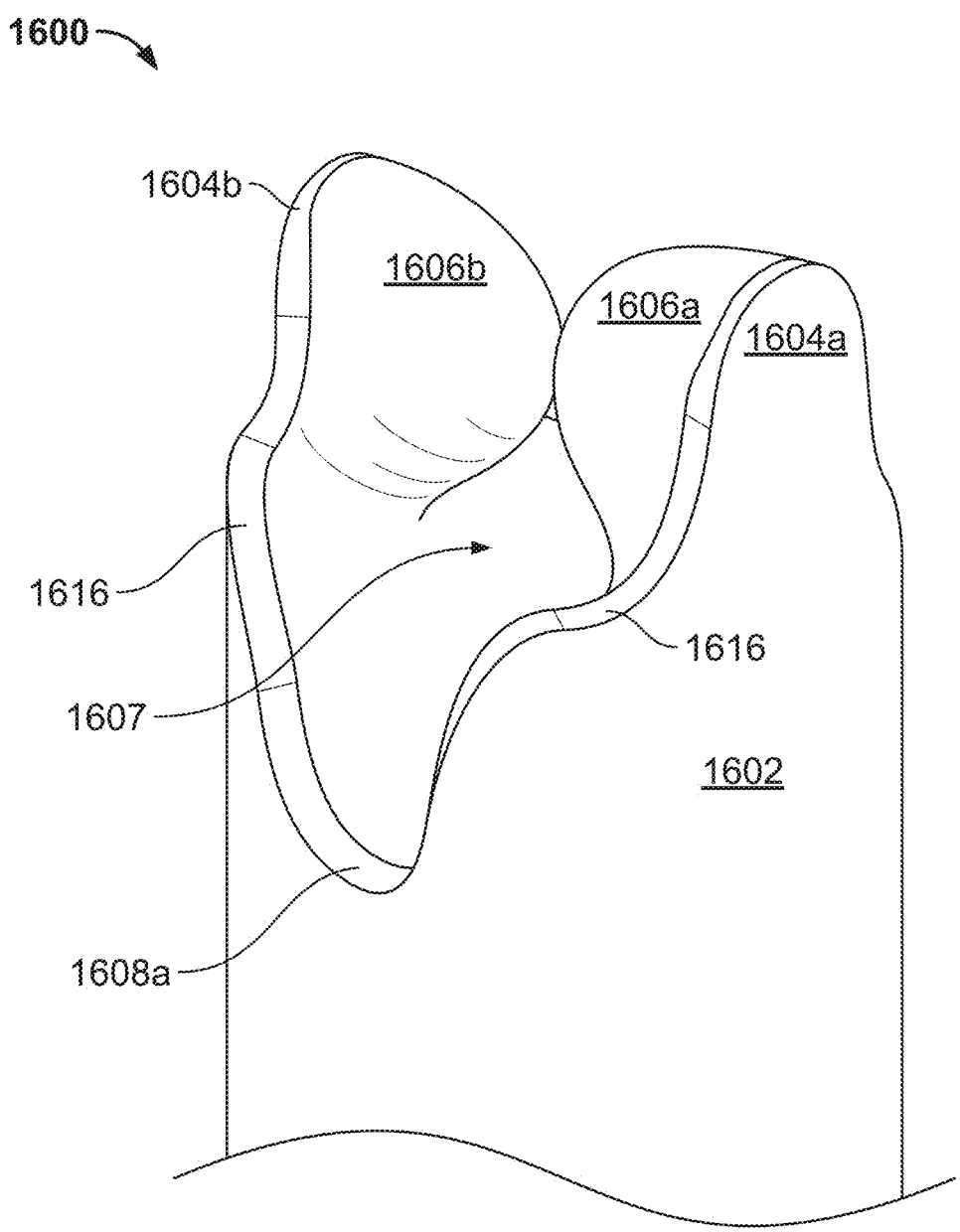
FIG. 13A is a perspective view of an example portion of an elongate member section.
Figure 13B:
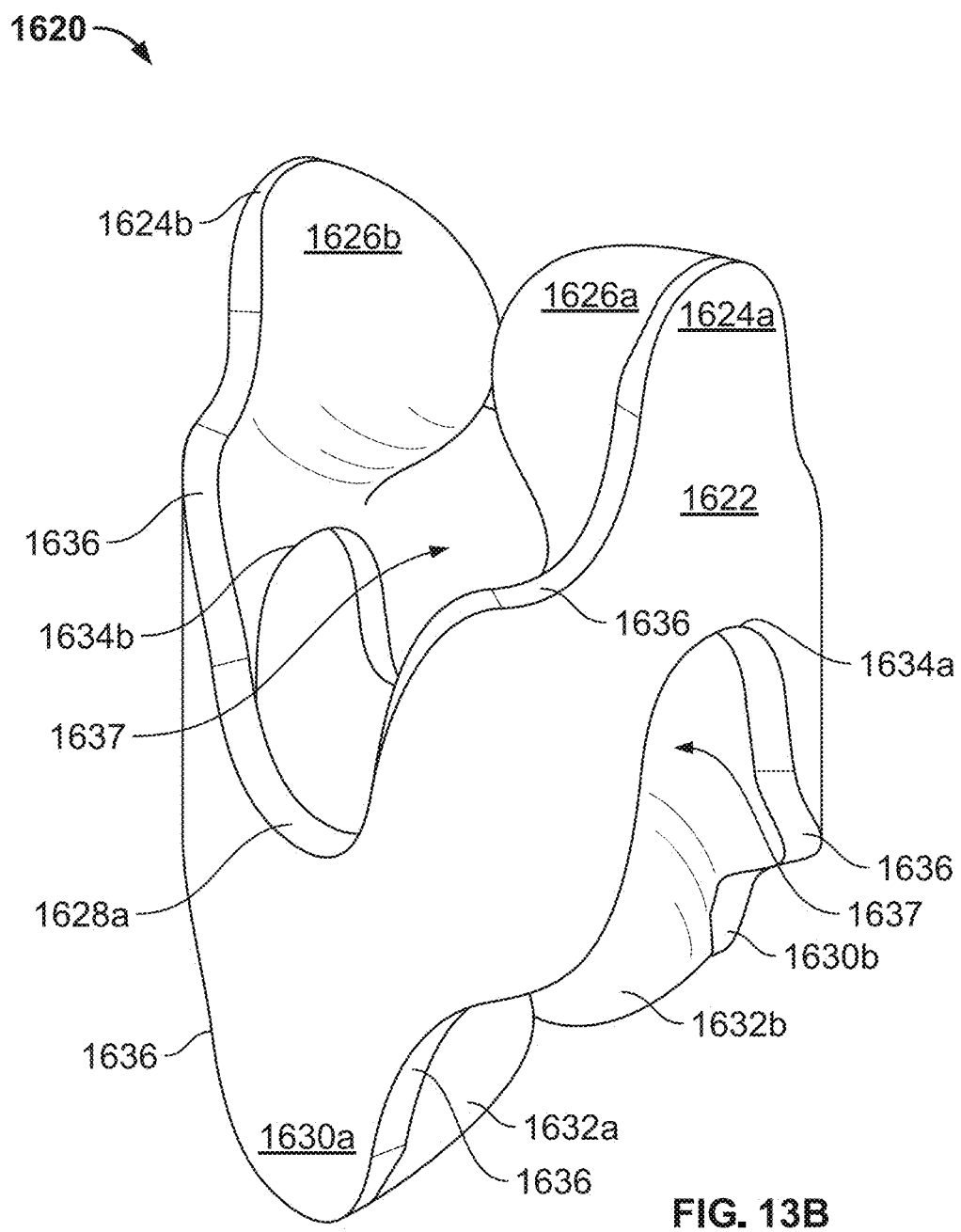
FIG. 13B is a perspective view of an example transformative segment.

FIG. 13A is a perspective view 1600 of an example portion 1602 of an elongate member section, and FIG. 13B is a perspective view 1620 of an example transformative segment 1622. With reference first to FIG. 13B, in some examples, the segment 1622 may represent transformative segment 114a, 114b, or 114c of FIG. 1, or may represent transformative segment 212a, 212b, or 212c of FIG. 2. In some examples, the segment 1622 includes a male engagement portion and a female engagement portion. In some examples, the male engagement portion can include a proximal male engagement portion, which may be adapted to engage with a transformative segment or section that is proximal of the transformative segment 1622, and a distal male engagement portion, which may be adapted to engage with a transformative segment or section that is distal of the transformative segment 1622. In some examples, the proximal male engagement portion can include a first bulbous element 1626a with an exterior boundary 1624a, and a second bulbous element 1626b with an exterior boundary 1624b. In some examples, the first and second bulbous elements 1626a, 1626b may oppose one another. For example, the first bulbous element 1626a may generally be directed in a posterior direction, and the second bulbous element 1626b may generally be directed in an anterior direction. In some examples, the distal male engagement portion can include a third bulbous element 1632a with an exterior boundary 1630a, and a fourth bulbous element 1632b with an exterior boundary 1630b. In some examples, the third and fourth bulbous elements 1632a, 1632b may oppose one another. For example, the third bulbous element 1632a may generally be directed in a lateral direction, and the fourth bulbous element 1632b may generally be directed in a medial direction.

In some examples, the female engagement portion 1637 may have a shape that is adapted to receive a distal male engagement portion from a transformative segment or section that is proximal of the transformative section 1622, and may also be adapted to receive a proximal male engagement portion from a transformative segment or section that is distal of the transformative section 1622. In some examples, the female engagement portion 1637 may be defined, or partially defined, by exterior boundaries 1628a and a symmetric boundary opposite boundary 1628a that is not shown in FIG. 13B, 1634a and 1634b of the transformative segment 1622, as well as edges 1636 of the transformative segment 1622, and may be bounded from above by the proximal male engagement portion and bounded from below by the distal male engagement portion. In some examples, when transformative segments 1622 are engaged, the shapes of the male engagement portions and female engagement portions may be adapted to permit the male engagement portions to be engaged or received by the female engagement portions, while also being adapted to generally prevent extraction of the male engagement portions from the female engagement portions in a vertical direction while the portions are engaged. For simplicity, and because a location of a threaded aperture through the segment 1622 may depend on a location of the segment 1622 within a transformative section, the threaded aperture is not shown in FIG. 13B.

With reference now to FIG. 13A, in some examples, the portion 1602 may represent a lower portion of a proximal section of an elongate member. For example, the portion 1602 may represent a lower portion of proximal section 106 of elongate member 102 of FIG. 1, or may represent the lower portion 204 of proximal section 206 of FIG. 2. In some examples, the portion 1602 may represent an upper portion of a distal section of an elongate member. For example, the portion 1602 may represent an upper portion of distal section 108 of elongate member 102 of FIG. 1, or may represent the upper portion 208 of distal section 210 of FIG. 2.

In some examples, the portion 1602 includes a male engagement portion and a female engagement portion. In some examples, the male engagement portion can include a first bulbous element 1606a with an exterior boundary 1604a, and a second bulbous element 1606b with an exterior boundary 1604b. In some examples, the first and second bulbous elements 1606a, 1606b may oppose one another. In some examples, the female engagement portion 1607 may have a shape that is adapted to receive a male engagement portion from a transformative segment. In some examples, the female engagement portion 1607 may be defined, or partially defined, by exterior boundaries 1608a and a symmetric boundary opposite boundary 1608a that is not shown in FIG. 13A, and edges 1616 of the portion 1602, and may be bounded by the male engagement portion.

In some examples, the shapes and sizes of the male engagement portions and female engagement portions may permit the male engagement portions to partially pivot or move within spaces defined by the female engagement portions to provide the flexibility or mobility of the transformative section. In some examples, the shapes and sizes of the male engagement portions and female engagement portions may be adapted to permit about 5 degrees of motion in a frontal plane when the transformative section is in the flexible or mobile state. In some examples, the shapes and sizes of the male engagement portions and female engagement portions may be adapted to permit between about 4 degrees and about 6 degrees of motion in the frontal plane when the transformative section is in the flexible or mobile state. In some examples, the shapes and sizes of the male engagement portions and female engagement portions may be adapted to permit between about 3 degrees and about 7 degrees of motion in the frontal plane when the transformative section is in the flexible or mobile state. In some examples, the flexibility or mobility of the transformative section when in the flexible or mobile state can assist with conforming device shape to a curved portion of the intramedullary canal, for example a distal metaphysis of the fibula, during placement of the device.

Figure 13C:
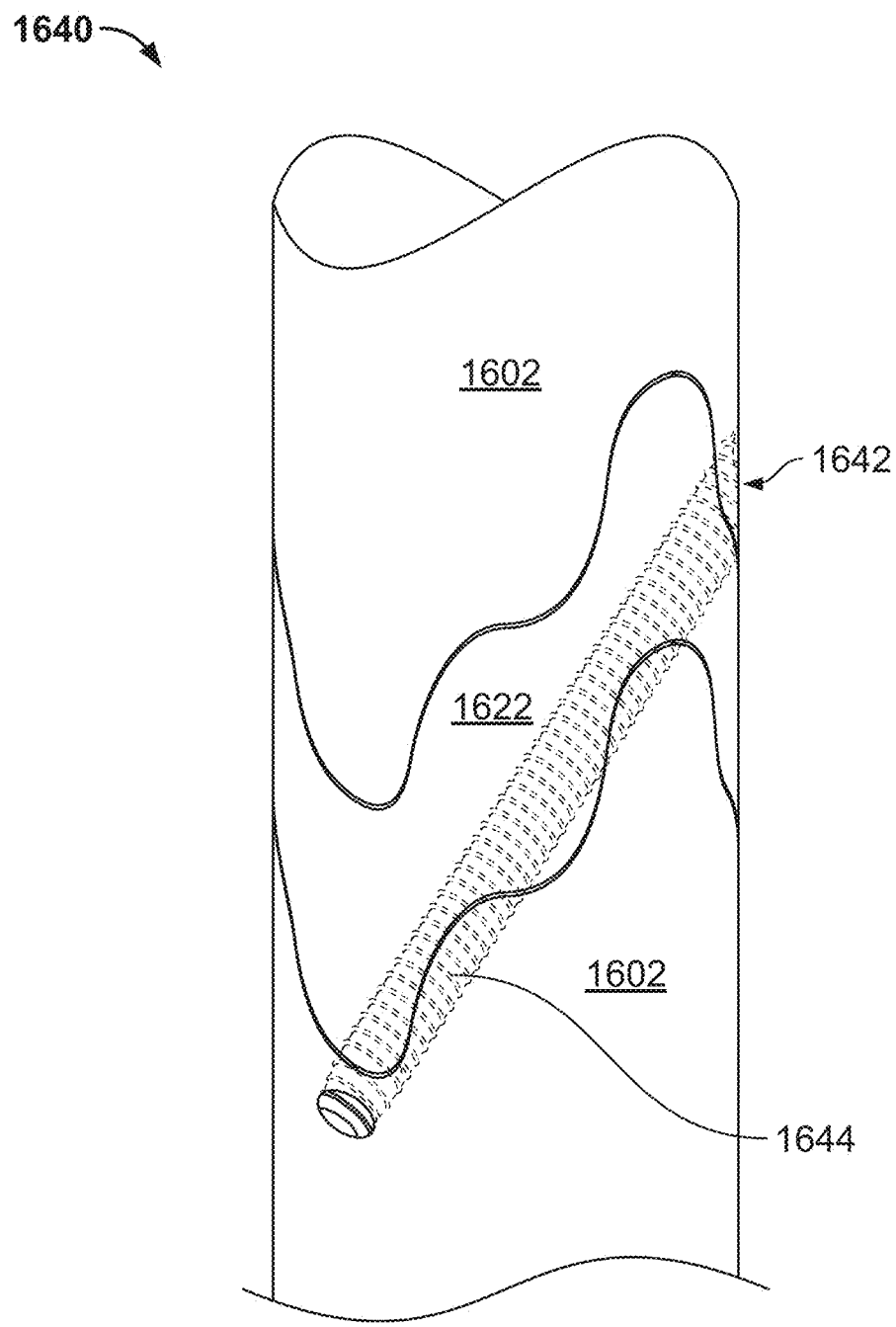
FIG. 13C is a perspective view of an example transformative section using the transformative segment of FIG. 13B and the portion of FIG. 13A.

FIG. 13C is a perspective view 1640 of an example transformative section using the transformative segment 1622 of FIG. 13B and the portion 1602 of FIG. 13A. In some examples, the segment 1622 and the portions 1602 of the transformative section may define an aperture 1642 through the transformative section. For example, inner surfaces of the segment 1622 and the portions 1602 may define the aperture 1642 through the transformative section. In some examples, the inner surfaces of the segment 1622 and the portions 1602 may define threads 1644, so that the aperture 1642 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw.

Figure 13D:
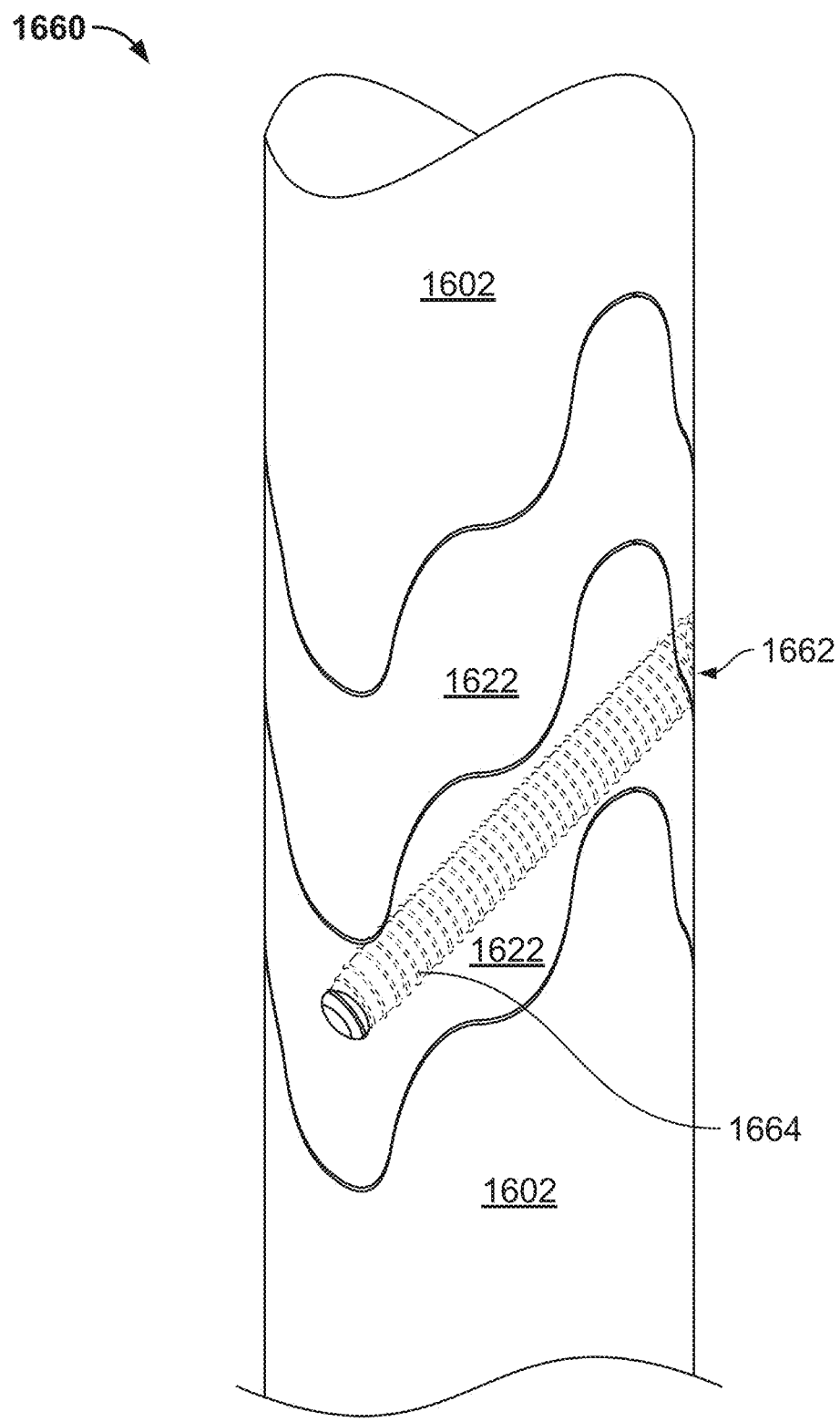
FIGS. 13D and 13E are perspective views of example transformative sections using the transformative segment of FIG. 13B, and showing the transformative section engaged with the portion of FIG. 13A.
Figure 13E:
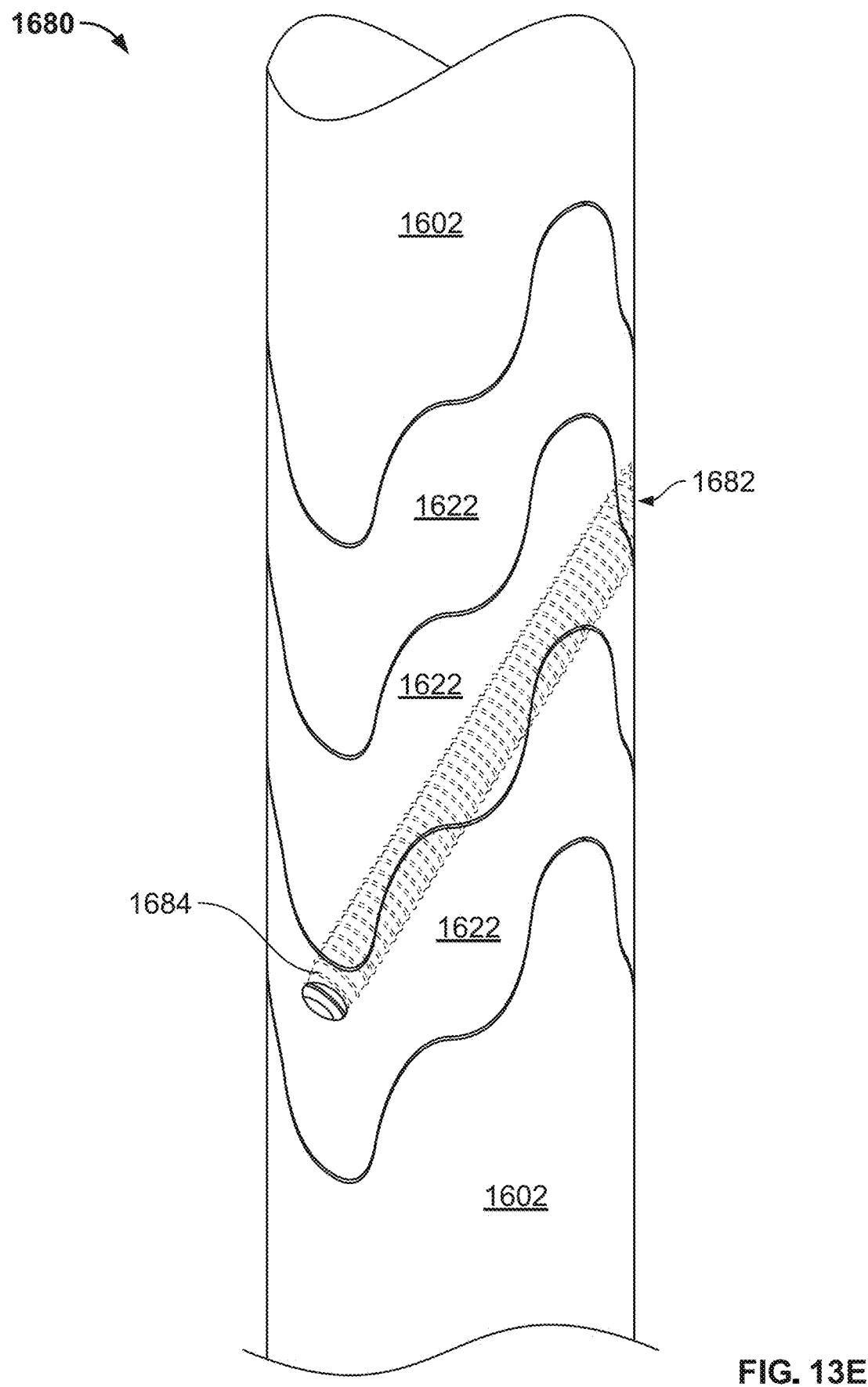

FIGS. 13D and 13E are perspective views 1660, 1680 of example transformative sections using the transformative segment 1622 of FIG. 13B, and showing the transformative section 1622 engaged with the portion 1602 of FIG. 13A. With reference first to FIG. 13D, in some examples, the segments 1622 of the transformative section may define an aperture 1662 through the transformative section. For example, inner surfaces of the segments 1622 may define the aperture 1662 through the transformative section. In some examples, the inner surfaces of the segments 1622 may define threads 1664, so that the aperture 1662 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw. With reference now to FIG. 13E, in some examples, the segments 1622 of the transformative section may define an aperture 1682 through the transformative section. For example, inner surfaces of the segments 1622 may define the aperture 1682 through the transformative section. In some examples, the inner surfaces of the segments 1622 may define threads 1684, so that the aperture 1682 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw.

Figure 14A:
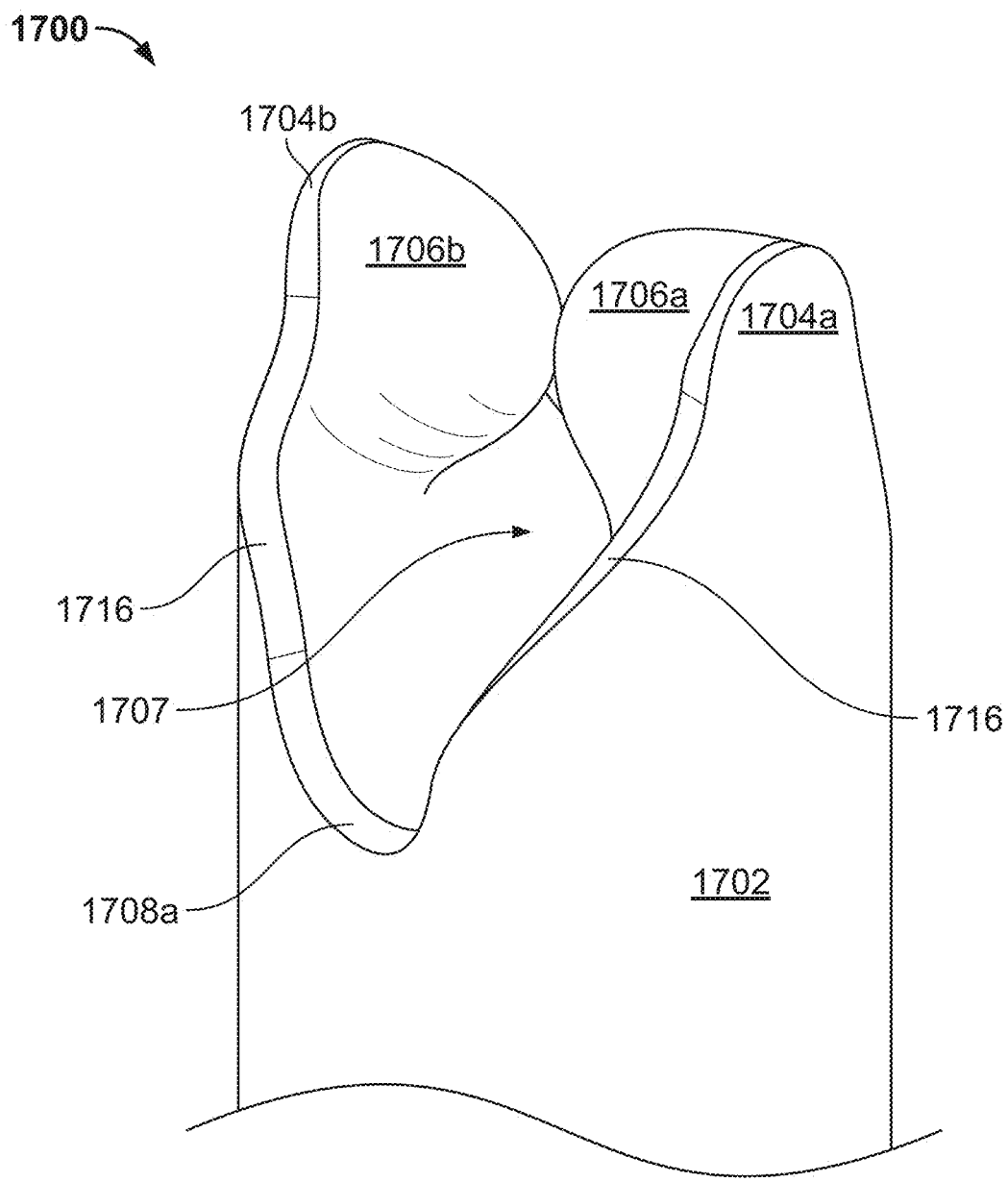
FIG. 14A is a perspective view of an example portion of an elongate member section.
Figure 14B:
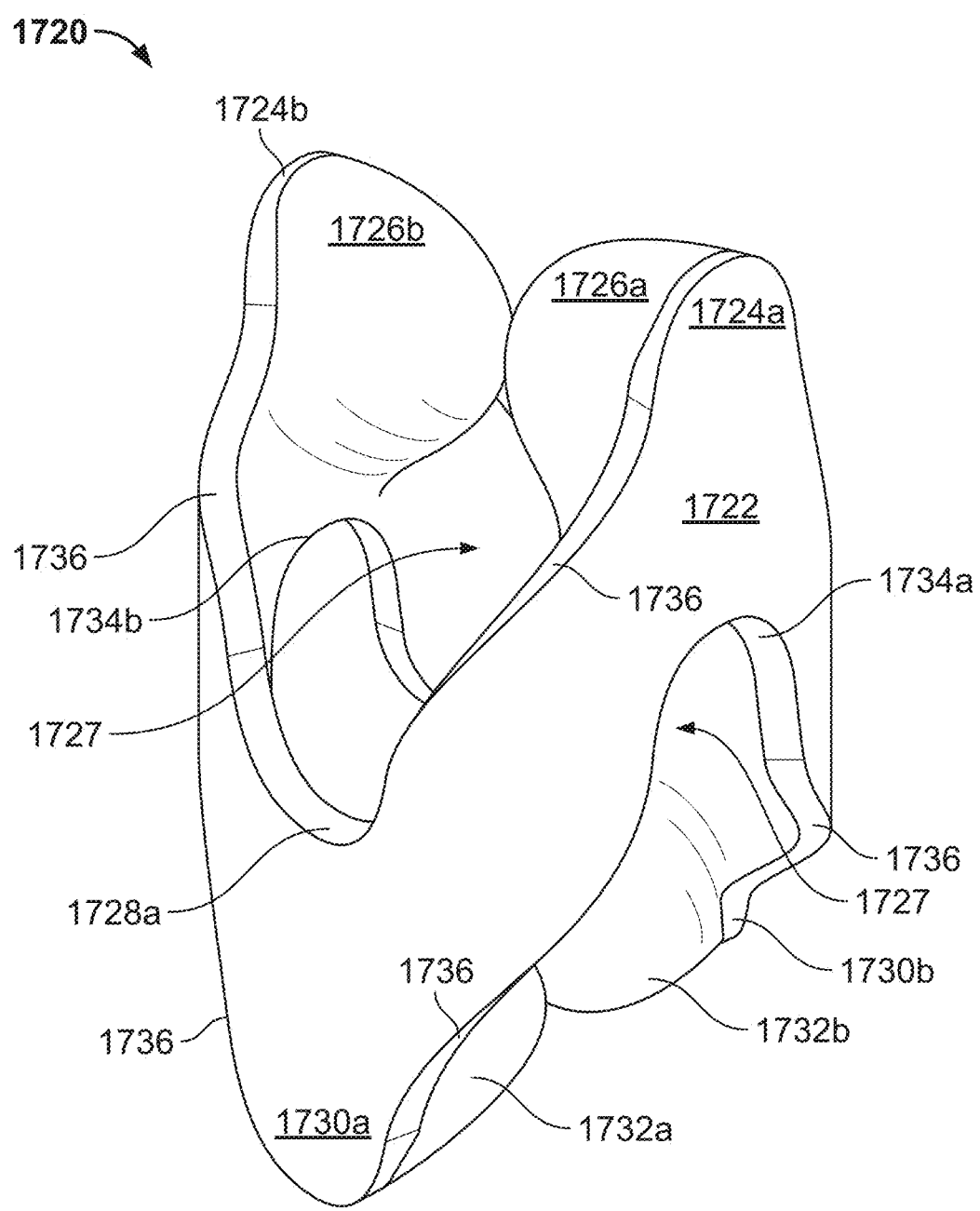
FIG. 14B is a perspective view of an example transformative segment.

FIG. 14A is a perspective view 1700 of an example portion 1702 of an elongate member section, and FIG. 14B is a perspective view 1720 of an example transformative segment 1722. With reference first to FIG. 14B, in some examples, the segment 1722 may represent transformative segment 114a, 114b, or 114c of FIG. 1, or may represent transformative segment 212a, 212b, or 212c of FIG. 2. In some examples, the segment 1722 includes a male engagement portion and a female engagement portion. In some examples, the male engagement portion can include a proximal male engagement portion, which may be adapted to engage with a transformative segment or section that is proximal of the transformative segment 1722, and a distal male engagement portion, which may be adapted to engage with a transformative segment or section that is distal of the transformative segment 1722. In some examples, the proximal male engagement portion can include a first bulbous element 1726a with an exterior boundary 1724a, and a second bulbous element 1726b with an exterior boundary 1724b. In some examples, the first and second bulbous elements 1726a, 1726b may oppose one another. For example, the first bulbous element 1726a may generally be directed in a posterior direction, and the second bulbous element 1726b may generally be directed in an anterior direction. In some examples, the distal male engagement portion can include a third bulbous element 1732a with an exterior boundary 1730a, and a fourth bulbous element 1732b with an exterior boundary 1730b. In some examples, the third and fourth bulbous elements 1732a, 1732b may oppose one another. For example, the third bulbous element 1732a may generally be directed in a lateral direction, and the fourth bulbous element 1732b may generally be directed in a medial direction.

In some examples, the female engagement portion 1727 may have a shape that is adapted to receive a distal male engagement portion from a transformative segment or section that is proximal of the transformative section 1722, and may also be adapted to receive a proximal male engagement portion from a transformative segment or section that is distal of the transformative section 1722. In some examples, the female engagement portion 1727 may be defined, or partially defined, by exterior boundaries 1728a and a symmetric boundary opposite boundary 1728a that is not shown in FIG. 14B, 1734a and 1734b of the transformative segment 1722, as well as edges 1736 of the transformative segment 1722, and may be bounded from above by the proximal male engagement portion and bounded from below by the distal male engagement portion. In some examples, when transformative segments 1722 are engaged, the shapes of the male engagement portions and female engagement portions may be adapted to permit the male engagement portions to be engaged or received by the female engagement portions, while also being adapted to generally prevent extraction of the male engagement portions from the female engagement portions in a vertical direction while the portions are engaged. For simplicity, and because a location of a threaded aperture through the segment 1722 may depend on a location of the segment 1722 within a transformative section, the threaded aperture is not shown in FIG. 14B.

With reference now to FIG. 14A, in some examples, the portion 1702 may represent a lower portion of a proximal section of an elongate member. For example, the portion 1702 may represent a lower portion of proximal section 106 of elongate member 102 of FIG. 1, or may represent the lower portion 204 of proximal section 206 of FIG. 2. In some examples, the portion 1702 may represent an upper portion of a distal section of an elongate member. For example, the portion 1702 may represent an upper portion of distal section 108 of elongate member 102 of FIG. 1, or may represent the upper portion 208 of distal section 210 of FIG. 2.

In some examples, the portion 1702 includes a male engagement portion and a female engagement portion. In some examples, the male engagement portion can include a first bulbous element 1706a with an exterior boundary 1704a, and a second bulbous element 1706b with an exterior boundary 1704b. In some examples, the first and second bulbous elements 1706a, 1706b may oppose one another. In some examples, the female engagement portion 1707 may have a shape that is adapted to receive a male engagement portion from a transformative segment. In some examples, the female engagement portion 1707 may be defined, or partially defined, by exterior boundaries 1708a and a symmetric boundary opposite boundary 1708a that is not shown in FIG. 14A, and edges 1716 of the portion 1702, and may be bounded by the male engagement portion.

In some examples, the shapes and sizes of the male engagement portions and female engagement portions may permit the male engagement portions to partially pivot or move within spaces defined by the female engagement portions to provide the flexibility or mobility of the transformative section. In some examples, the shapes and sizes of the male engagement portions and female engagement portions may be adapted to permit about 5 degrees of motion in a frontal plane when the transformative section is in the flexible or mobile state. In some examples, the shapes and sizes of the male engagement portions and female engagement portions may be adapted to permit between about 4 degrees and about 6 degrees of motion in the frontal plane when the transformative section is in the flexible or mobile state. In some examples, the shapes and sizes of the male engagement portions and female engagement portions may be adapted to permit between about 3 degrees and about 7 degrees of motion in the frontal plane when the transformative section is in the flexible or mobile state. In some examples, the flexibility or mobility of the transformative section when in the flexible or mobile state can assist with conforming device shape to a curved portion of the intramedullary canal, for example a distal metaphysis of the fibula, during placement of the device.

Figure 14C:
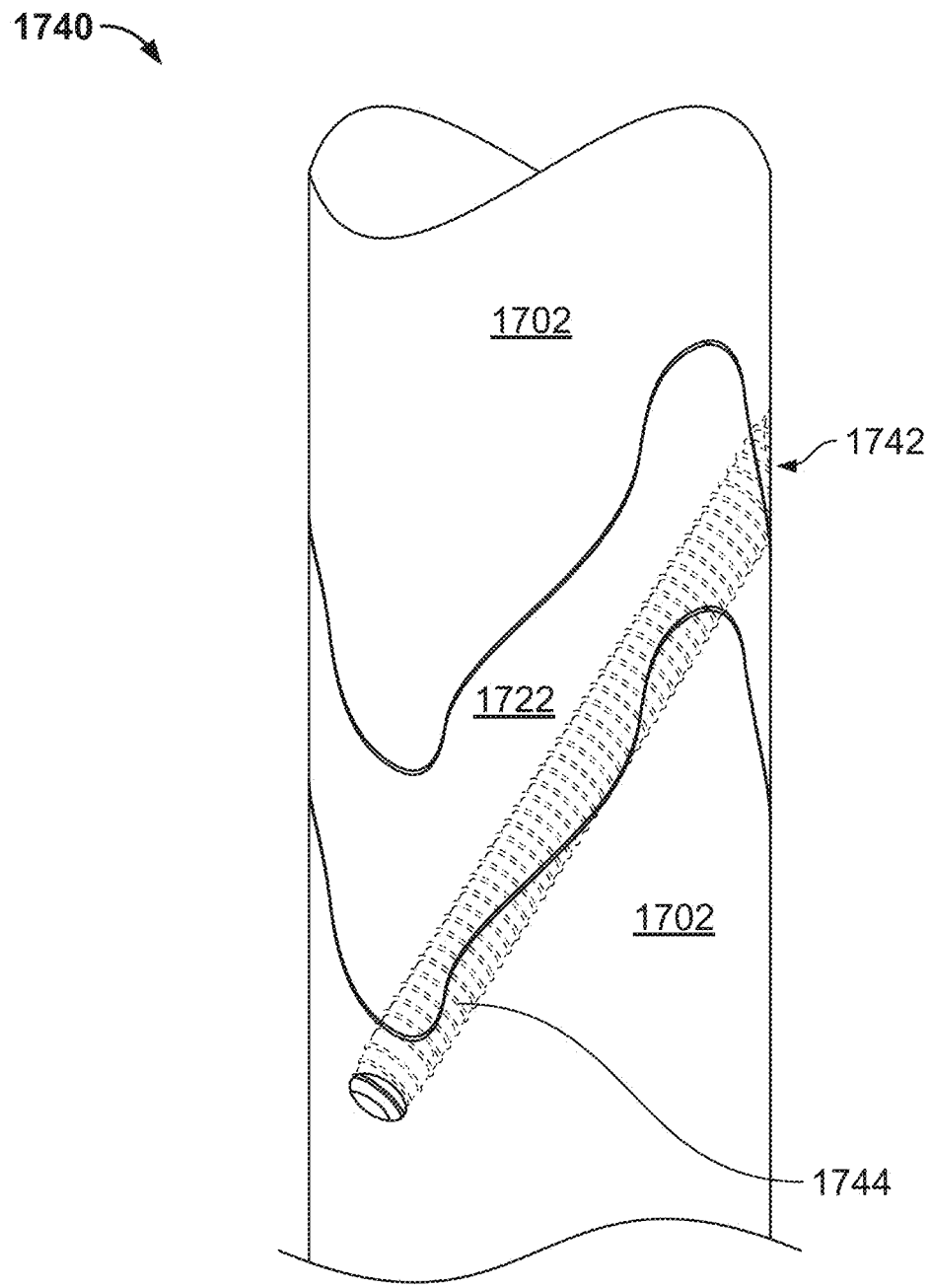
FIG. 14C is a perspective view of an example transformative section using the transformative segment of FIG. 14B and the portion of FIG. 14A.

FIG. 14C is a perspective view 1740 of an example transformative section using the transformative segment 1722 of FIG. 14B and the portion 1702 of FIG. 14A. In some examples, the segment 1722 and the portions 1702 of the transformative section may define an aperture 1742 through the transformative section. For example, inner surfaces of the segment 1722 and the portions 1702 may define the aperture 1742 through the transformative section. In some examples, the inner surfaces of the segment 1722 and the portions 1702 may define threads 1744, so that the aperture 1742 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw.

Figure 14D:
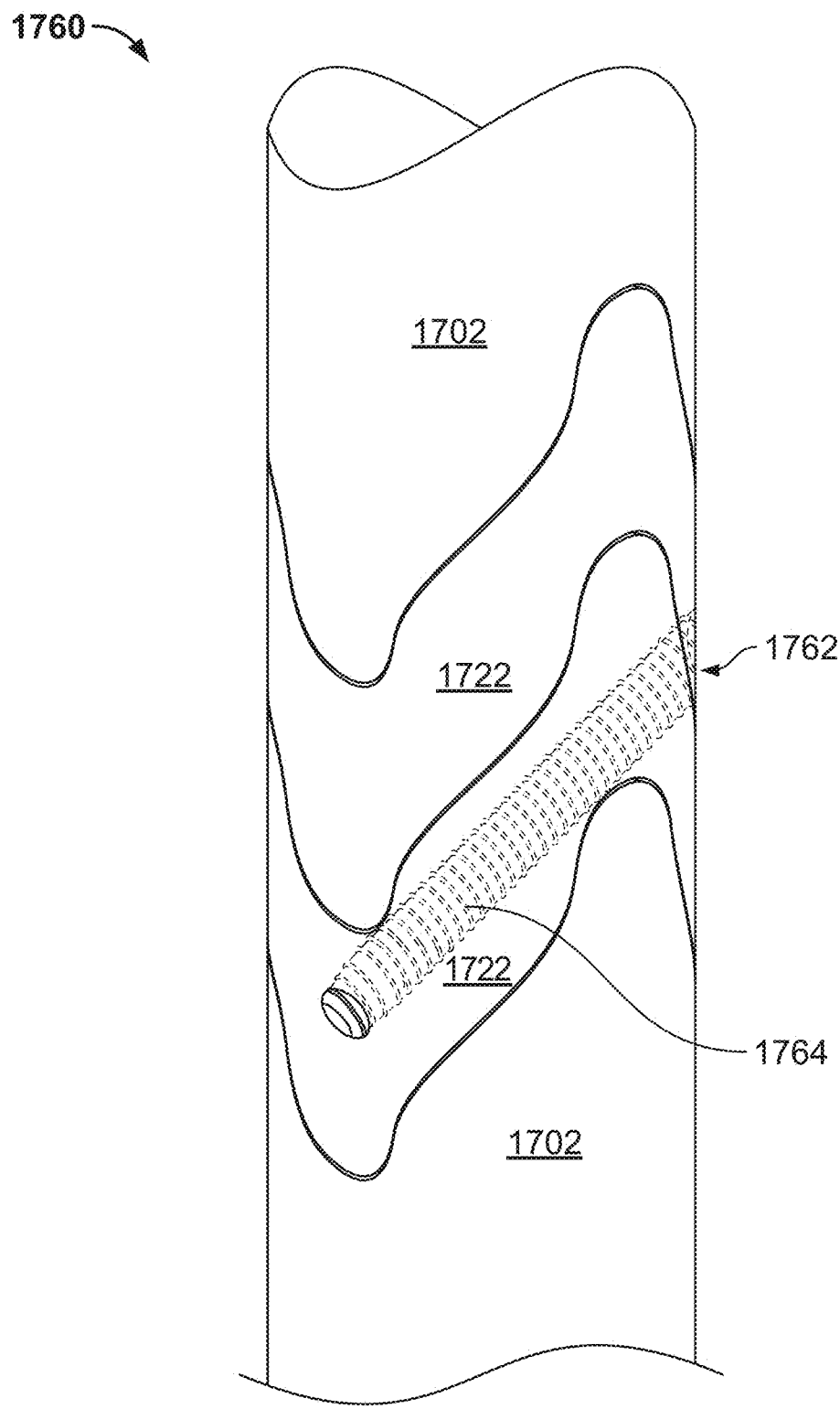
FIGS. 14D and 14E are perspective views of example transformative sections using the transformative segment of FIG. 14B, and showing the transformative section engaged with the portion of FIG. 14A.
Figure 14E:
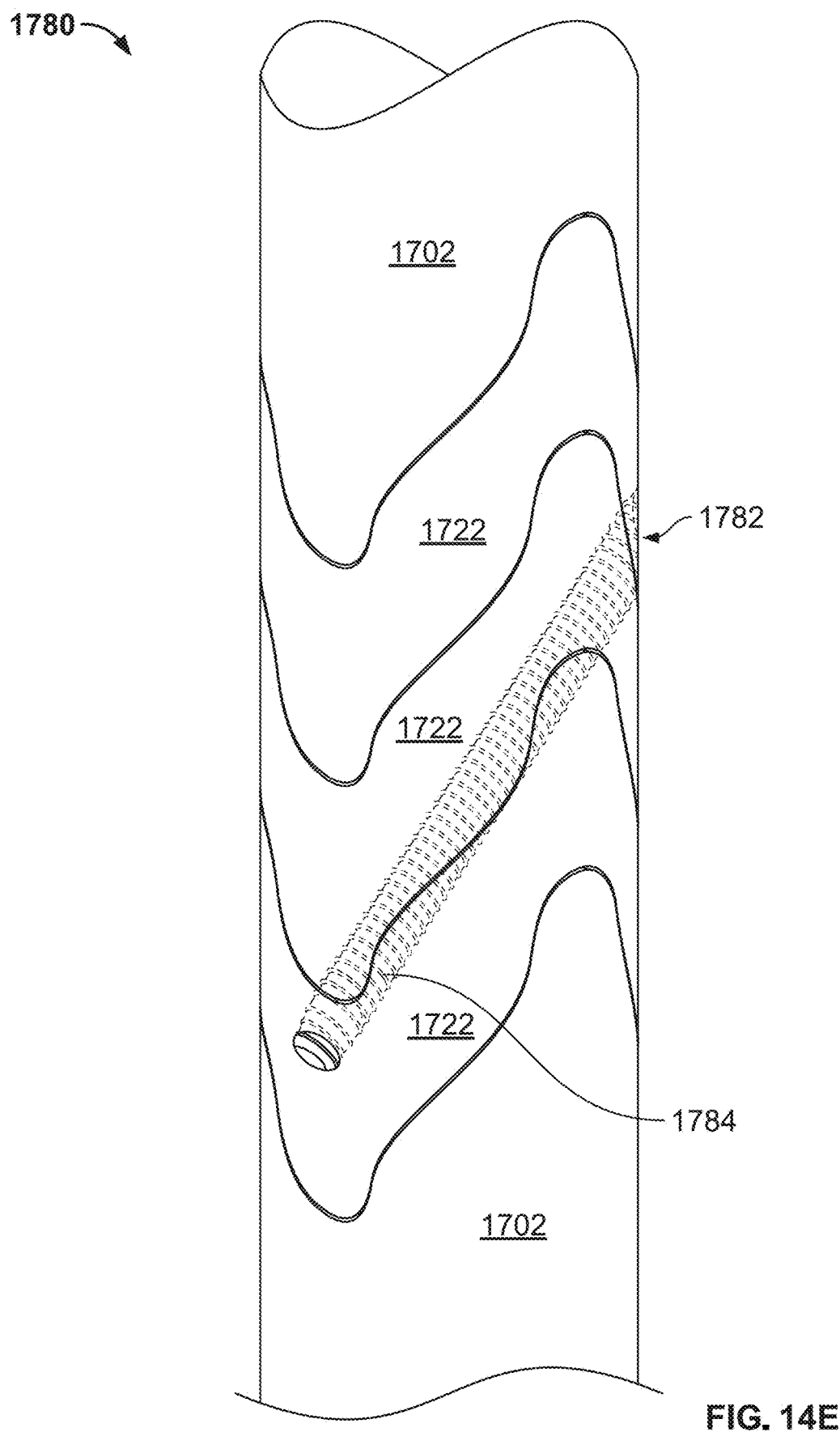

FIGS. 14D and 14E are perspective views 1760, 1780 of example transformative sections using the transformative segment 1722 of FIG. 14B, and showing the transformative section 1722 engaged with the portion 1702 of FIG. 14A. With reference first to FIG. 14D, in some examples, the segments 1722 of the transformative section may define an aperture 1762 through the transformative section. For example, inner surfaces of the segments 1722 may define the aperture 1762 through the transformative section. In some examples, the inner surfaces of the segments 1722 may define threads 1764, so that the aperture 1762 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw. With reference now to FIG. 14E, in some examples, the segments 1722 of the transformative section may define an aperture 1782 through the transformative section. For example, inner surfaces of the segments 1722 may define the aperture 1782 through the transformative section. In some examples, the inner surfaces of the segments 1722 may define threads 1784, so that the aperture 1782 may be a threaded aperture and may receive a transformative screw, such as transformative screw 302 of FIG. 3A or transformative screw 321 of FIG. 3B, according to various implementations. In some examples, the transformative section may be in a flexible state prior to receiving a transformative screw, and may be in a fixed state after receiving the transformative screw.

In some examples, the intramedullary devices discussed herein and the elongate members discussed herein may be available in two or more sizes, and an appropriate size may be selected based on a size of the patient or a size of the bone into which the device is to be implanted, for example. In some examples, the intramedullary bone fixation devices or elongate members discussed herein may be available in two, three, four, five, or more sizes, and a physician may select an appropriate size for implantation in the patient.

In some examples, a 3D printer may be used to make of form the intramedullary bone fixation devices described herein, and may use any appropriate material to form the intramedullary bone fixation devices. In some examples, a 3D printer may be used to make or form the elongate members of intramedullary bone fixation devices described herein, and may use any appropriate material to form the elongate members of the intramedullary bone fixation devices. In some examples, the intramedullary bone fixation devices or the elongate members described herein may be formed of titanium. In some examples, the intramedullary bone fixation devices or the elongate members described herein may be formed of a titanium alloy. In some examples, the intramedullary bone fixation devices or the elongate members described herein may be formed of a titanium-vanadium alloy. In some examples, the intramedullary bone fixation devices or the elongate members described herein may be formed of stainless steel. In some examples, the intramedullary bone fixation devices or the elongate members described herein may be formed of 316L stainless steel. In some examples, the transformative screws discussed herein may be flexible.

In some examples, the intramedullary bone fixation devices discussed herein may remain implanted in the patient following healing of the bone fracture. In some examples, the intramedullary bone fixation devices discussed herein may remain implanted in the patient indefinitely. In some examples, the intramedullary bone fixation devices discussed herein can be extracted from the patient after the bone fracture has healed, and in these examples the device may be extracted by removing the screws from the device using the jig and the associated cannulas, and then by extracting the elongate member. Following removal of the transformative screw from the transformative section of the device, the transformative section may again assume a mobile state, and may be able to flex in a frontal plane, which may make extraction of the elongate member easier.

The above description provides examples of some implementations. Other implementations that are not explicitly described above are also possible, such as implementations based on modifications and/or variations of the features described above. For example, the techniques described above may be implemented in different orders, with the inclusion of one or more additional steps, and/or with the exclusion of one or more of the identified steps. Similarly, the devices, systems, and methods may include one or more additional features, may exclude one or more of the identified features, and/or include the identified features or steps combined in a different way than presented above. Features or steps that are described as singular may be implemented as a plurality of such features or steps. Likewise, features or steps that are described as a plurality may be implemented as singular instances of such features or steps. Additionally, the steps and techniques described above as being performed by some devices and/or systems may alternatively, or additionally, be performed by other devices and/or systems that are described above or other devices and/or systems that are not explicitly described. The drawings are intended to be illustrative and may not precisely depict some implementations. Variations in sizing, placement, shapes, angles, curvatures, and/or the positioning of features relative to each other are possible. Accordingly, other implementations are within the scope of the following claims.

What is claimed is:

1. An intramedullary bone fixation device, comprising:
   an elongate member that includes a proximal section, a distal section, and a transformative section disposed between the proximal section and the distal section;
   wherein the proximal section includes a first threaded section on an outside surface of the proximal section, and wherein threads of the first threaded section have a first pitch;
   wherein the distal section includes a second threaded section on an outside surface of the distal section, and wherein threads of the second threaded section have a second pitch that is different from the first pitch;
   wherein the transformative section includes a plurality of segments disposed in a vertical arrangement between the proximal section and the distal section, each segment of the plurality of segments including a male engagement portion of the segment and a female engagement portion of the segment, and wherein one or more inner surfaces of the segments define an aperture through the transformative section, the one or more inner surfaces also defining threads; and
   a screw adapted to be operably placed through the aperture, the screw including a first set of threads on an outer surface of the screw adapted to engage the threads on the one or more inner surfaces of the segments; and
   wherein the screw also includes a second set of threads on a distal portion of the screw and a third set of threads on a proximal portion of the screw, each of the second and third sets of threads having a pitch that differs from a pitch of the first set of threads.

2. The device of claim 1, wherein the transformative section is initially in a flexible state, and wherein, after the screw is operably placed through the aperture, the transformative section is in a fixed state.

3. The device of claim 2, wherein, while the transformative section is in the flexible state, the transformative section is adapted to provide between 4 degrees and 6 degrees of flexibility in a frontal plane.

4. The device of claim 2, wherein the transformative section, when in the flexible state, is adapted to conform to a curvature of an intramedullary canal of a distal metaphysis of a fibula.

5. The device of claim 1, wherein for each segment of the plurality of segments, the male engagement portion includes a bulbous element, and wherein the female engagement portion includes a shape that is adapted to receive the bulbous element.

6. The device of claim 1, wherein for each segment of the plurality of segments, the male engagement portion includes a proximal male engagement portion and a distal male engagement portion, and wherein the female engagement portion includes a shape that is adapted to receive, from one or more other segments of the plurality of segments, a portion of a male engagement portion.

7. The device of claim 1, wherein the second set of threads of the screw are adapted to engage with a medial cortex of a fibula, wherein the third set of threads of the screw are adapted to engage with a lateral cortex of the fibula, and wherein a length of the screw is adapted to span from the medial cortex of the fibula to the lateral cortex of the fibula when the screw is placed through the aperture.

8. The device of claim 1, wherein a middle portion of the screw has a first diameter, and wherein the proximal portion of the screw broadens from the first diameter to a second diameter at a proximal end of the screw, and wherein the second diameter is larger than the first diameter.

9. The device of claim 1, wherein the threads of the first threaded section of the proximal section are self-tapping.

10. The device of claim 1, wherein the first threaded section is disposed at a proximal end of the proximal section, and wherein the second threaded a section of the distal section is disposed at a distal end of the distal section.

11. The device of claim 1, wherein the first threaded section of the proximal section and the second threaded section of the distal section are adapted to provide a compressive force across a bone fracture site.

12. The device of claim 1, further comprising, at a distal end of the elongate member, a head that defines a tool interface receptacle.

13. The device of claim 1, further comprising first and second lateral-to-medial screws that each pass through the proximal section, a locking trans-syndesmotic screw and a non-locking trans-syndesmotic screw that each pass though the distal section, and first and second anterior-to-posterior screws that each pass through the distal section.

14. A system for intramedullary bone fixation, comprising:
- a guide that includes a bone apposition port that defines a channel through the bone apposition port, wherein the bone apposition port is configured such that the channel aligns with an intramedullary canal of a bone when the bone apposition port is positioned apposed to the bone;
- an intramedullary bone fixation device that includes:
  - an elongate member that includes a proximal section, a distal section, and a transformative section disposed between the proximal section and the distal section;
  - wherein the proximal section includes a first threaded section on an outside surface of the proximal section, and wherein threads of the first threaded section have a first pitch;
  - wherein the distal section includes a second threaded section on an outside surface of the distal section, and wherein threads of the second threaded section have a second pitch that is different from the first pitch;
  - wherein the transformative section includes a plurality of segments disposed in a vertical arrangement between the proximal section and the distal section, each segment of the plurality of segments including a male engagement portion of the segment and a female engagement portion of the segment, and wherein one or more inner surfaces of the segments define an aperture through the transformative section, the one or more inner surfaces also defining threads; and
- a screw adapted to be operably placed through the aperture, the screw including a first set of threads on an outer surface of the screw adapted to engage the threads on the one or more inner surfaces of the segments; and
- wherein the screw also includes a second set of threads on a distal portion of the screw and a third set of threads on a proximal portion of the screw, each of the second and third sets of threads having a pitch that differs from a pitch of the first set of threads.

15. The system of claim 14, wherein the channel is sized for a guidewire, and wherein the channel aligns with a middle portion of the intramedullary canal when the bone apposition port is positioned apposed to the bone.

16. The system of claim 14, wherein the channel is sized for a drill bit.

17. The system of claim 16, further comprising a guide insert adapted to be received within the channel of the guide, the guide insert defining a second channel through the guide insert, wherein the second channel aligns with a middle portion of the intramedullary canal when the bone apposition port is positioned apposed to the bone.

18. The system of claim 14, wherein the transformative section is initially in a flexible state, and wherein, after the screw is operably placed through the aperture, the transformative section is in a fixed state.

19. The system of claim 18, wherein, while the transformative section is in the flexible state, the transformative section is adapted to provide between 4 degrees and 6 degrees of flexibility in a frontal plane.

20. The system of claim 18, wherein the transformative section, when in the flexible state, is adapted to conform to a curvature of an intramedullary canal of a distal metaphysis of a fibula.

* * * * *